US010019730B2

(12) United States Patent
Roundtree

(10) Patent No.: US 10,019,730 B2
(45) Date of Patent: Jul. 10, 2018

(54) REVERSE BRAND SORTING TOOLS FOR INTEREST-GRAPH DRIVEN PERSONALIZATION

(71) Applicant: Nfluence Media, Inc., Seattle, WA (US)

(72) Inventor: Brian Roundtree, Seattle, WA (US)

(73) Assignee: AutoGraph, Inc., Seattle, WA (US)

( * ) Notice: Subject to any disclaimer, the term of this patent is extended or adjusted under 35 U.S.C. 154(b) by 0 days.

(21) Appl. No.: 13/843,270

(22) Filed: Mar. 15, 2013

(65) Prior Publication Data

US 2014/0052527 A1 Feb. 20, 2014

Related U.S. Application Data

(60) Provisional application No. 61/683,678, filed on Aug. 15, 2012, provisional application No. 61/724,863, filed on Nov. 9, 2012.

(51) Int. Cl.
*G06Q 30/02* (2012.01)
(52) U.S. Cl.
CPC .............................. *G06Q 30/0245* (2013.01)
(58) Field of Classification Search
CPC ....................................... G06F 3/048–3/04897
USPC ................... 715/745, 810; 709/203; 705/12, 705/14.1–14.73, 26.1–27.2, 310, 319; 235/375
See application file for complete search history.

(56) References Cited

U.S. PATENT DOCUMENTS

| | | |
|---|---|---|
| 5,991,735 A | 11/1999 | Gerace |
| 6,603,969 B1 | 8/2003 | Vuoristo et al. |
| 6,611,842 B1 | 8/2003 | Brown |
| 7,062,510 B1 | 6/2006 | Eldering |
| 7,503,045 B1 | 3/2009 | Aziz et al. |
| 7,610,255 B2 | 10/2009 | Willcock et al. |
| 7,660,737 B1 | 2/2010 | Lim et al. |
| 7,707,171 B2 | 4/2010 | Willcock et al. |
| 7,809,740 B2 | 10/2010 | Chung et al. |
| 7,904,442 B2 | 3/2011 | Bahn et al. |
| 7,942,319 B2 | 5/2011 | Bezancon et al. |

(Continued)

FOREIGN PATENT DOCUMENTS

| | | |
|---|---|---|
| CN | 1101286173 | 10/2008 |
| CN | 102016904 | 4/2011 |

(Continued)

OTHER PUBLICATIONS

"taxonomy"—http://www.vocabulary.com/dictionary/taxonomy.*

(Continued)

*Primary Examiner* — Kieu Vu
*Assistant Examiner* — Alvaro R Calderon, IV
(74) *Attorney, Agent, or Firm* — Perkins Coie LLP

(57) ABSTRACT

An input and processing system allows user input information such as user affinity to efficiently block content and request content as well as novel input of commands such as copy/paste on a small mobile device screen among other computing devices. A client/server is also made more efficient due to the enhanced gathering of information such as content feedback from users.

Yet another disclosure regards a system allowing leveraging of preexisting information to display content and select brands for user feedback.

Also disclosed are systems for increasing sales efficiency, and various GUI interfaces.

15 Claims, 22 Drawing Sheets

(56) References Cited

U.S. PATENT DOCUMENTS

| | | |
|---|---|---|
| 8,108,245 B1 | 1/2012 | Hosea et al. |
| 8,271,894 B1 | 9/2012 | Mayers |
| 8,306,977 B1 * | 11/2012 | Gildfind ............ 707/734 |
| 8,370,330 B2 | 2/2013 | Priyadarshan et al. |
| 8,429,527 B1 | 4/2013 | Arbogast |
| 8,572,711 B1 | 10/2013 | Klau et al. |
| 8,620,748 B1 | 12/2013 | Ruarte et al. |
| 8,650,141 B2 | 2/2014 | Willcock et al. |
| 8,751,430 B2 | 6/2014 | Willcock et al. |
| 8,755,823 B2 | 6/2014 | Proietti et al. |
| 9,183,203 B1 * | 11/2015 | Tuchman ......... G06F 17/30011 |
| 2002/0123368 A1 | 9/2002 | Yamadera et al. |
| 2002/0140728 A1 | 10/2002 | Zimmerman et al. |
| 2003/0055722 A1 | 3/2003 | Perreault et al. |
| 2003/0061607 A1 | 3/2003 | Hunter et al. |
| 2003/0131260 A1 | 7/2003 | Hanson et al. |
| 2003/0144035 A1 | 7/2003 | Weinblatt et al. |
| 2003/0157963 A1 | 8/2003 | Collot |
| 2004/0014486 A1 | 1/2004 | Carlton et al. |
| 2004/0024739 A1 * | 2/2004 | Copperman ....... G06F 17/30616 |
| 2004/0049673 A1 | 3/2004 | Song et al. |
| 2004/0088513 A1 | 5/2004 | Biessener et al. |
| 2004/0215692 A1 | 10/2004 | Vasudevan et al. |
| 2004/0268265 A1 | 12/2004 | Berger et al. |
| 2005/0044569 A1 | 2/2005 | Marcus |
| 2005/0131762 A1 * | 6/2005 | Bharat ................ G06Q 10/00 705/14.66 |
| 2005/0216346 A1 | 9/2005 | Kusumoto et al. |
| 2005/0240608 A1 * | 10/2005 | Jones ............... G06F 17/30324 |
| 2005/0283796 A1 | 12/2005 | Flickinger |
| 2006/0010400 A1 * | 1/2006 | Dehlin et al. ............. 715/856 |
| 2006/0242013 A1 * | 10/2006 | Agarwal ............ G06Q 30/02 705/14.49 |
| 2006/0259360 A1 * | 11/2006 | Flinn ................. G06Q 30/02 705/14.71 |
| 2007/0030824 A1 | 2/2007 | Ribaudo et al. |
| 2007/0038931 A1 | 2/2007 | Allaire et al. |
| 2007/0067331 A1 | 3/2007 | Schachter et al. |
| 2007/0094083 A1 | 4/2007 | Yruski et al. |
| 2007/0101276 A1 | 5/2007 | Yuen et al. |
| 2007/0184820 A1 | 8/2007 | Marshall |
| 2007/0208679 A1 * | 9/2007 | Tseng ............... G06F 17/30882 706/45 |
| 2007/0244872 A1 | 10/2007 | Hancock |
| 2007/0257792 A1 * | 11/2007 | Gold ............... G06Q 30/02 340/539.2 |
| 2007/0260624 A1 * | 11/2007 | Chung ............... G06Q 30/02 |
| 2007/0294091 A1 | 12/2007 | Cohen et al. |
| 2008/0035734 A1 | 2/2008 | Challa et al. |
| 2008/0097867 A1 * | 4/2008 | Engle ................ G06Q 30/02 705/26.7 |
| 2008/0126175 A1 | 5/2008 | Alexander |
| 2008/0147645 A1 * | 6/2008 | O'Malley ......... G06F 17/30035 |
| 2008/0201734 A1 | 8/2008 | Lyon et al. |
| 2008/0235085 A1 | 9/2008 | Kovinsky et al. |
| 2008/0249987 A1 | 10/2008 | Ogasawara |
| 2008/0262908 A1 | 10/2008 | Broady et al. |
| 2008/0270398 A1 | 10/2008 | Landau et al. |
| 2008/0288331 A1 | 11/2008 | Magids et al. |
| 2008/0290987 A1 * | 11/2008 | Li ..................... G06Q 30/02 340/5.1 |
| 2008/0319862 A1 | 12/2008 | Golan et al. |
| 2009/0006214 A1 * | 1/2009 | Lerman et al. ............... 705/14 |
| 2009/0013268 A1 | 1/2009 | Amit |
| 2009/0018915 A1 | 1/2009 | Fisse |
| 2009/0028434 A1 * | 1/2009 | Vanhoucke ......... G06Q 30/02 382/182 |
| 2009/0063551 A1 | 3/2009 | Shuster |
| 2009/0089310 A1 | 4/2009 | Lara et al. |
| 2009/0099932 A1 * | 4/2009 | Ahopelto .................. 705/14 |
| 2009/0106096 A1 * | 4/2009 | Horowitz ........ G06Q 30/0226 705/14.27 |
| 2009/0106113 A1 | 4/2009 | Arora et al. |
| 2009/0112714 A1 * | 4/2009 | Steelberg et al. ........ 705/14 |
| 2009/0132943 A1 | 5/2009 | Minsky et al. |
| 2009/0182631 A1 * | 7/2009 | Higgins ............... G06Q 30/02 705/14.26 |
| 2009/0182810 A1 * | 7/2009 | Higgins ............... G06Q 30/02 709/204 |
| 2009/0234691 A1 * | 9/2009 | Steelberg et al. ............... 705/7 |
| 2009/0271256 A1 * | 10/2009 | Toebes ................ G06Q 30/02 705/14.53 |
| 2009/0276453 A1 * | 11/2009 | Trout ............. G06F 17/30029 |
| 2009/0276459 A1 * | 11/2009 | Trout ................. G06Q 30/02 |
| 2009/0305667 A1 | 12/2009 | Schultz |
| 2009/0319648 A1 * | 12/2009 | Dutta ................ G06Q 30/02 709/221 |
| 2010/0057743 A1 * | 3/2010 | Pierce ........................ 707/10 |
| 2010/0063872 A1 | 3/2010 | Patel et al. |
| 2010/0076838 A1 * | 3/2010 | Steelberg ........... G06Q 30/02 705/14.44 |
| 2010/0094878 A1 | 4/2010 | Soroca et al. |
| 2010/0161424 A1 * | 6/2010 | Sylvain ........... G06Q 30/0269 705/14.66 |
| 2010/0169313 A1 | 7/2010 | Kenedy et al. |
| 2010/0169803 A1 * | 7/2010 | Mazzei ............... G06Q 30/02 715/760 |
| 2010/0179950 A1 * | 7/2010 | Willcock ............ G06Q 10/00 707/723 |
| 2010/0185732 A1 | 7/2010 | Hyman |
| 2010/0218141 A1 | 8/2010 | Xu et al. |
| 2010/0262497 A1 | 10/2010 | Karlsson |
| 2010/0293036 A1 | 11/2010 | Meyer et al. |
| 2010/0293569 A1 | 11/2010 | Kusumoto et al. |
| 2010/0299140 A1 | 11/2010 | Witbrock et al. |
| 2010/0299226 A1 * | 11/2010 | Steelberg ........... G06Q 30/02 705/27.1 |
| 2010/0306702 A1 * | 12/2010 | Warner ..................... 715/811 |
| 2010/0318405 A1 | 12/2010 | Kirkby |
| 2010/0331016 A1 * | 12/2010 | Dutton ................ H04W 4/02 455/456.3 |
| 2011/0024490 A1 | 2/2011 | Kangas et al. |
| 2011/0035263 A1 | 2/2011 | Ramanathan |
| 2011/0055017 A1 | 3/2011 | Solomon et al. |
| 2011/0066497 A1 * | 3/2011 | Gopinath ............ G06Q 30/02 705/14.53 |
| 2011/0072047 A1 * | 3/2011 | Wang ............... G06F 17/30265 707/776 |
| 2011/0093780 A1 | 4/2011 | Dunn et al. |
| 2011/0099064 A1 | 4/2011 | Lyon et al. |
| 2011/0106613 A1 | 5/2011 | Felt et al. |
| 2011/0107433 A1 * | 5/2011 | Steelberg ........... G06Q 30/02 726/27 |
| 2011/0126122 A1 | 5/2011 | Forman et al. |
| 2011/0145039 A1 | 6/2011 | McCarney et al. |
| 2011/0153429 A1 | 6/2011 | Ullah |
| 2011/0161331 A1 * | 6/2011 | Chung et al. ............... 707/751 |
| 2011/0215162 A1 | 9/2011 | Challa et al. |
| 2011/0219448 A1 | 9/2011 | Sreedharan et al. |
| 2011/0227790 A1 | 9/2011 | Li et al. |
| 2011/0282878 A1 * | 11/2011 | Bird ............... G06F 17/30737 707/740 |
| 2011/0288913 A1 | 11/2011 | Waylonis et al. |
| 2011/0295664 A1 | 12/2011 | Flinn et al. |
| 2011/0295665 A1 | 12/2011 | Flinn et al. |
| 2011/0295696 A1 | 12/2011 | Flinn et al. |
| 2011/0295699 A1 | 12/2011 | Flinn et al. |
| 2011/0295703 A1 | 12/2011 | Flinn et al. |
| 2011/0319059 A1 | 12/2011 | Padeh |
| 2012/0005204 A1 | 1/2012 | Diaz et al. |
| 2012/0011112 A1 | 1/2012 | Bian et al. |
| 2012/0029986 A1 | 2/2012 | Jalili |
| 2012/0036181 A1 | 2/2012 | Isidore |
| 2012/0038665 A1 | 2/2012 | Strietzel |
| 2012/0130822 A1 | 5/2012 | Patwa et al. |
| 2012/0158502 A1 | 6/2012 | Chung et al. |
| 2012/0166433 A1 * | 6/2012 | Tseng ............... G06Q 30/0224 707/728 |
| 2012/0200390 A1 | 8/2012 | Saravanan |
| 2012/0209839 A1 | 8/2012 | Andrews et al. |
| 2012/0209907 A1 | 8/2012 | Andrews et al. |
| 2012/0323704 A1 * | 12/2012 | Steelberg et al. ......... 705/14.73 |

(56) References Cited

U.S. PATENT DOCUMENTS

| | | | |
|---|---|---|---|
| 2013/0005352 A1 | 1/2013 | Jones et al. | |
| 2013/0018685 A1* | 1/2013 | Parnaby | G06Q 10/10 705/7.13 |
| 2013/0018698 A1 | 1/2013 | Parnaby et al. | |
| 2013/0018838 A1 | 1/2013 | Parnaby et al. | |
| 2013/0018957 A1 | 1/2013 | Parnaby et al. | |
| 2013/0047123 A1* | 2/2013 | May | G06F 3/0482 715/834 |
| 2013/0054366 A1* | 2/2013 | Roundtree et al. | 705/14.55 |
| 2013/0075464 A1 | 3/2013 | Van Horn et al. | |
| 2013/0085847 A1* | 4/2013 | Dyor et al. | 705/14.49 |
| 2013/0085848 A1 | 4/2013 | Dyor et al. | |
| 2013/0085849 A1* | 4/2013 | Dyor et al. | 705/14.49 |
| 2013/0085855 A1* | 4/2013 | Dyor et al. | 705/14.55 |
| 2013/0086499 A1* | 4/2013 | Dyor et al. | 715/766 |
| 2013/0117375 A1 | 5/2013 | Bist et al. | |
| 2013/0124628 A1 | 5/2013 | Weerasinghe | |
| 2013/0132194 A1* | 5/2013 | Rajaram | G06Q 50/01 705/14.52 |
| 2013/0132197 A1 | 5/2013 | Toebes et al. | |
| 2013/0144710 A1* | 6/2013 | Roundtree et al. | 705/14.44 |
| 2013/0144711 A1* | 6/2013 | Roundtree et al. | 705/14.44 |
| 2013/0151339 A1* | 6/2013 | Kim | G06F 17/3082 705/14.55 |
| 2013/0159110 A1* | 6/2013 | Rajaram | G06Q 50/01 705/14.66 |
| 2013/0161381 A1* | 6/2013 | Roundtree et al. | 235/375 |
| 2013/0167085 A1 | 6/2013 | Roundtree et al. | |
| 2013/0191205 A1 | 7/2013 | Harkless, II et al. | |
| 2013/0268357 A1 | 10/2013 | Heath | |
| 2013/0290106 A1* | 10/2013 | Bradley | G06Q 90/20 705/14.64 |
| 2013/0291123 A1* | 10/2013 | Rajkumar | G06F 21/00 726/28 |
| 2013/0298147 A1 | 11/2013 | Klein et al. | |
| 2013/0326357 A1 | 12/2013 | O'Donnell et al. | |
| 2014/0046753 A1* | 2/2014 | Rabii | G06Q 30/0242 705/14.41 |
| 2014/0067542 A1 | 3/2014 | Everingham | |
| 2014/0079225 A1 | 3/2014 | Jarske | |
| 2014/0108142 A1 | 4/2014 | Toebes et al. | |
| 2014/0129344 A1 | 5/2014 | Smith et al. | |
| 2014/0136606 A1* | 5/2014 | Roundtree | 709/203 |
| 2014/0143250 A1* | 5/2014 | Martin | G06F 17/30598 707/737 |
| 2014/0201126 A1 | 7/2014 | Zadeh et al. | |
| 2014/0201292 A1* | 7/2014 | Savage | H04L 51/063 709/206 |
| 2014/0278992 A1* | 9/2014 | Roundtree et al. | 705/14.55 |
| 2014/0344953 A1 | 11/2014 | Roundtree | |
| 2014/0359471 A1 | 12/2014 | Roundtree | |
| 2015/0140982 A1 | 5/2015 | Postrel | |
| 2015/0189028 A1 | 7/2015 | Sayed | |
| 2015/0193888 A1 | 7/2015 | Sayed | |
| 2015/0242911 A1 | 8/2015 | Zises | |

FOREIGN PATENT DOCUMENTS

| | | |
|---|---|---|
| CN | 102073956 A | 5/2011 |
| EP | 2226719 | 9/2010 |
| JP | 63-37727 | 2/1988 |
| JP | 2002261918 A | 9/2002 |
| JP | 2003223251 A | 8/2003 |
| JP | 2006030482 A | 2/2006 |
| WO | 2007035412 A2 | 3/2007 |
| WO | 2007117979 A2 | 10/2007 |
| WO | 2007117980 A2 | 10/2007 |
| WO | WO 2008110504 A2 * | 9/2008 |
| WO | WO-2010018451 | 2/2010 |
| WO | 2010119379 A1 | 10/2010 |
| WO | 2014186771 A1 | 11/2014 |

OTHER PUBLICATIONS

International Search Report and Written Opinion for PCT/US2012/41178, Applicant: Nfluence Media, Inc., dated Aug. 17, 2012, 6 pages.
International Search Report and Written Opinion for PCT/US2012/68319, Applicant: Nfluence Media, Inc., dated Apr. 5, 2013, 21 pages.
International Search Report and Written Opinion for PCT/US2013/32643, Applicant: Nfluence Media, Inc., dated Jun. 7, 2013, 10 pages.
International Search Report and Written Opinion for PCT/US2013/69766, Applicant: Nfluence Media, Inc., dated May 13, 2014, 8 pages.
European Patent Office, Extended European Search Report, EP Patent Application 12797069.7, dated Oct. 2, 2014, 7 pages.
International Searching Authority, International Search Report and Written Opinion, PCT Application PCT/US2014/038502, dated Oct. 7, 2014, 8 pages.
"A service for measuring location-based public sentiment, in real-time." <http://web.archive.org/web/20110511150225/http://www.qriously.com/>, May 11, 2011, 3 pages.
"Express yourself now, start the quiz . . . " screenshot <youiverse.com>; date unknown 2012; accessed May 15, 2015, 1 page.
"VisualDNA Personality Quiz," <http://you.visualdna.com/quiz/personality>; date unknown 2012; accessed May 15, 2015, 1 page.
"VisualDNA Shops Product Walkthrough"—YouTube. <https://www.youtube.com/watch?v=-Uz-ibFmlDY> uploaded May 28, 2009. 1 page.
"What am I worth?" screenshot <http://3.bp.blogspot.com/-UA1s2bthzeE/TxV_cCt_N0I/AAAAAAAACpg/UY-kKxa3k7M/s1600/Worth1.png>; date unknown 2012; accessed May 15, 2015, 1 page.
Butcher, Mike. "ColourDNA App Builds New Kind Of Interest Graph—Pinterest For Color?"<http://techcrunch.com/2012/03/27/colourdna-app-builds-new-kind-of-interest-graph-pinterest-for-color/>. Mar. 27, 2012, 11 pages.
Farmer, Aaron, The Retail Coach. "Psychograhic Profile, Retail Trade Area, Liberty, Texas." Feb. 1, 2010, 32 pages.
Gift Finder—Find Gifts by Personality Type. <http://www.gifts.com/finder>; date unknown 2012; accessed May 15, 2015, 1 page.
Mital, Vijay, U.S. Appl. No. 12/759,097, filed Apr. 13, 2010, 56 pages.
Price, E. "Apple Patents the Virtual Page Turn." <http://mashable.com/2012/11/16/apple-page-turn-patent/?utm_source=feedburner&utm_medium=email&utm_campaign=Feed%3A+Mashable+%28Mashable%29[mashable.com]>, Nov. 16, 2012, 2 pages.
Visioncritical. "Vision Critical's Visual Questions: What, when and why to use these question types," Oct. 17, 2011, 44 pages.
VisualDNA Products, "Highly personalized dynamic creative", <http://www.slideshare.net/visualdna/visualdna-products>. published May 3, 2011, 5 pages.
Willcock, Alex, U.S. Appl. No. 11/227,255, filed Sep. 16, 2005, 25 pages.
Wilicock, Alex, U.S. Appl. No. 12/294,934, filed Sep. 28, 2008, 182 pages.
"Screen shot of Zite 2,0 application", access date unknown, 5 pages.
Japanese Patent Office, Official Action, JP Patent Application 2014-514610, dated Jun. 2, 2016, 9 pages (including English translation).
Allan et al. U.S. Appl. No. 13/490,444, filed Jun. 6, 2012, Consumer Driven Advertising System,: 94 pages.
State Intellectual Property Office of China, Second Office Action, CN Patent Application 201280037966.1, dated Apr. 12, 2017, 30 pages.
Roundtree, Brian. U.S. Appl. No. 14/078,515, filed Nov. 12, 2013, "Consumer and Brand Owner Data Management Tools, " 66 pages.
Roundtree, Brian. U.S. Appl. No. 14/280,480, filed May 16, 2014, "Privacy Sensitive Persona Management Tools," 82 pages.

* cited by examiner

US 10,019,730 B2

REVERSE BRAND SORTING TOOLS FOR INTEREST-GRAPH DRIVEN PERSONALIZATION

The present application claims the benefit of and priority to, U.S. Provisional Application Nos. 61/683,678 filed 15 Aug. 2012 and 61/724,863 filed 9 Nov. 2012, which are herein incorporated by reference in their entirety.

The following U.S. Provisional applications are also herein incorporated by reference in their entirety: U.S. Provisional Patent Application No. 61/493,965 filed 6 Jun. 2011; U.S. Provisional Patent Application No. 61/533,049 filed 9 Sep. 2011; U.S. Provisional Patent Application No. 61/506,601 filed 7 Jul. 2011; U.S. Provisional Patent Application No. 61/597,136 files 9 Feb. 2012; 61/567,594 filed 6 Dec. 2011; and U.S. Provisional Patent Application No. 61/603,216 filed 24 Feb. 2012.

In addition, the following applications are incorporated by reference in their entirety: U.S. patent application Ser. No. 13/490,444 filed 6 Jun. 2012; U.S. patent application Ser. No. 13/490,449 filed 6 Jun. 2012; U.S. patent application Ser. No. 13/490,447 filed 6 Jun. 2012; International Patent Application No. PCT/US12/41178 filed 6 Jun. 2012; U.S. patent application Ser. No. 13/707,581 filed 6 Dec. 2012; U.S. patent application Ser. No. 13/707,578 filed 6 Dec. 2012; and International Patent Application No PCT/US12/68319 filed 6 Dec. 2012.

APPENDICES

Figure 1:
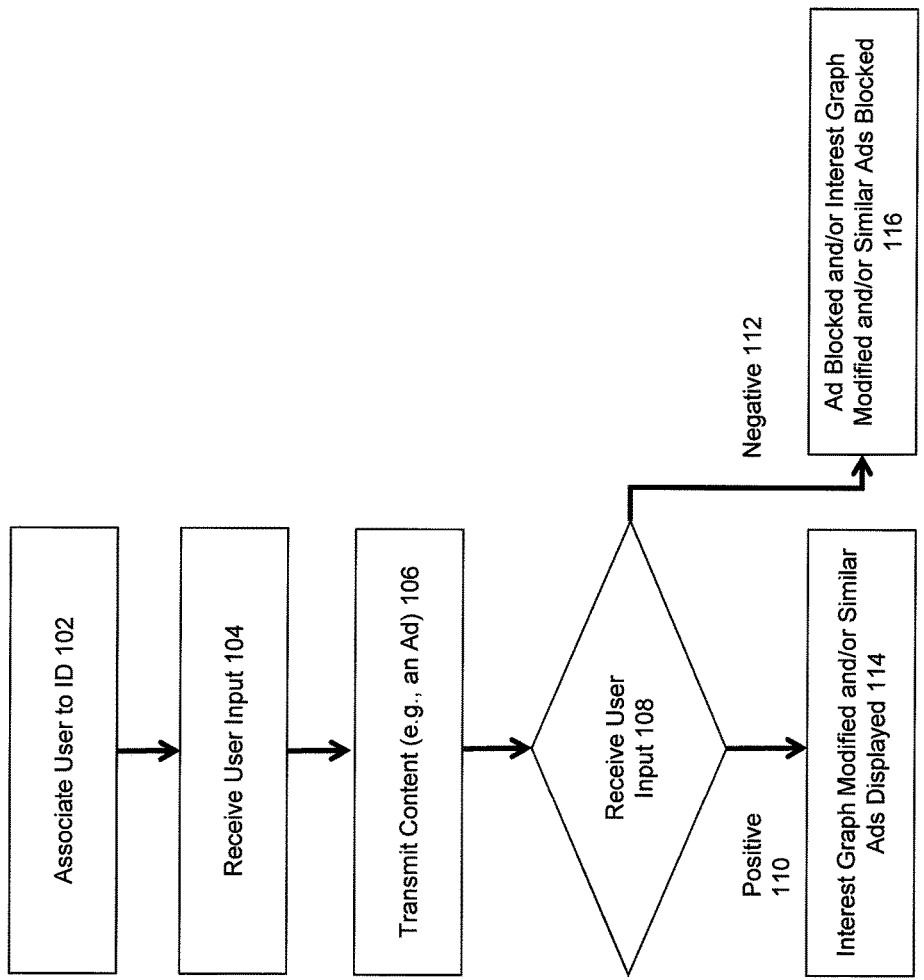
FIGS. 1-5 illustrate an embodiment of a consumer self-profiling tool using Ad Swoting gestures in accordance with an embodiment of the disclosed technology.

Appendix A has a description of technologies described in the incorporated applications.

DETAILED DESCRIPTION

Introduction

There is currently a need for a new type of relevant information that can be provided to users of computer-based devices that is not available by previously existing means. Previously, consumers were satisfied with relevance information from search engines and social media. Search engines use links between web pages to determine relevance and social media uses links between people to determine social relevance.

One new kind of relevant information that is in demand is "right now" relevance (e.g., the answer to the question, "Which pub should I go to near my current location and with the specific group of friends I am with?"). Unlike relevance that is "forever" or "overall" like that found with search engines, this new kind of relevance information needs lots of other information to determine, which is often not easily input by the user (especially via mobile devices).

As will be explained in further detail below, one embodiment of the disclosed technology provides a convenient way for a user to enter information that can be used to provide "right now" relevance information. The information is gathered by monitoring how a user reacts to the depiction of a number of items of content such as "ads" and "brands." As used herein a brand can be virtually anything that evokes some sort of positive or negative reaction from the user and which can be correlated to some demographic characteristic. As explained in the incorporated patent applications, a brand may include, but is not limited to, a logo, trademark, animation, text, movies, movie clip, movie still, TV shows, books, musical bands or genres, celebrities, historical or religious figures, geographic locations, colors, patterns, occupations, hobbies or any other thing that can be associated with some demographic information. For instance any thing that can be broadly accepted or recognized by a plurality of users can be a brand. Such examples could be Huggies™ brand diapers, Copper River Salmon™, Microsoft™ software, a picture of Tom Cruise, a picture of a frame from one of Tom Cruise's movies, a musical band name, a musical band album cover, a famous picture such as the picture from Time™ magazine celebrating victory in WWII in which a sailor is kissing a woman, a picture of a house in the country, a picture of a Porsche™ car, a picture of a smiley face, locations (France, Virgin Islands) etc. In addition, brands can be abstract ideas such as "World Peace" and "Save the Whales", political ideologies such as "Republican" or other concepts about which a user may have an opinion can also be brands. As used herein, the term "ad" is to be interpreted broadly and can include promotional materials, rebates, consumer notices, content, political or religious materials, coupons, advertisements (including push advertisements), various kinds of recommendations (such as product/service recommendations, content/media recommendations), offers, content (movies/TA/shows) and other information that a user may which to receive.

By determining an individual's reaction to one or more brands and ads in an easy and intuitive way, information such as characteristics, which include demographic characteristics and interests, can be inferred about the person. For example, people who like Nike™ brand shoes are typically younger individuals who have in interest in fitness. This likely demographic information can be used to offer goods and services to the individual.

In the incorporated patent applications, a user's profile of their likely characteristics is referred to as an "Advertar"™, which has a number of actual or desired demographic and interest tags associated with it as well as associated statistical probabilities. In one embodiment of this technology, Advertars can be presented to merchants who offer the advertar goods or services. However, the owner of the advertar may remain anonymous to the merchants.

Ad Blocker

Overview of Ad Blocker

As discussed in the referenced patent applications, a user can input a "Swote" gesture input on an image of a brand (SWipe+vOTE) on a screen to input commands including whether they like or dislike a brand as further discussed below. Swote gestures can also be performed on ads, brands and other content in order to allow novel tools to: 1) enable users to easily input data about a piece of content including input which will block unwanted content such as particular ads or brands the consumer dislikes; 2) help a user refine her interest graph; and 3) provide advertisers and other entities with valuable ad/content feedback tied to a specific user. Appendix A further elaborates on Swote gestures.

Swote gestures allow a user to easily and intuitively input affinity or other input data regarding a piece of content. Input such as affinity feedback may be integrated into an associated user interest graph. In particular, search engines and their users as well as publishers and advertisers may benefit from the user of a Swote ad blocker. Specifically, search engines and web publishers would greatly benefit from better, more accurately targeted user ads and search results. For instance, a search engine or other entity such as an advertiser may insert a Swote gesture enabled ad or other content with or as apart of the search results or in any content such as a webpage, receive user affinity input and based upon said input and the user interest graph, display a more appropriate ad and/or alter the search results as well.

In one embodiment as illustrated in FIG. 1, an identifier (login, Facebook account, software ID, cookie etc.) is associated with a user 102 which may associate the user and/or her device(s) to an interest graph as well. Upon a user keyword search, or other user input such as search/browsing/input/purchases/actions 104, selected search results and ads/content, may be transmitted 106 to the user. The ads/content may be selected based at least on either or both the input and the user's interest graph. The user may input feedback via a Swote gesture or other tool such by clicking a "dislike" button at 108 performed on or near the content. Here, the input may be a negative affinity swote gesture 112 or positive affinity swote gesture input 110.

In response to a positive input 110, the user's profile may be modified to favor/weight in favor of characteristics related to the ad/content (e.g., interest graph may be modified) and similar ads with similar characteristics may be displayed to the user 114. Specifically, a reference to the identity of the ad, characteristics (e.g., characteristic tags) and probabilities, keywords, an image analysis/comparison/search of the content and other data associated to the ad may be recorded, weighted and incorporated into her interest graph (e.g., via marketing data, taxonomy etc.) similar to that shown in FIG. 19. This updated interest graph may be used as a basis to select and display further ads. In another embodiment, in response to a user affinity gesture, ads with similar properties such as keywords (e.g., similar characteristic tags), probabilities, URLs/websites/domains of origin, images may be given preference for user display with or without association to a user specific interest graph.

In response to a negative input 112, the displayed ad may be blocked from subsequent display or transmission to the user and the user's interest graph modified to block similar ads at 116. Here, a reference to the identity of the ad may be added to the interest graph, or added to other files such as a local or remote client list of ads that will be blocked from user display. Similar to the receipt of positive input, the characteristics and statistics of the ad may be incorporated into the user's interest graph and weighted appropriately to aid in blocking similar ads. For instance, if the user inputs a negative affinity to ads with the associated keywords/tags "car insurance", then similar ads pertaining to car insurance will be blocked. A taxonomy, marketing data or other tools may aid in determining which ads are similar.

In one embodiment, in response to a neutral input such as a Swote gesture that is substantially sideways on a screen, the ad may or may not be blocked from future display. Here, similar to the above, characteristics and statistics of the ad may be incorporated into the user's interest graph and weighted appropriately to aid in displaying ads that may resemble the ad. The characteristics may serve as a basis to be examined by the interest graph for further exploration of user characteristics such as only slightly modifying the weights and characteristics associated to the displayed ad.

In some embodiments, the ads and other content initially delivered by the search may not be related to specific user input. For instance, if a user first loads a webpage she has never visited, an ad based on indirect information such as her IP address, browsing history and other information may prompt a Swote gesture enabled ad to be selected based on this information and then displayed. Subsequent Swote gesture input may be added to her interest graph and subsequent ads may be based upon her specific input.

Ad Blocker And Swote Gesture Input Embodiment

Figure 2:
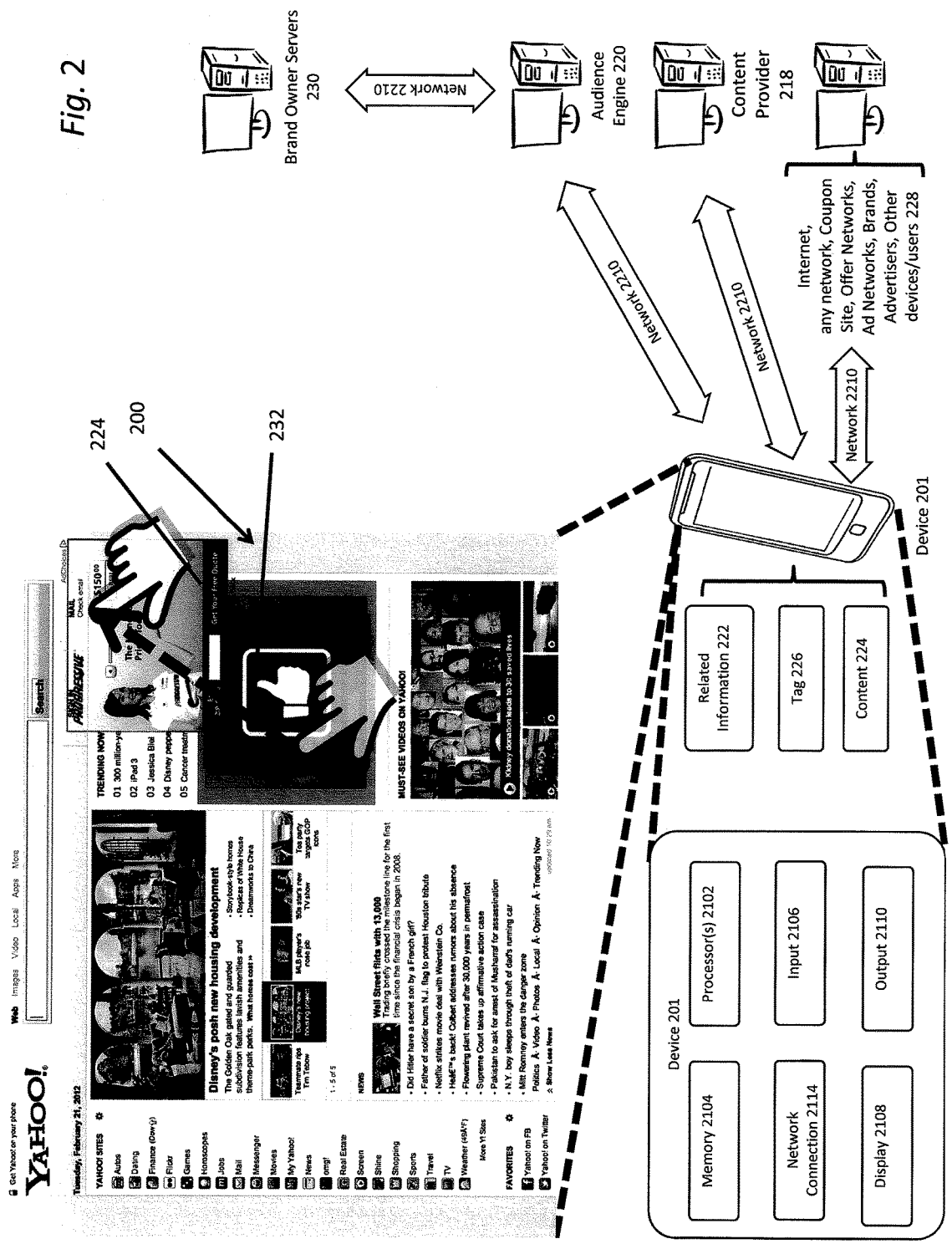
Figure 12:
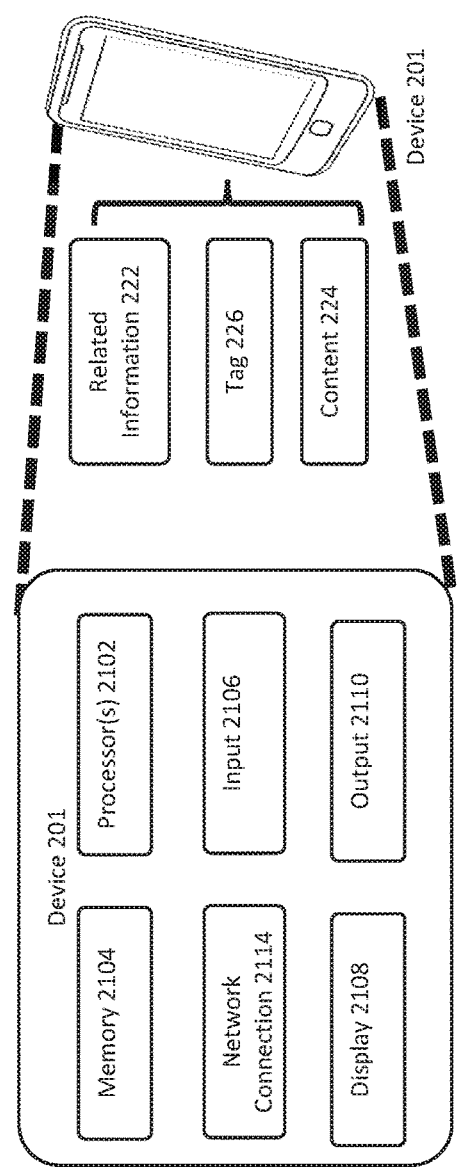
FIG. 12 illustrates a magnified view of a portion of FIG. 2.

FIGS. 2-6 and FIG. 12, illustrate one embodiment of a computing device 201 that is enabled to use Swote input. FIG. 2 and FIG. 12 illustrate device 201, which displays an exemplary screen illustrating an Ad Swote input gesture. Device 201 maybe connected by a network 2210 to a content provider 218, (that provides content such as the illustrated Swote enabled ad), audience engine 220 (that may store profiles) and the internet (that may provide a connection to any network, coupons sites, offer networks, ad networks, brands, advertisers and other devices/users 228. Device 201 maybe a smart phone or other computing device with a memory 2104, wired or wireless network connection 2114, display 2106 (e.g., touch screen), processor(s) 2102, input 2106 and output 2110. Network 2210 may be any network such as a wired or wireless local area network as well as the Internet.

In the example shown, a webpage, such as a webpage 200 from Yahoo.com has a number of content items displayed. The user performs a Swote gesture on one or more of the content items displayed by moving (optionally overriding a previously assigned drag and drop command) an image of the content item either up (to indicate a like affinity) or down (to indicate a dislike affinity). In the embodiment shown, content 224 representing an insurance ad receives a Swote up input by user by placing a pointing device such a mouse or finger on a touch screen or air gesture or pressing buttons on a remote control on or near the image of the content. The user then moves their finger up in the desired direction depending on how the user is performing the Swote gesture. In the example shown, the content is moved in an upward direction as indicated by the arrow 232.

In one embodiment, the webpage, an application screen, mobile application screen or other content is prepared (preconfigured) by the webpage author such as a content provider with Swote input enabling features such as gestures and indicia. In addition, characteristic tags (demographic characteristics and interest tags) and associated statistical probabilities can be pre-assigned to the content such as assigned keywords, probabilities etc. The website/content can also be configured to determine related tags via a taxonomy as well as display the available commands to a user and indicia to indicate which command was selected. Finally, the website/content can be configured to assign transmission instructions and associated information such as sending the discussed data above as well as a user's advertar ID to a remote device. In an embodiment discussed below, web browser plug-ins, web browsers, operating systems, and/or applications (including mobile applications) on local or remote devices, may automatically do some or all of these tasks for any unprepared content. Statistical probabilities and weights as discussed below may be either individual or indexed to the population or a combination.

As illustrated, a tag 226 (such as an affinity tag) is assigned by a user gesture to the ad 224. The information included in the tag 226 may reference, at least a portion of the content, identity or network address of the content and related information (see below). The tag information is sent to a remote server such as audience engine 220 or content provider 218 or another remote device to determine the meaning of the Swote gesture. In another embodiment, the meaning may be determined on device 201 itself. As used herein, an affinity tag can be any indication of a user's liking/disliking by such indications as a thumbs up/down, numerical rating, a relationship such as ownership or lack of ownership, would buy again or not would buy again, a neutral rating (which may be indicated by a swote gesture substantially horizontally to the left or right) etc.

Content displayed on a webpage or an application (e.g., a mobile application) such as ad 224 may be prepared for Swote input through the use of user input in the following operations. First, the user directs input such as a mouse hover input or a "touch and hold" input on a display such as a touch screen display on or near ad 224 which is a picture. In response to the input, it is optionally determined that related information 222 about the picture is available.

Related content information 222 may be located by a variety of ways. In one embodiment, the content on the webpage is related to other content via the webpage ancestry. For instance, a still from a movie next to or otherwise in close proximity to the ad 224 can be related by examining the webpage DOM (Document Object Model) and determining said relation. Information may be also be related if the same or similar tags (e.g., HTML tags) are associated to the information. In another embodiment, related information is information that has been frequently associated together by other users. In yet another embodiment, related information may be information that share the same or similar text/graphics/sounds/authors/domain of origin/topics/categories/titles or have been related by a taxonomy.

In another embodiment, related information can be found by examining links such as hyperlinks. The ad 224 links to a URL of the insurance ad provider in which further text and pictures are displayed to the user. This data which is linked to ad 224 by hyperlinks is related information. In addition, data links from file managers, social media, or any other link can be used as related information. Related information may be also found through following one link to another link. For instance, hyperlinking to the website that ad 224 is on and hyperlinking to a second story linked to that, increases a related information lineage.

In this optional step, in response to verifying that there are data links that reference related information, indicia such as shading the ad 224 can be displayed to the user indicating the content is available for Swote input. In other embodiments, animations, slightly tiling the ad to one side, "dog earing" a corner of the ad etc., may be used to indicated the content is available for Swote input. A menu displaying available commands such as a Swote up (positive affinity) input, Swote down (negative affinity) input, copy paste etc. can be displayed. Here, the user Swotes up on the content. In response to this gesture, a Swote up tag is assigned to the content. In addition one or more of the identity of the content, at least a portion of the content, a location pointer (network address, global address), tag 226 and any related information maybe analyzed locally or transmitted for remote analysis and integration into the user's profile. In another embodiment, the content does not need to be linked to receive a Swote input, for the content item to be shaded and/or swotable. For instance, a picture without related information may receive a Swote up gesture. In response, in one embodiment a portion of the picture, the identity of the picture (a reference to the identity) and/or a Swote up tag may be analyzed.

In another embodiment, a web browser plug-in, application or operating system (e.g., through the file manager) may be instructed to automatically enable content such as pictures, text, icons, ads, coupons and movies in a webpage or other application such as a file browser, media selection window (e.g., movie selection screen on Netflix™ or Roku Box™), contacts/friends window on a mobile device, a mobile device application etc., to receive Swote input (assign commands relevant to providing a reaction to the content) as well as optionally assign tags and probabilities to the content.

Figure 3:

In FIG. 3, ad 224 is shown with the user's hand or mouse cursor 300 above it. Indicia 302 notes that a prior Swote gesture input tagged the ad with a negative tag.

Figure 4:
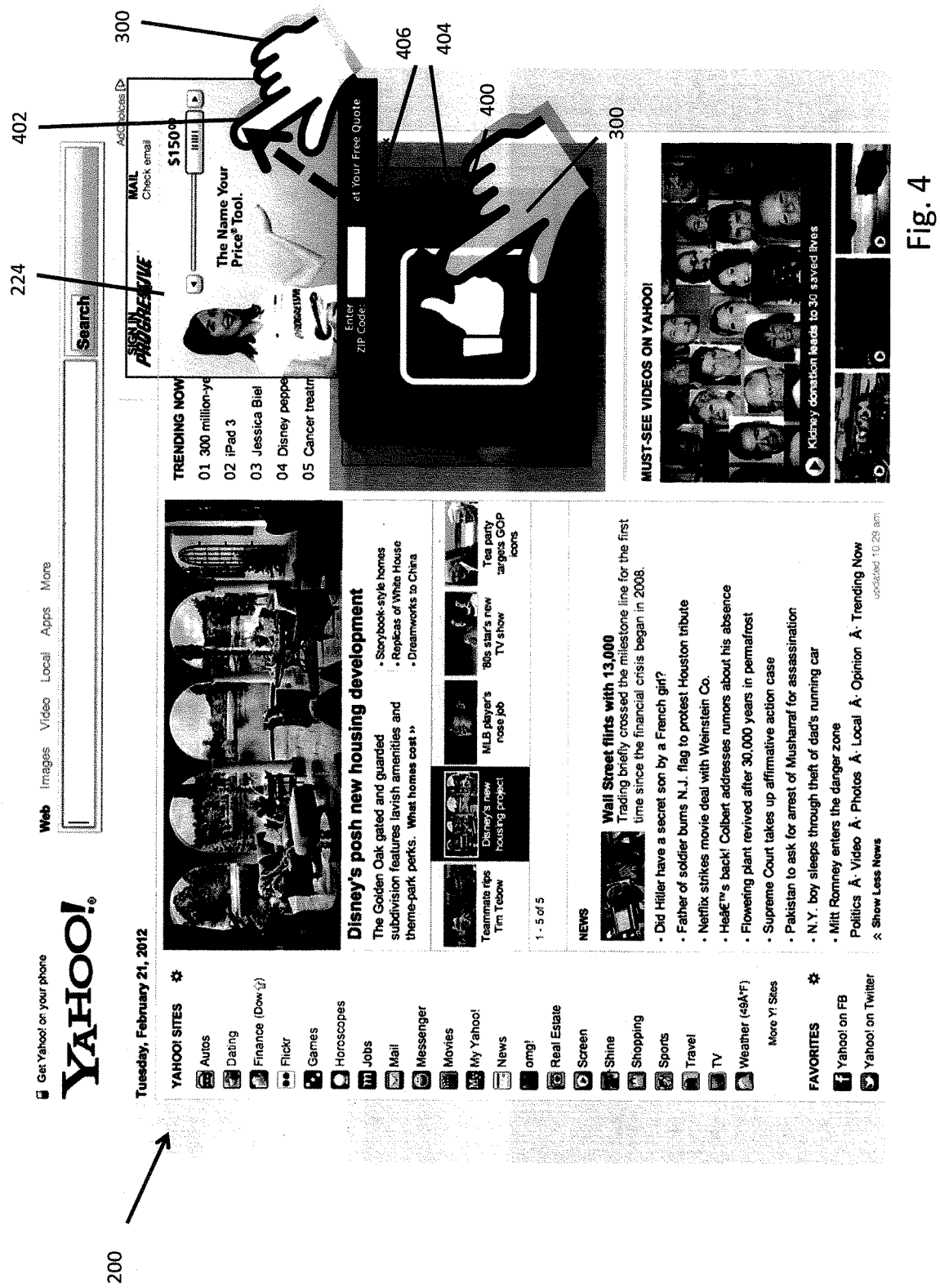

In FIG. 4, the user clicks the mouse or provides touch screen input, and selects the ad 224 at starting point 400. This selection of the content can be via various methods such as drag and drop via a mouse, finger, stylus, web cam movement of a body part, voice, air gesture, keyboard etc. Once the content is selected, pre-defined commands can be executed by the user which may include assigning a numerical rating, a relative rating (information relative to other pieces of content or information), a "like", "dislike", "neutral" rating or other rating systems to the content.

As illustrated in FIG. 4, command assignment based on a gesture like movement in an the angular direction from the starting point 400 to an end point 402 at which the user releases the content on the screen from the user selection. In another embodiment, this may be executed without a continuous selection and movement of the content is defined by an initial input point and a final input point.

In this embodiment, two commands are available depending on the angular direction where the user moves the ad 224. If the user moves the ad 224 in a substantially up direction as indicated by arrow 406, then a "thumbs up" preference is recorded and if a substantially down angular direction is input, a "thumbs down" preference is recorded.

Here, the user moves the ad 224 substantially up within a predefined range associated with a "Swote up" input command while maintaining selection of the ad in relation to the starting point 400 designated by the user's click or other input on the content. As this occurs, icon 404 is displayed as the command that will be selected. Alternately, and also optional, the original place on the web page that the ad occupied before being moved can be shown with a different representation of the ad.

Figure 5:

In response to the user deselecting the ad, the ad "snaps" back into its original starting point as illustrated in FIG. 5.

Icon 500 is shown to the user indicating a thumbs up preference was assigned to content 104. Icon 500 may be shown next to, on top of or in any other position in relation to the ad.

In another embodiment, the content remains static during the user input of angular movement while icon(s) indicating which of a number of commands or inputs will be given or applied to the content as it is being moved by the user, is overlaid or displayed in proximity to the content. In yet another embodiment, as the user drags the content, a menu is displayed that displays a plurality of the available commands (a portion or all simultaneously). In another embodiment, the user may press a key e.g., the SHIFT key to see a menu of commands that are available during input of angular movement. Here a thumbs up and down sign is displayed and the user may drag the content in the direction of one of these signs to execute the command. In one embodiment, in which multiple pieces of selected content with some commands in common and with other commands not, holding the SHIFT key will display only the commands in common to the user.

Once the user has completed a Swote gesture, a Swote tag 226 such as an affinity tag, the content the user input the Swote gesture on, as well as any other data that is linked to the content (related information) can be analyzed to determine or update likely demographic information about the user. This may include associated URLs, text, tags, the type of content, the content/category of data/users based that the domain on which the content typically attracts etc. The analysis can be performed locally or remotely and used to create or update a user's profile.

Information that may be useful in gleaning likely demographic information from the Swote operation which may also be analyzed can include contextual Swote information such as the time, date, user/advertar identity, device type, OS type, account information, location of the user when performing the Swote gesture, proximity of businesses, brands, friends and other information about the user, pre-assigned keywords, targeted demographics, browser history and other commands/tags associated to content such as: metadata, page source code, URL and related URLs, related files, data appearing on the same page or file system and related data such as links to other files, results from collaborative filtering, taxonomy data determined from analysis of the above data such as related categories/interests and marketing data/statistical probabilities related to the data above can be analyzed, etc.

In one embodiment, a user's profile or advertar is created or updated taking into account the information that can be gleaned from the user's Swote input of a particular content item. Information gleaned from the positive or negative Swote input of a content item (e.g., an affinity tag is associated to the content) is incorporated into the user's advertar by, for example, creating new tags with an associated demographic probability/interests and associated probabilities or supplementing existing tags. Various methods can be used to weight or otherwise consider tags in the analysis.

A webpage author may enable the Swote tools via a web browser extension or other tools such as a browser plug-in that manually or automatically parses, determines or interprets the data within the webpage, stream, etc. that is content enabled for interaction with the user. Also determined may be the type of content, the relevant commands based on the type of content or even relevant to the specific content itself such as adding sports specific commands for content about sports.

Software in the form of executable instructions are stored in a non-transitory computer readable memory such as memory 2104, which cause a processor to detect the selection of a brand image or content item and a gesture directed to a reflected brand or items of content according to one or more gesture rules. Once the user completes the Swote gesture on the brand/content item, the software then either computes likely characteristics associated with the Swote command or sends a notification of the Swote command and related information to a remote processing unit that does the analysis.

Swote tools may be used on any computing device and combinations of computing devices connected to each other and executed with a finger, stylus, mouse or other input method. Ads and advertar related information can be input and output to these devices from third party computing devices based on the information entered via the Swote tools and profiles. These Swote tools will operate/interoperate on any device/platform without "uglifying" the information presentation such as by placing unsightly "like" buttons on pictures.

Ad Swote Blocker Embodiments

In the examples illustrated, a Swote gesture in the upward direction inputs a positive affinity such as a "thumbs up" and in the downward direction, a negative affinity such as a "thumbs down". Other exemplary commands available by Swote gesture may include: copy, paste, vote up, assign metadata tag X of a Swote gesture, vote down, delete, email, SMS, post to social media, right/left/middle mouse input, keyboard input, hover input, stylus input, select, add to profile, add to interest graph, bookmark, put in/take out of shopping cart, buy, save, interact with, move content to X destination (e.g., a certain row in a brand sorting screen), find out more about, help, visualize past selection, set location, taking a picture of displayed content, never show me this ad again, not interested in this ad area, "I own this product" or "I don't need this anymore", show me similar ads, show me similar ads but not from this brand, show me other brands, a display of related keywords, a display of related topics, a display of related ads, show me ads from this brand, tell me more about the brand etc. and any combinations of the above. These and other commands may be associated with varying levels of user affinity. In some embodiments, a numerical or other ranking/voting may be assigned to the content.

In response to a user inputting via Swote gesture or other input such as affinity input (e.g., click on a like/dislike icon) that she has a negative affinity for and/or requested that the ad not be displayed subsequently, the ad may be blocked from being displayed to the user again or obfuscated from view. The blocking/obfuscation may be permanent or temporary. In the latter case, the blocking may be lifted and the ad displayed to the user again to determine if the user is still disinterested after a predetermined period or upon user input of a positive affinity on a related ad. Ads associated with similar characteristics such as from the same brand, keywords, tags, subject matter etc., may also be blocked and/or her interest graph modified accordingly to adjust related ads and characteristics accordingly such as with a negative weight. In addition, reverse brand sorting based at least on user blocking data may be used as will be discussed in detail below.

In one embodiment, upon input of a negative affinity about a first ad, a subsequent ad is immediately shown in place of the first ad. These subsequent ads may be cached on the client for faster loading times. The second ad is also Swote gesture enabled and this process may repeat as many times as desired. The second ad may be selected based on the input from the first ad, the user's interest graph or a combination thereof. The cached ads may be downloaded all at once and continually replenished. The ads maybe pre-configured to be displayed upon positive or negative response to an ad previously displayed. Specifically, certain ads in a plurality of ads are configured to be displayed upon negative input of a first ad. Such ads may be ads associated with dissimilar keywords, images, common websites/domains and similar URLs/URIs. This association may be either by tagging ads with this data or by using a separate file in which the ads are associated to characteristics. Upon sorting, a sorting engine or other tool may be used to select the appropriate ads in view of the sorted ad's characteristics. Other ads may be displayed upon positive user input such as ads with similar keywords. The cache on the local device may be configured with instructions to automatically cause these actions to occur. A local persona (discussed below) may also determine which ad is shown next.

Blocking may occur via a local web browser plugin, part of the operating system on the local device, part of a mobile application such as a mobile web browser. A plugin on a mobile device which displays ads among several mobile applications via a standard interface could be used to block the ads as could a remote server that will block/obfuscate/ not transmit/not associate the same or similar ads from being displayed to a user. A recording of the file reference identity of the blocked ads may be kept on the local device, remote server or a combination thereof.

Blocking may be done by blocking all ads with the same URL/URI as the ad the user requested be blocked. Various other techniques could be used. For instance, domains where the URL is hosted may be blocked, ads that are similar to the requested ad may be blocked as determined by identical or similar keywords/characteristics/authors, analysis of the pictures/video/sound e.g., the presence of a key frame, sound byte, size of the ad etc. may be blocked.

In one embodiment, all or substantially all ads are blocked by default until it can be determined if the ad has not been previously requested to be blocked by the user. This prevents lag that may be incurred during the determination. A placeholder image may be displayed where the ad is to be displayed until an ad can be selected and displayed. The placeholder image may be content the user could input a Swote gesture input or other feedback. Any content may be presented in which in which affinity input would reveal characteristics about the user. The user's interest graph may be examined to determine characteristics to be determined. Content with characteristic tags matching/correlating characteristics to be determined by then be show in the placeholder space.

In one embodiment, a device such as an audience engine server 220, content sever 218, brand owner server 230, user client device or any computing device may execute instructions in memory via a coupled processor. In one embodiment, an audience engine may be coupled to a client computing device 201 via a network 2210. The client may be configured to download a persona/interest graph from a remote device such as an audience engine.

The client device may include instructions to display an item of content to a user such as an ad, coupon, brand, offer etc. Here an ad may be displayed to the user on a display touch screen. The user may then input an affinity selection pertaining to the item of content displayed on the touch screen with a Swote input gesture. Indicia may be associated to the content indicating it is selectable. Input may be done by finger gesture, mouse cursor or other tools. Specifically a user may input selection and in response the client detects when a user moves a touch point on a display screen (e.g., a touch screen) in a predefined direction over the content— e.g., a Swote up input gesture may infer a positive affinity.

If the user inputs a negative affinity selection, then the device may detect the negative selection. In response, a reference to an identity of the ad is recorded so that the ad may be blocked or obscured from the user if subsequently sent to the device or the ad is loaded from local memory storage. The record may be associated with a negative affinity tag or stored in a directory in which instructions are configured to not subsequently display ads recorded in said directory. These steps may be executed/stored remotely or on the client device. For example if this happens remotely, on the audience engine for example, the user's interest graph may be modified accordingly in response to the client device's transmission of the identity reference and request to block/obscure the ad (e.g., negative affinity tag). Alternately, a file of blocked ads is kept in association to a user/persona. Each time an ad is queued to be displayed to a user, its identity may be crosschecked to this file and the ad may be blocked/obscured.

In addition, subsequent ads displayed may be associated to characteristic tags that are substantially dissimilar to characteristics associated to the ad that received negative affinity. For instance, in response to detection of a negative affinity there is an integration of the ad affinity, the ad's characteristics tags and optional probabilities (in view of a negative affinity) into the user's interest graph. For instance, characteristic tags and probabilities associated to the ad may lower probabilities in related characteristics and probabilities in the user's interest graph. This updated interest graph is used to decide which new ads with particular characteristics will be shown. Since a user may not like characteristic X as reflected by a updated probability in her interest graph, at least one substantially dissimilar characteristic may be chosen instead of characteristic X. Similarity/dissimilarity may be determined by taxonomies, marketing data, social trends etc. In one embodiment, ads with at least one characteristic in common with the ad receiving negative affinity are not displayed.

In a like manner, subsequently displayed ads may be associated to characteristic tags that are substantially similar to characteristic tags associated to the ad that received positive affinity (in view of a positive affinity). Also in a like manner, subsequent ads displayed may be associated to characteristic tags that are substantially similar to characteristics associated to the ad that received neutral affinity.

If the user inputs a positive affinity selection, then the device may detect the positive the selection of the content. The input may cause an affinity tag to be attached to the content or a reference to the content identity in the form of a record of the gesture input—here a positive affinity gesture (an affinity tag). The client may transmit this selection to an audience engine or process it with the interest graph locally. In a manner similar to the negative affinity case, characteristics associated with an ad viewed positively may increase probabilities of similar characteristics in the user's interest graph.

If the user inputs a neutral affinity selection, then the device may detect the neutral the selection if the content and execute steps similar to the above. The neutral affinity and related ad characteristics may also be integrated into a user interest graph remotely or locally.

In response to a user affinity input, the content may be displayed in association to indicia indicating that an input has been input in association to the content. This may be a thumbs up or down or any other indicia as shown in FIGS. 3 and 5.

The steps above may be execute on the audience engine, client or any combination of other computing devices e.g., Internet, any network, coupon Site, Offer networks, ad networks, brand advertisers, other users/devices 228.

Ad/Content Preparation

An ad may be prepared for the use(s) described above in a variety of ways. In one embodiment, the ad such as a picture or video may be stored on a third party server, an audience engine server, a local device or other computing device. The ad may be assigned an identifier such as a URL/URI. Keywords and other properties of the ad such as category of ad, target demographics, appropriate display triggers such as time, location, date etc. may be associated with the ad. In addition, associated characteristics and statistical probabilities for these may be assigned e.g., ad Y is likely to appeal to 70% women and 30% of men with +/−5% error.

The availability of the ad is published to ad servers and other devices and optionally along with the data above, which aid in matching the ad to the user of a device with an appropriate interest graph. Matching an ad to a device user's interest graph (e.g., a component of an interest graph such as an interest node) may done via a distance calculation as discussed in the above referenced applications. In other embodiments, initially when a user lacks sufficient interest graph information, no ad matching may be done and a random ad may be chosen.

Upon ad matching, ad display may be in response to user input such as a related search query, browser web page access etc. The ad may be pre-configured or configured upon display with various commands such as an appropriate command to express affinity (e.g., "like/not like", "never show again") along with a plurality of other commands.

Upon matching of an ad and interest graph, the ad may be configured to accept a Swote gesture input or may have been previously configured. Upon input of an affinity command, the data associated to the ad along with optional contextual information such as the time/date/place, Domain Object Model information, associated keywords etc., may be integrated into the user's interest graph and weighted and otherwise integrated as desired. Association may be either done locally on the client or remotely on a server. In one embodiment, the ad ID is returned with the affinity tag to a content server or audience engine. Upon receipt, the ad is associated to keywords (if not previously associated with keywords) and other associated data for analysis and incorporation into the user's interest graph. Once, the interest graph is updated, the search engine's results and ads the search engine may return may be modified based on the updated interest graph.

The ad may be configured or otherwise displayed by a web browser, website or other application to indicate that it is configured for gesture input such as a Swote gesture. For instance, indicia, animation or a change in orientation of the ad/content may provide user notice. For instance, a substantially square shaped ad may appear oriented at an angle off its center axis (e.g., slightly tipped) or other substantially noticeable display difference of the ad from how it is typically displayed. In one embodiment, the ad which received a negative gesture input may be subject to indicia or different display, yet still be recognizable to a user while still being configured to accept gesture input. For instance, an ad may be covered with a 90% alpha layer which make the ad substantially harder to see (e.g., obscures it). The ad may also blocked from user view completely or not displayed at all. However, upon user input of a gesture such as a negative affinity gesture, the resulting weight of the affinity tag may decrease substantially more than an initial negative input. This is because if a user "went out of her way" to add another negative input over the already obfuscated ad, the user most likely views the ad in a substantially negative manner.

In one embodiment, ratings similar to Nielson™ ratings may be created for ads which may provide feedback information to advertisers/publishers. For instance, upon return of the ad feedback, various items may be reported to advertisers or other entities interested in receiving ad feedback. For instance, the ad effectiveness (affinity) and which characteristics of users that have found the ad positive/negative may be reported along with other details such as interest graphs, date/place/time of those with positive and negative affinity etc. Feedback enables ads to be refined such as making the ad more entertaining, refocused onto other demographics that were previously not focused on, and identifies of users that are the best fit to advertise to etc.

In one embodiment, advertisers may bid on an ad space previously occupied by an ad that received an affinity input. For instance, in response to an affinity input, a first ad is taken out of user view and the space occupied by the ad that is auctioned based upon the previous ad and/or the affinity input.

In another embodiment, advertiser's who place ads that receive substantially negative affinities from one or more users may be monetarily penalized. Specifically, if a user consistently inputs negative affinity to either the same ad or ads that have characteristics in common from an advertisers, an audience engine or other entity determining which ads may be shown may charge the advertiser more funds to repeatedly show the same or substantially similar ads to the user in any context such as in the same position on a webpage or mobile application.

Tools for Leveraging Pre-Existing Data

Leveraging preexisting data such as a user's age, gender, credit card spend-graphs and other data could offer valuable insights into customers. Many entities such as search engines, advertisers, merchants, credit cards, credit rating agencies, social media, merchants, telecom companies, cable companies, technology companies, mobile device manufactures and financial institutions etc., currently store significant amounts of pre-existing data about their customers. Preexisting data is an untapped valuable resource for any entity that could benefit from a more precise determination of specific customer characteristics/interests/demographics (herein characteristics). Specifically, preexisting data allows customer characteristics to be statistically determined, which enables several uses including the targeting content to a specific user.

Preexisting data, can in one embodiment, be used to create or augment an interest graph associated with a specific user or Advertar for advertising and other purposes. Specifically, the preexisting data may be used as a basis for selecting content such as brands tailored for that specific user. Said brands are then optionally presented to the user for sorting. Based on the user's indication of their opinion of the brands, such as if each brand is liked or disliked, characteristic tags and values associated with each brand can be combined into a composite value that reflects that likelihood that the user has a particular characteristic. This is discussed at length in applications that are incorporated by reference and Appendix A. Also previously discussed, are tools involved in creating/modifying a profile/interest graph in response to user brand sorting.

Figure 6:
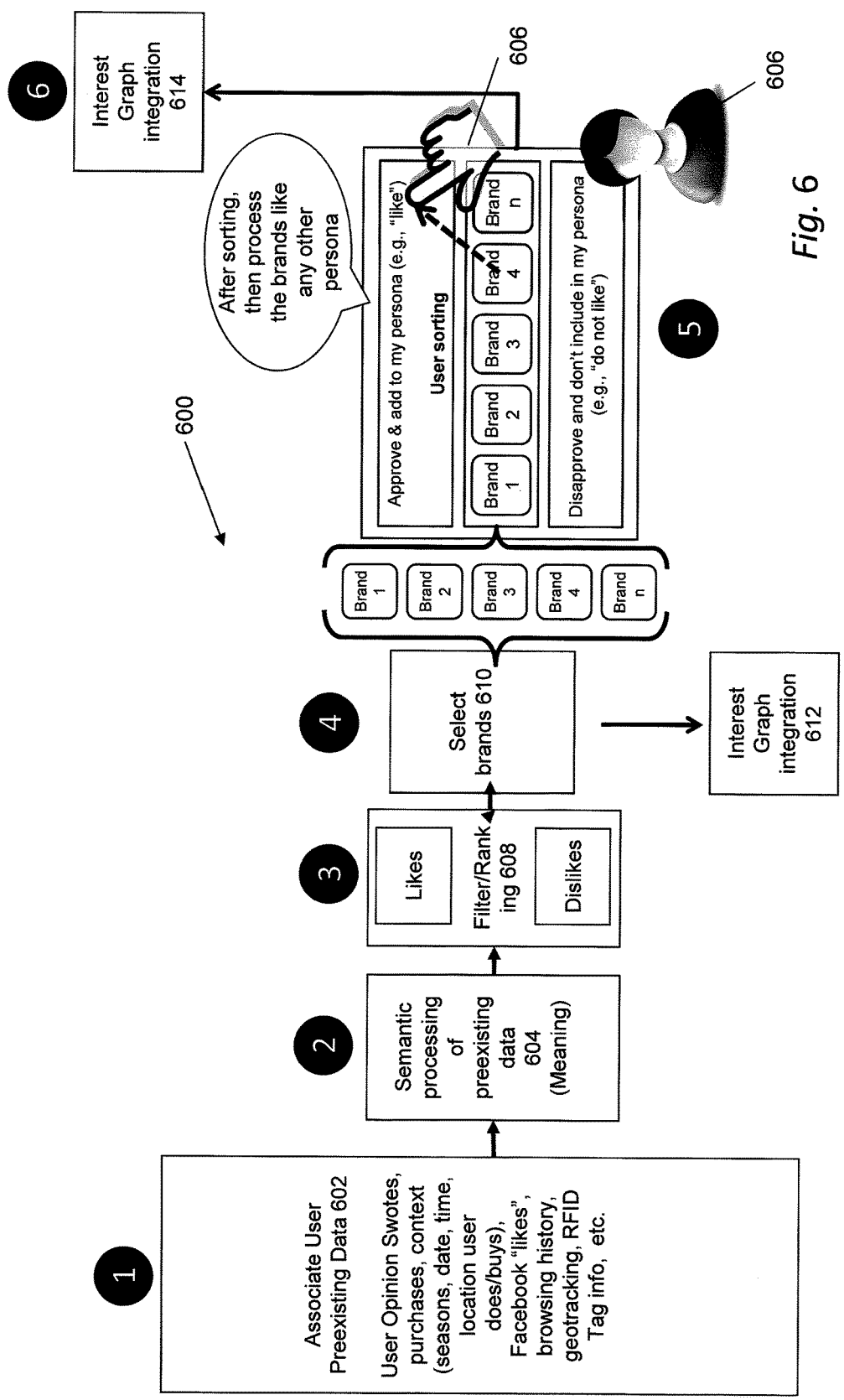
FIGS. 6-8 illustrate an embodiment of a consumer self-profiling tool using preexisting information and reverse brand sorting in accordance with an embodiment of the disclosed technology.

FIG. 6 illustrates exemplary operations 600 performed by a programmed processor to leverage preexisting data to discover probable characteristics of a user via reverse brand sorting. At operation 1, pre-existing data associated with a user or group of users (aggregated data or anonymized data), may be used to select brands to be sorted by a user (reverse user brand sorting) via matching preexisting data tags and brand tags. Said brands may be selected by probable/related user characteristics (represented by characteristic tags associated to brands) based upon an analysis of the preexisting data (preexisting data tags) and presented for user sorting at operation 5.

As illustrated, combining and tagging preexisting data (by various methods discussed below) commonly stored by Customer Relationship Mangers (CRM) such as demographic data, contextual data such as current or past GPS locations and brand exposure (brands purchased or purchased from) can produce a profile of likely user characteristics via the meaning of the data. From said meaning, content such as brands maybe selected and presented for user sorting which may augment/create a user interest graph associated with a user profile. From this, a prediction such as a purchase intent among others may be computed by tools discussed in the above, referenced applications.

The illustrated operations 600 in FIG. 6, of "reverse brand sorting" or "User-Opt-In CRM" may also reduce possible feelings of uneasiness caused by the demographic profiling of a user. Specifically, these operations may reduce the overt use of preexisting data from the consumer point of view. More specifically, preexisting information associated to a particular user may optionally be used less than transparently to select personalized brands for a user to sort. For instance, the consumer may not be explicitly told that her preexisting information is being used to select brands. Upon reverse brand sorting, a resulting set of highly personalized content such as offers, coupons etc. is presented as a result of user sorting. From said operations, the consumer attributes the accuracy of offers to her action of sorting brands and not the use of preexisting data, which was the basis of selecting the brands to be sorted in the first place.

For instance, a CRM may have very detailed information such as spend graphs, location of purchases, real time location of a user's mobile device, time of purchase etc. Reverse brand sorting permits leveraging of this privacy sensitive data via the obfuscated use above to prevent undue user concern.

As illustrated in FIG. 6, Operation 1 may comprise any available preexisting data 602 as discussed in sections below. Here, the preexisting data associated with a user or a group that user belongs to, may be associated with a profile or specific interest focused Advertar comprising an interest/social graph. The user's data may then be stripped of any identifying data such as non-aggregated data, or be anonymized by associating a secret unique identifier to be used as an intermediary between the actual user ID and preexisting data.

Operation 2 (which computes the data from operation 1) determines the "meaning" of the preexisting data. Semantic processing/tagging 604 may be used to find the meaning via a taxonomy and inference such as by programmatically ascertaining contextual meaning, social media trends etc. Other tools may be used such as presenting the data from operation 1 to a human who manually tags meaning to the information are discussed below.

Figure 7:
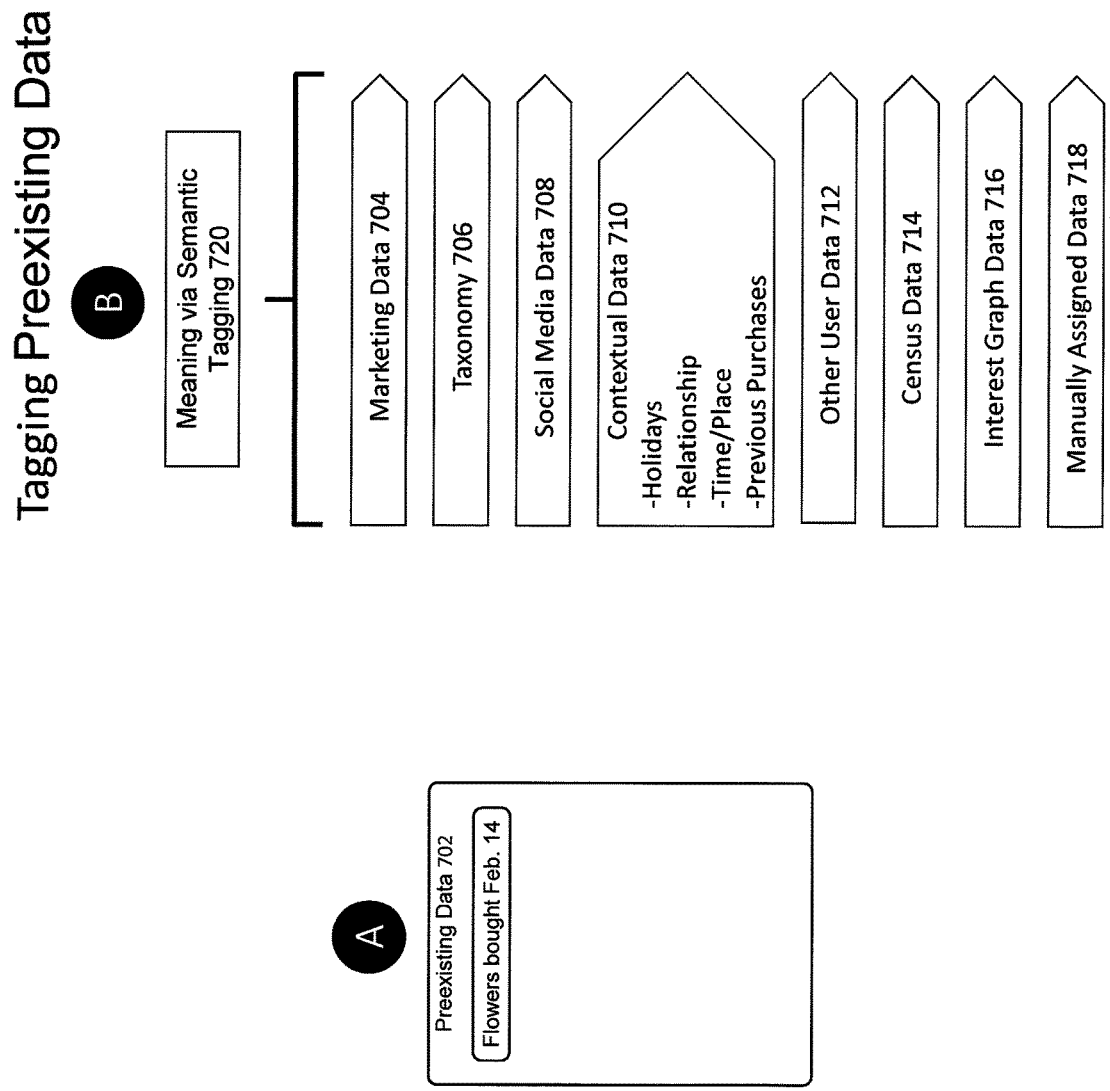

In one example, the meaning of the preexisting data may be assigned by programmatically tagging or otherwise associating the preexisting data with predefined tags as illustrated in FIG. 7. For instance, if the consumer is associated with preexisting data comprising Porsche™ related purchases as reflected by her CRM credit card spend graph, this preexisting information (as well as optionally her profile/interest graph) may be tagged as "affluent" via a taxonomy and/or marketing data. As such, further use of taxonomies and marketing data may now expand that likely characteristic and associate additional likely characteristic tags such as most likely making over $1 million dollars a year, over 40 years of age, a person who owns an expensive home, likely owns Rolex™ Watches and other characteristics and associated statistical probabilities to the preexisting data and/or her profile. This "meaning" created by the above resulting semantic trees increases the relevancy and the scope of the tags which may be used to confirm and explore user characteristics.

Operation 3 may rank/filter the preexisting data 608. This may be executed by asking or inferring user affinity of preexisting information. In one embodiment, a determination is made based on if the user has previously rated (or otherwise input affinity information) in regards to preexisting data gathered at operation 1. For instance, the user may have previously input a Swote affinity gesture on or otherwise rated a piece of preexisting data. This may be content such as a picture or the user may have "liked" or executed a Swote gesture on a brand on Facebook. As a result, this data may be prioritized/weighted more than other data during brand selection.

In one embodiment, the consumer may be asked to SWOTE or otherwise express an affinity or a desire related to the weighting of preexisting information before operation 4. For instance, if a user ranks the Walmart logo highly, then the Walmart and related characteristics as determined by a taxonomy/marketing data, actions the consumer took at Walmart, data hyperlinked to Walmart information, purchases made at Walmart etc., may be weighted differently relative to other preexisting data. As such Walmart data may be ranked are more relevant to the consumer in relation to other brands. This feedback may then be sent back to operation 2 for other tagging to determine further meaning. The user may also be given the option of deciding which preexisting data is used subsequently for reverse brand sorting. In another embodiment, the tags from operation 2 may be presented to the user for affinity rating and/or permission for inclusion in determining brands and selection into her interest graph.

Ranking and filtering of the preexisting data may be inferred from user actions as well. In one embodiment, if a user frequently brings a mobile device to a certain location like a Starbucks™ a positive inference may be assigned to that specific Starbucks location and/or brand. This user feedback can weigh or rank related preexisting data by taxonomy and marketing data etc. In one example, since a user frequently goes to Starbucks and buys breakfast sandwiches, via a taxonomy/marketing data, a positive inference via a weight or ranking relative to other preexisting data can be made to Starbucks breakfast sandwiches (because of the frequency of the user action), and most likely coffee as well since most people who go to Starbucks buy coffee with their breakfast sandwiches. During operation 4 as discussed below, brands can be selected to explore/confirm these inferences.

Ranking and filtering of preexisting information via user affinity during operation 3, gives the preexisting data further user context, relevancy and meaning to the information collected in operation 1.

Operation 4 may select brands 610 using data at least from operations 1-3. Brands may be reverse selected for a plurality of objectives. For instance, brands may be selected to confirm interest or the possession of a brand or characteristic. For instance, if the user's preexisting information contains a relatively small probability that the user is affluent, a brand may be presented whose selection may support affluence. For instance, a positive interest in Tiffany's™ will support an inference that the user is somewhat more affluent as the less affluent users will likely not even recognize the brand logo much less have an affinity toward or against it. Brands may also be selected to explore a user's interest as explained below.

Figure 8:
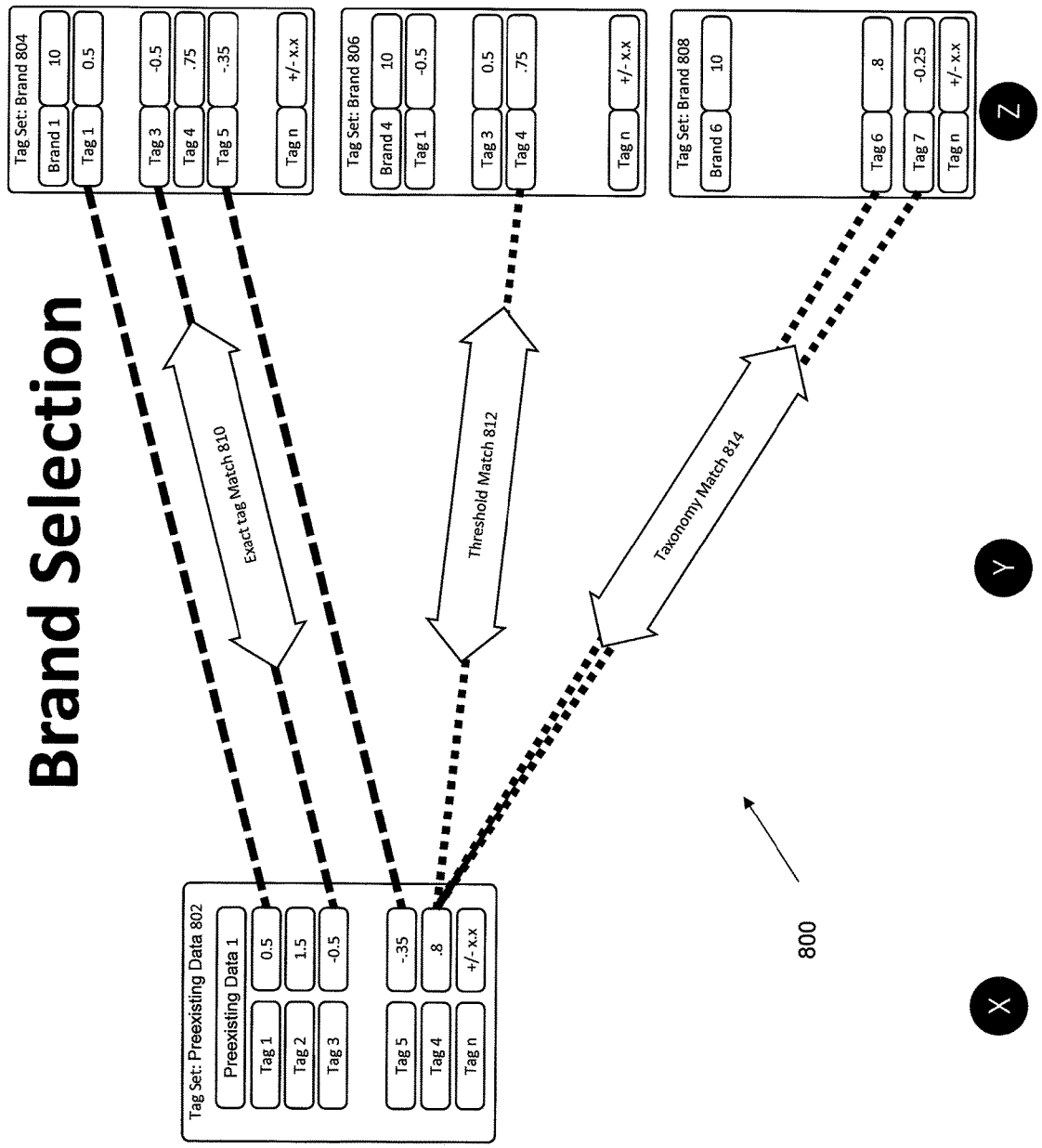

As discussed further in relation to FIG. 8, preexisting data 802 and associated tags and optional probabilities may be matched/associated with brands through a variety of tools. Typically, a correlation between the tags and probabilities of the preexisting data 802 and brands 804-808 are examined. Through various selection tools and the particular brand selection objectives desired, this correlation may be used to select brands to present to the user and/or supplement an interest graph.

In one example, that seeks to confirm a user characteristic, preexisting characteristic tags may be examined. Here, from the data received from operations 1-3, an inference is made that the user is potentially affluent via an affluence preexisting data characteristic tag. In turn, various related brands that also have been previously associated/tagged with affluence and probabilities may be selected and presented to the user for sorting via their tags and probabilities in operation 4.

Specifically, brands may be selected to further confirm characteristics such as affluence, which may be determined by further determining the same/similar characteristics as well as related characteristics such as an income range, further determine the type of affluent goods/service the user is interested in etc. This may be done by first selecting the desired characteristic to be confirmed. Then brands that are associated with the same or related characteristics (e.g., via marketing data/taxonomy) may be selected. This may also include consideration of associated statistical probabilities.

One method to select brands is to select brands associated with characteristics that have statistical probabilities that substantially determine characteristics better relative to other brands. For instance, interest in the Porsche brand is likely a more accurate predictor of affluence than an interest in Wonder Bread™. Here, the affluence tag associated with Porsche is associated with a substantially high statistical probability of affluence based on marketing data. Porsche is also associated with other tags that may indicate affluence as determined by a taxonomy such as high income, large house etc. In contrast, the affluence tag associated with Wonder Bread™ may have a low probability of affluence. In another instance, Wonder Bread may not even be associated to an affluence tag at all and would thus not be selected. Other tags associated with Wonder Bread may also infer a low probability of affluence given related tags such as budget car, K-Mart™ Shopper etc.

In one embodiment that seeks to explore a user's characteristics and thus expand her interest graph, a set of desired characteristics (e.g., affluent, age, gender etc.) may be sought to be determined. In one embodiment, if the desired characteristics are known, the confirmation may happen as above. If it is not know what characteristics may be related to a user, then preexisting characteristics tags may be explored as below.

Specifically, preexisting characteristic tags may be related to brands via taxonomy, user trends, model users, known users etc. With these likely new characteristics in mind from comparison, brands are selected from brands whose sorting would contribute substantially to achieving these goals. This may comprise first selecting and then determining the new characteristic tags via taxonomy/marketing data or other tools. Then the brands associated with the new tags may then be selected for user sorting.

Selection of the brands may be based upon a substantially high signal to noise ratio of the probability associated to the characteristic to be explored in relation to other brands. For instance, a user interested in BMW™ cars and Tiffany's™ jewelry (with preexisting characteristic tag of affluence) may also be interested in upscale cookware. This probability may be suggested by marketing data or other tools such as a taxonomy or social media trends. Here, the Williams Sonoma™ brand has a substantially high probability of being associated to the characteristic tag of upscale cookware in relation to other brands such as Wonder Bread. Thus, Williams Sonoma Cookware brand or content may be presented for user sorting to determine if there is an interest in areas besides upscale cars and jewelry related to affluence.

An arbitrary number of brands for these desired characteristics may be selected for user sorting by calculating a desired combination of brands which in combination will best illicit a response from a user to determine the desired characteristics. For instance, the Military Channel logo may be chosen because of its relatively high conclusive probability relative to other brands in determining gender and Porsche can be used to explore affluence for the same reason. In addition, brands can be selected based upon the properties of other brands. For instance given the previous two brands, a third brand can be selected to compliment the gender/affluence determination as affluent males are often interested in race car driving lessons. As such, a brand associated with a race car driving lesson brand is selected for user sorting.

In one embodiment, only brands that the user has purchased, viewed, otherwise interacted with or has preexisting data related to, are presented for sorting. In another embodiment, only brands that the user has not interacted with are presented for sorting. A combination of these embodiments may also be used as well as including newly selected brands.

In one embodiment, different types of brands are presented: brands a user has shopped at (e.g., as determined from her spend graph or other preexisting data) and brands which are similar or otherwise related by characteristic, location, user trends or other relationship. The former brands are selected to confirm user interest and the latter brands where selected to explore related brand/characteristic interest.

As new preexisting data is acquired from the user, this data may supplement the user interest graph/profile and subsequent reverse brand sortings can be based off this new data.

Figure 19:
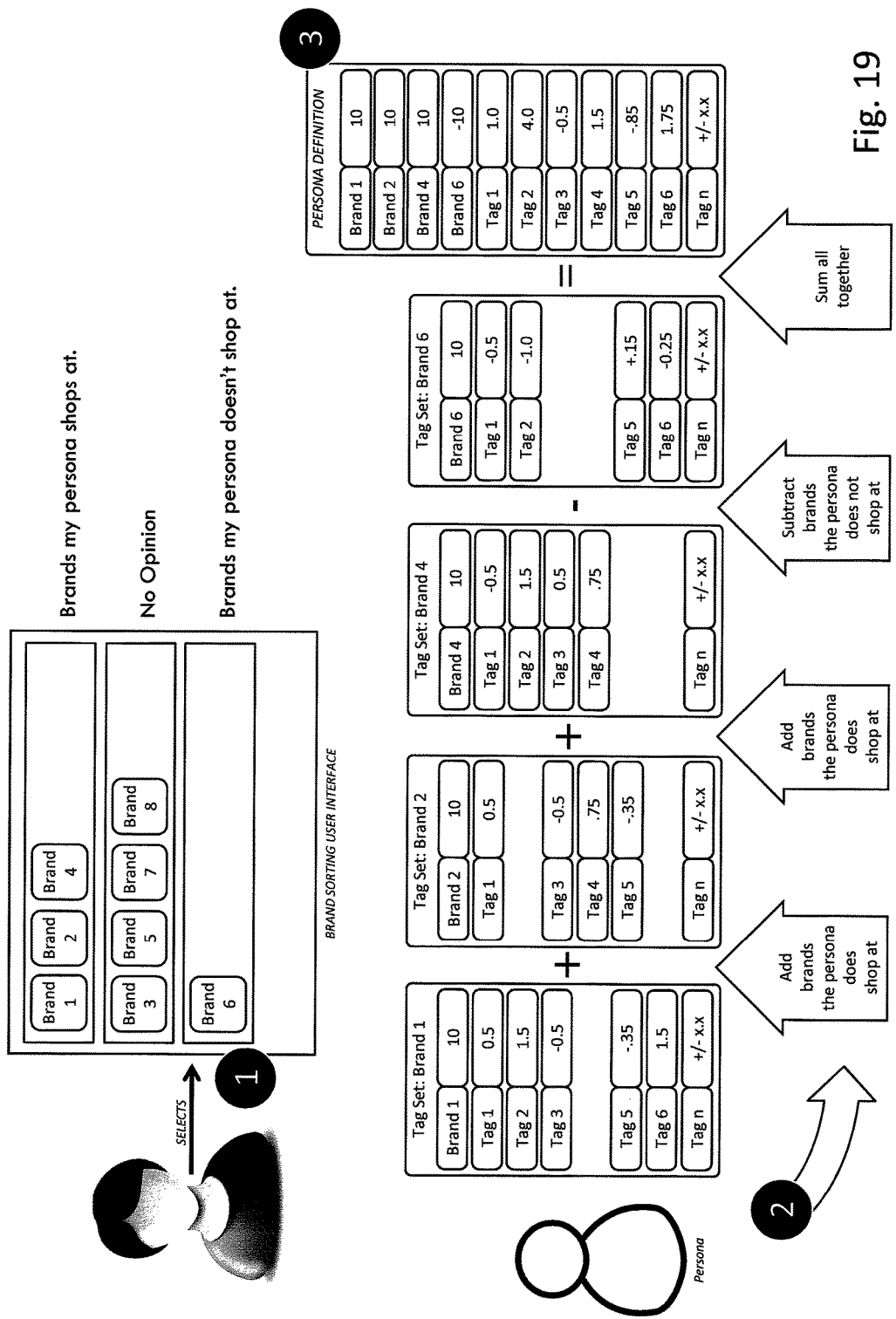

In operation 5, the selected brands are presented to the user 606 for approval/sorting via a brand sorter as illustrated in FIG. 19. The user can then select (e.g., drag the brand up into the graphical area "approve & add to my persona" (e.g., Like the brand) or deselect and move into the "disapprove and don't include my persona" (e.g., don't like the brand) or weigh down the brand and associated characteristics and probabilities. After user brand sorting, at Operation 6, incorporation of the brands into an interest graph 614 at and targeting of content such as ads to the user 606 is discussed in previous applications at length. Swote input may also be used to sort/approve the brands.

In one embodiment, operation 5 may be omitted and operations 1-4 could select brands, their associated characteristics and probabilities and incorporate them into a user interest graph. Ads could then immediately be served based on the reverse selected brands without the user immediately sorting the brands. In one embodiment, the brands may not be immediately shown or shown to the user at all for sorting. At 612, the data calculated above may be integrated into a user interest graph for ad targeting or other purposes. With this embodiment, brands such as brand logos could be intermediately introduced among the ads presented for a user to sort in order to gradually answer user affinity via ad and brand sorting. As brands are sorted, the user's interest graph may be updated and in response, new ads and brands are selected and presented.

In addition to brand logos (e.g., the BMW logo), interests, movies, coupons, deals, ads and other content that are likely to be relevant to profiles associated to particular characteristic tags (for example ads that share similar tags) may be presented to the user for sorting or otherwise advertised to the user.

Reverse Brand Sorting Embodiments

As discussed above, Operation 2 in FIG. 6 assigns "meaning" to the preexisting data received from operation 1. Meaning may be determined via semantic tagging 720 to create an underlying semantic tree for the preexisting data. FIG. 7, illustrates exemplarity tools that may be used alone or in combination to assign meaning to preexisting data.

As illustrated in FIG. 7 in tools 700, in operation A, preexisting data 702 such as a user's purchase of flowers on February $14^{th}$ is optionally associated with a user profile/interest graph and prepared to receive tagging. In operation B, a variety of tools may be used for semantic tagging. Operation B seeks to create an underlying semantic tree for the preexisting data. More specifically, operation B may seek to understand what the preexisting data means for a user by adding context tags and exploring the scope of the preexisting data. As illustrated, exemplary tools include various methods of adding tags to preexisting data and optionally assigning statistical probabilities to the tags.

In one embodiment, marketing data 704 may be used to add tags. Examining marketing data here reveals that purchasing flowers on February $14^{th}$ is typically done by males as opposed to females. Thus, a "male" tag is associated to the preexisting data. An associated probability (here a value of 2) is assigned to the male tag as on marketing data.

The purchase is then tagged using a taxonomy 706. Here, a taxonomy associates and tags the flower purchase on February $14^{th}$ with a "candy" tag and an associated probability of 1.5. Here, a taxonomy reflects that candy is commonly purchased with flowers on this date. Other taxodermic tags such as Valentine's Day cards, specific brands/kinds of candy, undergarments, expensive meals and other products/services/stores that are related may be tagged as well.

The purchase may also be tagged with demographic/descriptive tags such as likely properties of the buyer via the taxonomy or marketing data. For instance, buying flowers on February $14^{th}$ may via taxonomy be associated with the characteristic of being "forgetful". This may in turn affect the probabilities of other tags such as the "male" tag as males historically tend to be more forgetful of holidays as opposed to females. For instance, the combination of "male" and "forgetful" may increase the probability of the male characteristic tag. In addition, this combination of tags may also trigger a subsequent related tag such as "frequently in need of buying jewelry at random times" or "may benefit from a reminder mobile device software application".

Social media data 708 may also provide meaning. For instance, the purchaser's social media page/account or other information may be "screen scraped" for information such as his contacts, Facebook "likes", comments, comments from others, interests etc. A record of a flower purchase in combination with this social media data may reveal a potential probability of the existence of a "significant other" and details about him/her. In one embodiment, purchaser's social media page may disclose that the purchaser is in a relationship and the probable identity of the other person. A "relationship" tag and associated probabilities may be assigned. The other person's social media page may be examined and from that, various tags may be assigned to the purchaser's interest graph such as the significant other's brand preferences for gifts and other tags that may apply to the purchaser such as the significant other's preference for Tiffany's jewelry.

In addition, the purchaser's significant other and other contacts may also have their interest graphs modified based upon said flower purchase via the tools disclosed. For instance, the significant other's interest graph may have the flowers characteristic added to her profile. Related taxonomy characteristics may also be added such as candy etc. In addition, given the contextual data below, a reciprocal gift fitting the characteristics of the purchaser's interest graph may be suggested to the significant other.

Contextual Data 710 may also contribute tags. These may consider holidays, time/place of purchase (which may also consider proximity to other places such as to work/home), frequency of purchase etc. Here, the purchase of flowers on February $14^{th}$ suggests a high probability of a Valentines Day purchase for a significant other. In addition, since the purchase was made at 7 PM on February $14^{th}$, this may further infer a "forgetful" characteristic. In addition, given the late time of day of the purchase, it may also affect probabilities such as the probability of being in a relationship subsequent to February $14^{th}$. This may be accomplished by examining the tags and relationship histories of similar users in similar contexts such as the place of the purchase, previous purchases, affect of actions in relations to other users and their interest graphs etc.

Other user data 712 may also contribute tags. For instance, the purchaser's calendar or others calendars may be examined. For example, a reminder "don't forget flowers again this year . . . again" maybe found in a calendar along with a reminder for dinner with his significant other, and an appointment for a Britney Spears concert scheduled at 7 PM on February $14^{th}$. In addition, it maybe found that Britney was emailing purchaser about Tiffany's jewelry on February $13^{th}$. This information may be combined with social media data 708 and contextual data 710 to examine Britney's social media page for Valentines Day related data and subsequently add those tags to the preexisting data/the purchaser's interest graph. In response, the purchaser is fed ads for both Tiffany's jewelry and flowers. Other user data sources may include the user's email, RSS feeds, travel/dinner reservations and other data related to the user.

Contextual Data may also be used to rank/prioritize content presented to the user such as consumer purchasing trends. For instance, during the week preceding February $14^{th}$, ads related to Valentines Day may be presented at ever increasing frequency. In addition, an actual purchase of a related product/service may be recorded (e.g., part of preexisting information) and added to the purchaser's interest graph. In response there is a decrease of related content presented and/or suggestions of other related content presented to the user. Contextual Data may also be used as a reminder for recurring events such as a flowers purchase for Valentine's Day next year which may be optionally contingent upon purchaser's interest graph having a substantial probability of still being in a relationship or other reminder dependent condition.

Other user data 712 may comprise the purchaser's browsing history or those of his friends/family; past purchases; medical history; Facebook likes; screen scrapped data; spend graphs or other preexisting data. Other user data may also comprise the context of data, such as location of the data (e.g., data the user has input an affinity toward) within a webpage in relation to other data as determined by a Domain Object Model, hyperlinked data (as discussed in previous applications) etc. which has been discussed in the referenced applications.

Census Data 714 such as that reported from the United States Census may also be used. This data may include gender, age, social economic and other data which may give context to the preexisting data.

Interest Graph data 716 may also aid in tagging. Interest graph data may be compiled from existing data in the user's interest graph or other user's interest graphs such as data from other users with similar preexisting data such as trends e.g., users with relationships with the purchaser of flowers.

Manually assigned data 718 may also be used. In one embodiment, a human user may manually assign tags as he/she thinks is appropriate to the preexisting data and/or he/she may supplement/correct tags assigned by previously mentioned tools.

In operation C in FIG. 7, the preexisting data 702 is illustrated as tagged which may include associated probabilities. Said probabilities may be assigned in any variety of methods and using any desired value ranges and may consider the preexisting information and/or other tags assigned in operation B. This data is then associated or incorporated into the user's interest graph.

FIG. 8 illustrates, the reverse brand selection 800 as introduced in operation 4 in FIG. 6. Here, preexisting data 802 may be matched/associated with brands in a plurality of ways. These comprise exact matching 810, a threshold matching 812 and a matching via related characteristics 814 (e.g., via taxonomy).

The first tool that may be used to match preexisting data to brands is exact matching. Brand 804 was selected based at least on preexisting data 802 and its associated characteristics assigned in operations 2 and 3 in FIG. 6. Optionally the associated preexisting and brand probabilities may also be considered during matching. Here, the tags associated with preexisting data 802 (Tags 1, 3 and 5) match the tags associated with brand 804. Any desired number of tag matches may trigger brand selection. Here, both the probabilities of the preexisting data and the tags matched exactly. Any combination of exact matching and non exact matching between characteristics and probabilities may be used.

Brand 806 was selected via a threshold match of probabilities (e.g., a matching range). Tag 4 is in common between brand 806 and preexisting data 802. However the probabilities are 0.75 vs. 0.8 respectively reflecting a threshold of at least +/−0.05 from 0.8. A threshold of any desired value maybe selected to trigger a brand selection. In one embodiment, in which there is no exact tag match, then the remaining tags ad associated probabilities may be ranked in order to the smallest difference (including absolute difference) to the tag at issue. The probabilities with the smallest difference may be associated as dependent on the required threshold.

Brand 808 was selected based via a taxonomy. Specifically Tag 4 from preexisting data 802 was determined to be taxonomically related to Tag 6 and 7 in brand 808. In addition tag 6 has the same probability (0.8 as tag 4) and might infer an increase in weight in the user interest graph. For instance, tag 4 may be "Valentine's Day Candy" and Tag 6 may be "Valentine's Day Flowers" and Tag 7 may be "Valentine's Day Cards".

Upon brand selection, the brands may be added to the user's interest graph. In addition, the brands may be presented to the user for sorting. The user selected brands may then be added into the interest graph which may affect the weight of the brands, characteristics and probabilities in the interest graph.

In one embodiment, a device such as an audience engine server 220, content sever 218, brand owner server 230 or any computing device may execute instructions in memory via a coupled processor. Here, an audience engine may be coupled to a client computing device 201 via a network 2210.

Said instructions may determine a likely user characteristic based on preexisting data stored in association with a user. The preexisting data may be transmitted from client 201 to the audience engine. A user ID or other identification may associate the user to the preexisting data and may be added to an interest graph for the user/persona.

The determination of user characteristics may occur by first associating preexisting data with preexisting data tags as illustrated in FIG. 7 (e.g., meaning of the preexisting data). Once the user's likely characteristics and optional probabilities are determined, these preexisting data tags may then be associated to tags that are associated to characteristics associated to brands such as in FIG. 8. These characteristic tags may be associated to statistical probabilities which may aid in the association and weighting.

Second, brands may be selected based on the processing of the preexisting information on the audience engine as previously described e.g., matching brand characteristic tags to preexisting characteristic tags and probabilities. The selected brand (such as a brand image and ID) may then be transmitted to client 201 for display in a brand sorter or other display tool and collect user feedback such as affinity input. The client may then transmit user feedback over a network which may be in the form of a brand sorting, Swote gesture input or other input. Transmission may be a brand or brand ID and an affinity tag to a remote device such as an audience engine. In one embodiment, the affinity feedback may be considered a representation of an affinity for a brand that is statistically likely to represent user with particular characteristics.

Upon receipt at the audience engine, the engine may process the user feedback. An affinity feedback such as a positive brand affinity indicates affinity to a brand and associated characteristic tags. Feedback can be negative, positive, neutral, a numerical or any other rating. Negative feedback can adjust in a negative manner the associated brand's characteristics during integration into the user's interest graph while positive influences in the reverse way. For instance characteristics associated to a negatively viewed brand may decrease the probabilities of related characteristics in an interest graph. A positive affinity feedback to a brand may add a characteristic tags associated to that brand that was previously unassociated to that user's interest graph into her interest graph with an associated probability. A neutral feedback may or may not alter the user's characteristic tags in an interest graph. It may prompt subsequent brands to be shown to the user which have similar characteristics. The user feedback may take the form of a user moving her finger (e.g., gesture), cursor over or substantially near a brand such that a she moves a touch point on the device 201's display in a predefined direction over or substantially near a brand.

As discussed above, a confidence level in a user's interest graph about one of her characteristics may then be modified based upon the brand and affinity for the brand received. The modification may consider one or more of the received brands, other parts of the interest graph, other users, social trends, contextual data or other data. Typically this is done on the audience engine where the interest graph is stored but may occur on any device including the client device 201. As such as described in related patent applications, content may be transmitted to the client device which is targeted to the device's user based on her interest graph based on tag distance calculations.

The steps above may be execute on the audience engine, client or any combination of other computing devices e.g., Internet, any network, coupon Site, Offer networks, ad networks, brand advertisers, other users/devices 228.

The tools described above may also be used in combination. In addition, the addition of tags and probabilities may be subsequently examined by one or more of these tools to add/modify characteristics and probabilities.

Other Brand Selection Tools

In addition to the above brand selection tools, the use of pre-determined marketing buckets and privacy tools may aid in brand selection.

In one embodiment, a pre-determined marketing profile with associated "buckets" and their associated brands (marketing profiles are commonly available for purchase) can be used to aide in determining a set of brands apt for a set of user preexisting data. More specifically, the buckets can be used to reduce the amount of computation needed to determine a desired characteristic(s), explore a user's interests etc. Marketing "buckets" typically represent a set of associated statistical characteristic probabilities about a typical member who is classified in that bucket and associated brands/characteristics. For instance, an affluent marketing bucket may comprise brands and is associated characteristics (tags) of affluent, educated, owns home, likes high-end cookware and associated with BMW, Porsche and other brands etc.

Here, preexisting data may be first used to select a specific marketing bucket. Brands associated bucket may be weighted or be the only brands selected during reverse brand sorting as opposed to initially examining random or a list of brands as in operation 4 in FIG. 6. This may reduce computational requirements in selection of brands while inferring probabilities of characteristics within that bucket.

In one example, if a user's preexisting data reveals preferences for expensive goods. This characteristic of affluence may be selected to be explored/confirmed. In response, a pre-determined marketing bucket associated with affluent goods/users is examined and optionally other buckets related to less affluent goods as well as other characteristics are not considered. This affluence bucket maybe associated with brands that can further add granularity to the user's profile in regards to expensive goods upon user brand selection and sorting. In another example, multiple buckets may be examined. For instance, preexisting data from operation 1 in FIG. 6, may rule out or otherwise determine that user's interest graph is substantially not in common with certain marketing buckets as initially determined by data from operations 2-3 in regards to the affluent characteristic. The remaining buckets are then deemed as buckets the consumer may be placed in. In response, brands associated with each of these remaining buckets may be presented for user sorting for further exploration of user characteristics associated to those brands/buckets.

The brands associated with the remaining buckets are then examined/selected. The brands displayed to a user in operation 5 are selected in operation 4 based at least on maximizing the opportunity for identifying the desired characteristics from remaining buckets without over (optional) or under representation (optional) of the characteristics associated with brands in other remaining buckets. Upon user brand sorting, the data may be used to base further confirmation/exploration on the buckets previously selected or expanded to buckets not previously considered.

Finally, along with marketing buckets, privacy may also aid in brand selection. In an embodiment focusing on user privacy, upon entering a shopping mall, potentially several hundred brands (stores, products, services etc.) are available for purchase. This environment presents many types of preexisting information. Individual stores may be offering Wi-Fi or other electronic broadcasting of their presence as well an indication of what they are selling. This may be detected by a shopper's mobile device using a cellular, WIFI, Bluetooth or other receiver. A mobile device may also have technology on board that collects geolocation information such as a GPS receiver as well as hardware for detecting RFID tag exposure, contacts, purchase history, social media information, logins in relation to known brand locations etc. This preexisting information may be viewed as private information in which the consumer may not want broadcast out of the device.

With the above preexisting data examples, operations in FIG. 6 may be applied onboard the device, remotely or with a combination of the local and a remote device. For instance, a consumer may optionally choose to broadcast some, none or all of the preexisting data out of the device upon her approval. In another embodiment, analysis of preexisting information stored on the mobile device (optionally, also remote information associated with the user of the mobile device such as an email account, bank account, loyalty program account) are processed locally on the mobile device via operations 1, 2, 3 and 4 which selects a number of brands to present to the user for user sorting. This alleviates the need to send potential sensitive personal information to a remote computing device.

Preexisting Information

As discussed above, reverse brand sorting can use preexisting information 602 as a base/supplement for an advertar/interest graph. Often, a CRM (Customer Relationship Management computer system) has pre-existing information about a user, which includes relationships (e.g., purchases pertaining to, accounts with) brands such as GAP™, Nordstrom™, Pottery Barn™ etc. Other information may be ZIP code, gender, credit history, spend graph data, relationships to other people and associated information (e.g., family spend graph), address, geographic information, proximity information, living status (e.g., own, rent etc.).

Preexisting data may additionally comprise but is not limited to location of a consumer (determined by GPS/WIFI/cellular radios/RFID or other tools), interests, friends and their associated data (e.g., social media data such as their friend's interests), purchase history (time, place bought), financial history, credit ratings, credit card information, browsing history of a device(s)/account(s), locality, computing device setting such as language, applications installed, actions taken within an application including mobile applications, proximity to other users, loyalty program membership and other information which may include often intimate personal characteristics (age, gender, income etc.) of the user and/or their friends/family, email addresses, physical address, phone number, IP address, MAC address, software identification data, amount paid, social media information such as Facebook™ posts and tweets, interest graph information, and any contextual information about a user. This information can be acquired with voluntary input from a user or involuntary/passive input from a user.

Additional examples may include such as opinions expressed by the consumer or associated entities or people such information as content the user has previously SWOTED on or "liked" on Facebook or other social media, people/entities that are associated with opinions the user has viewed, contextual event information e.g., a purchase of a good just before a holiday etc., search engine results of the user or other users, brands near a user, public information, medical history or any type of content associated to the user or her demographic.

Brand Transponder Tools
Privacy Friendly Brand Affinity/Location Information Tools A long-standing problem in advertising is a lack of advertisers knowing which particular brands a user may be interested in. This information would be additionally more valuable if provided in real time. Tools described herein disclose how information can be inferred by a consumer's location relative to brands. Said location and related circumstances like time spent in a location may be inferred as an affinity. For instance, if the user is at a location of a McDonalds™ frequently, the McDonald's brand may in be associated to that user's interest graph. Specifically, characteristics and probabilities associated with that brand and/or location may be added to the user's interest graph along with contextual information such as how frequently she goes to McDonalds, what she buys, how long she is in a particular section of the location, who she is accompanied by, time/date etc.

Presented herein are tools which enable a consumer to share her probable brand relationships, as inferred from geolocation proximity to brands while optionally receiving content based on at least her brand relationships in real time. Also disclosed are user privacy tools.

Figure 9:
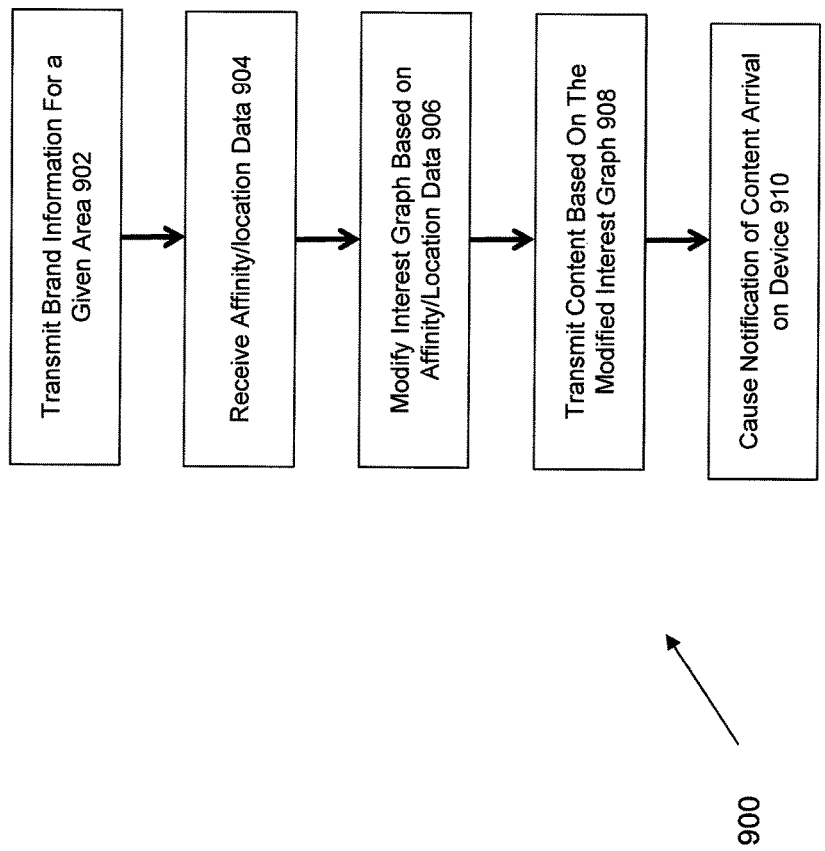
FIGS. 9-10 illustrate consumer self-profiling tools using A brand transponder tool in accordance with an embodiment of the disclosed technology.

In one embodiment as illustrated by FIG. 9 and operation 900, a mobile computing device such as a smart phone is configured to access information over a network about brands, which include brand geolocation information. This information may be substantially about the brands around the device's immediate location, which may be requested from a remote server (e.g., brand/content servers 218 and 230 or other devices) or a device such as a micro wireless transmitter substantially near the user (e.g., in the same shopping mall). This information may comprise the physical location of nearby stores/brands, the time of sales at said stores, location of events such as state fairs/conventions and the vendors that will be present, location of airports, restaurant, professional services or any other product/service sold and/or will be sold at a location, the geolocation of micro wireless transmitters within a store which indicate the location of products etc. In another embodiment, brand information pertaining to a geographical area such as a city may be transmitted to a user's device upon user device request or arrival in an area 902 by a server such as an audience engine, content/brand server or other computing device over a network.

Brand location association can be determined with devices in each location actively broadcasting brand related signals such as micro wireless devices. The transmitted data may be a brand identification, sales/product/service/ad/offer/coupon information, location information etc. From this information, inferences of user brand interests/affinities from the user device proximity/frequency of exposure to brand locations/signals and associated user inferred user-brand characteristics and statistical probabilities can be incorporated into a user interest graph. In one embodiment, this information can serve as preexisting information on which to reverse select brands for user sorting as discussed above. In another embodiment, this information may be used to send ads to the consumer in real time in response to the consumer's detected proximity to relevant stores in response to integration of this information in her interest graph and resulting ad matching.

In a shopping mall embodiment, a plurality of wireless stations such as micro wireless brand stations, cellular radio, Bluetooth, Near Field Communication (NFC) brand stations etc., are placed in stores and even in multiple locations within a store. One example would be the GAP™ store in which a wireless transmitter station is near the women's flannel shirts and other is by women's socks. As a user walks through the GAP, her device location is continually associated with distances from the various brand stations such as the GAP Women's sock station. The distances and times in proximity to such stations may infer a brand affinity (such as to the GAP as well as potentially socks in general), which may be calculated locally or remotely. In the former case, the local device may detect brand signals and transmit that and an ID for remote calculation or may calculate affinity locally and integrate it into a local interest graph or transmit it to a remote server for integration. In the latter case, the user device may broadcast her location to a remote computer that is aware of surrounding brand-association locations for affinity calculation. An affinity tag/probability may be then assigned to the user and her interest graph. This information may be detected by the device or stations, stored and added to an interest graph on the client or a remote computer at 904 such as at an audience engine or content/brand server. In one embodiment, the user's device emits an ID signal along with her location, which may be recorded by a remote device and associated to an interest graph 906 as she moves through an area.

Here, in response to the user spending substantial amounts of time in the Gap women's sock area as detected by the device, the Gap women's sock brand affinity (with an optionally statistical probability that is substantial large given the time spent) and optionally a statistical probability to other characteristics is associated with her interest graph. Associated characteristics may be then assigned and weighted based on preexisting information as well. Time spent along with distances relative to other areas of the store (distance from other transmitters) may be examined along with related marketing data to assign a more granular and appropriate affinity.

Any desired combination of distance/time/frequency of proximity can be used to infer an affinity. For example, to determine an affinity for a small diamond ring, a closer proximity to the ring display/wireless station may be required than to determine an affinity for a automobile on a showroom floor given the different sizes of the objects. For instance, if a user's trip through a mall involves being in frequent close proximity to a wireless brand station in women's socks (e.g., within 20 feet of the sock department) for a substantial amount of time (any time range determined for instance by marking data such as 20 minutes to 2 hours as non-limiting examples), an inference may be made that the user is a female and interested in socks and is substantially interested in said socks more than the average female. As such, the GAP women's sock brand is added to her interest graph along with an inferred affinity. In response, to her modified interest graph, an ad for socks may be sent to her device at 908 (e.g., by an audience engine server or a content provider server, brand or publisher server) for viewing while in proximity to socks. A notification such as a sound, text, email etc., may be sent to the user prompting attention of the ad on her device at 910 when in an area applicable to the ad or other sent content. Alternately, the ad may be displayed later on other devices such as an IPTV at her home for viewing. In addition, taxonomies and marketing data can expand her interest graph and display content and/or execute reverse brand sorting based on this new affinity information. The user's actions once an ad is received may be detected and incorporated into an interest graph. For instance, upon receiving an ad, if the user examines the ad on her device and moves closer to an area pertaining to an ad (or away), an affinity for the ad and related product/services of the ad may be integrated into an interest graph.

Finally, targeted price reductions and notices of sales may be sent. Here, an unadvertised discount based on her interest graph characteristics showing high sock interest as determined by membership in a loyalty program, due to her previous purchases, credit history, demographics or upon entering a relevant location etc. may be offered. In addition, available inventory at the store may be examined and offers sent to the user based on her updated profile and said inventory.

Geographical locations may be pre-associated with brands and sent to the user device before entrance to an area. Upon entrance to an area as detect by the device (e.g., GPS or reception of brand signals etc.), a request if made to a remote device which may include the user ID and location etc. Alternately, the brand information such an indemnity, characteristics, products etc. may be actively transmitted to devices upon entering a transmission area with out specific user request. The pre-associated information may be downloaded by the mobile device upon entering a geographic area and is used as brand-location association triggers. Brand-location associations could be done by brands registering their location with the user's device or remote computers or deduced by public data such as phone book listings of brand locations and their physical street addresses. Here, upon entering a certain geographic area, GPS coordinate detection by the device which are associated to brands may trigger affinities to be calculated and in turn, an interest graph update and/or content display.

Brand Transponder Privacy Embodiments

In one embodiment, software on the user's mobile device may be configured with privacy protection tools, which may aid in masking a user's actual location. For instance, a user's smart phone may request (from a remote server) the geolocations of brands in a substantially large area/granularity such as city or state level as opposed to a ten square meter area where the remote server in communication with the phone may deduce the user's specific location.

In one embodiment, a plurality of brands and associated locations within the city of Seattle is compiled. The geolocations of brands at the city level are then sent to a user's device. As the user transports the device around Seattle, the device may detect its presence substantially near geolocation associated with the brands. For instance, the user may detect that the device is spending an hour at GPS coordinates associated with a McDonalds'™ and an hour at a Burger King™ every week. However, the device may detect that despite being on the user's route home from work, she never stops at the Wendy's™. From this data, brand affinity and characteristics/statistical probabilities of the brands calculated on the device without sending back precise geolocation information of where the user has been or may be calculated remotely while not revealing any location sensitive data by deleting the location specific data after calculation. As such, in one embodiment, only an ID associated with a user's interest graph and a brand affinity and associated probabilities are incorporated into an interest graph which may be examined by advertisers and others on an audience engine. In another embodiment the interest graph may also be stored on the client device.

In another embodiment, based on factors like time spent, purchases made, the device browsing history, there may be a 90% brand interest/affinity in McDonalds and Burger King but a 0% interest in Wendy's. This brand interest information can be sent remotely for integration into an interest graph without the specific locations, time spend, purchase made and browsing history. Thus the remote servers do not know any substantial location specific user data. The brand information alone or the brand information and/or a combination of other information that may be privacy sensitive like the associated city, device, consumer information such as phone number, software ID, IP address, brand affinity, statistical probability or other desired information may optionally be sent. In addition, this proximity information can be added to an interest graph and treated as pre-existing information to further refine which brands are shown to the user for sorting.

In one embodiment, a user's privacy may be enhanced with location masking tools at the shopping mall granularity level. This is accomplished by creating relatively large boundaries in which the consumer's location is not tracked within said boundary. Specifically, upon entry in said boundary, brand information pertaining to that boundary may be associated to the user and integrated into an interest graph. This prevents overly precise tracking of the user while still allowing substantially granular brand affinity information to be determined. Boundaries may be downloaded onto the client device which filters the transmission or even detection of information to enhance privacy. Alternately, the remote servers may filter information to a certain granularity level after receipt from a client.

Figure 10:
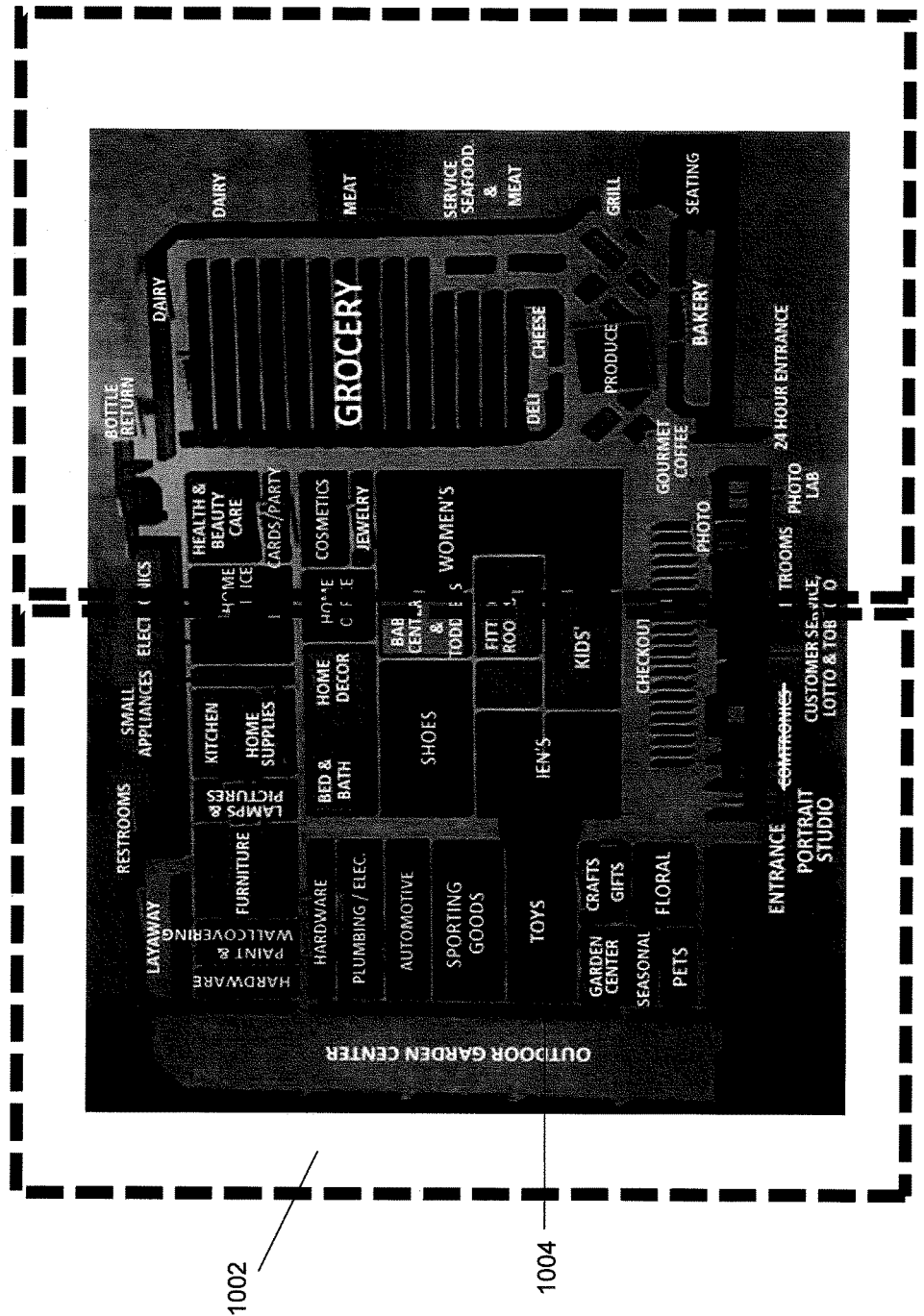

Typically through Wi-Fi or cellular radio triangulation, a mobile device location can be determined within one meter. This presents significant privacy issues to consumers. FIG. 10 illustrates a map 1000 of a shopping mall and two large square grids that are drawn over the store map in addition a consumer with a mobile device 1004. Instead of tracking on the one meter level, where the consumer has been/is, grids of arbitrary size can be drawn to protect reduce the granularity of the user's device location. The user may select the desired boundary size on her device. In this embodiment, the user' device would only transmit that it was currently within the left hand block.

Here, upon entering the left hand block 1002 as detected by the user's device, a server in communication with the user device will receive a communication from said user device that the consumer is in the block. As such, various content associated to stores within said left block are communicated to said user device. Given that said left block is relatively large, a consumer would likely not be concerned with being associated to being in said left block; even in real time. Examples of block size can vary of any size. Such examples include 5-meter blocks to 500 meter blocks; said examples are non limiting examples.

Dependent on the desired level of additional privacy, it may be recorded and transmitted to the remote server that she spend X time on the left hand side block, 1002 made purchases (the quality, price, item, discount me or may not be considered), a particular path through the mall in relation to the blocks (e.g., left hand block then right hand block), other devices constantly in proximity through her journey, communications sent, received, ads received, brand selections etc. This information may be treated like preexisting information and result in reverse brand sorting or may be directly incorporated into an interest graph etc.

In one embodiment, the time, purchases and other user data may be obfuscated for privacy reasons. For instance, the device may only transmit that the user spent an hour in the left hand boundary without disclosing which specific hour of the day or even just transmit the date e.g., February $29^{th}$. In addition, the device may only transmit that the user bought an item associated with brand within that is commonly known within a specific category of brand such as the "health, wellness and beauty" category and not the specific item. The device may also locally calculate brand affinity based on brand location information as discussed above and transmit that information for remote integration into a remote device.

This reduction in granularity of consumer action can be controlled directly by the consumer. In addition, in return for greater granularity disclosure, the consumer may be compensated by discounts, cash or other incentives. This information may also be shared with those she chooses through social media or other avenues. In one embodiment, the consumer may be able to request the block size she is willing to accept e.g., 5 meters or 500 meters etc.

These tools thus offer a user brand probability specific to desired location granularities such as cities (zip codes, square kilometers, city blocks, neighborhoods, states, countries etc.), without releasing private consumer locations to devices other than the consumer's device.

Sales Force Efficiency Tools

A significant cost in business is product/service demand. This necessitates costly actions such as overbuying and lengthy product experimentation, development and marketing costs. These sources of inefficiency can amount to a significantly large monetary loss and opportunity cost as frequently, large and expensive sales and marketing forces are used in an attempt to gauge actual demand. As such, a suite of sales force efficiency tools is needed to determine product/service demands to lower costs by reducing the need for large sales/marketing forces.

Disclosed below are tools to determine probable: 1) demand of a product/service; 2) user interests and associated probabilities; and 3) related user interests and probabilities. The tools described below accomplish these goals by interest graph based examination of user(s) interest and creating ads from user interest graphs.

From the interest graphs discussed above and in the above referenced applications, prototype ads can be created to gauge demand in a product/service. In a non-limiting example, said prototype ads can include ads, offers, coupons or other data that may gauge user interest in purchasing a product/service in response to a user assigning affinity to the ad. In response, products/services may be created and actually offered to users. In one embodiment, once a substantially in demand product/service is determined from a plurality of interest graphs, a sales team can target establishments such as a retailer or manufacturer who could offer said products/services in order to convince them it is profitable engage in offering these products/services for sale. Not only could the sales team demonstrate adequate demand and the characteristics of actual users who are demanding the product/service, but they could also offer the ability to contact the users directly through the audience engine and the user's persona/profile. The actual product/service that actually offered for sale may be included in said communication. In return, the merchant or other provider may reimburse the owner of the audience engine or others for this data and mode of communication directly to the relevant users.

Figure 11:
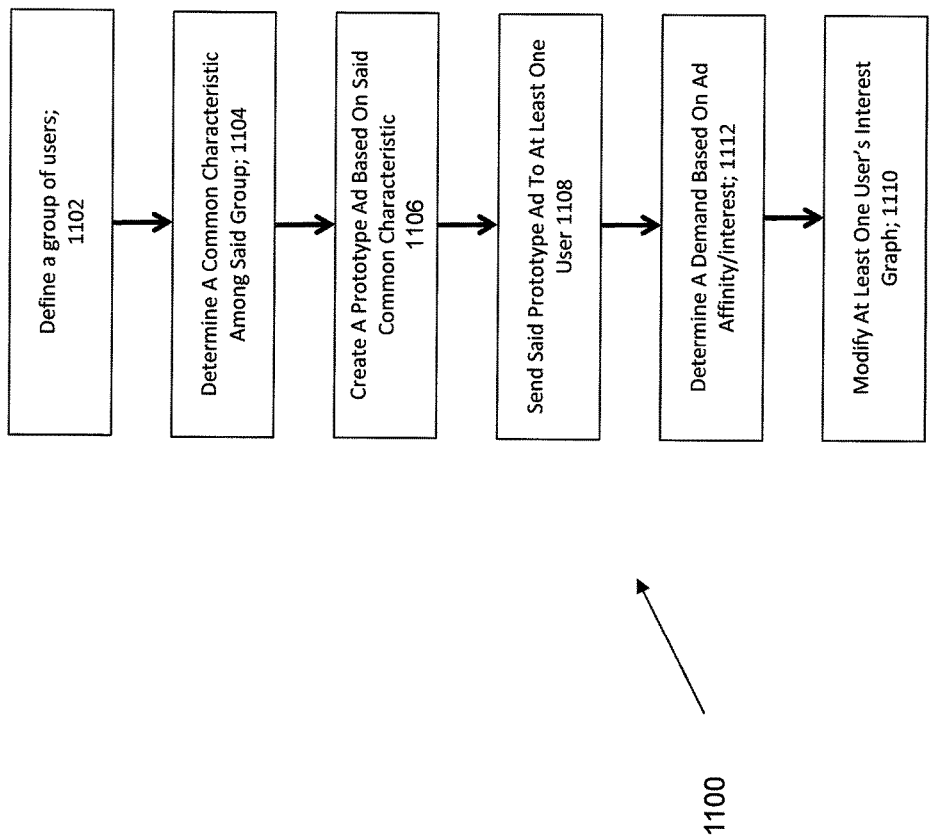
FIG. 11 illustrates a series of steps performed by a computer system for an embodiment of a consumer self-profiling tool as applied to prototype ad tools in accordance with an embodiment of the disclosed technology.

FIG. 11, illustrates an exemplary embodiment 1100 of prototype ad creation and usage. A prototype ad can be created using a plurality of data such as a common user characteristic 1104 from the interest graphs of a group of users such as affluent users 1102. In another embodiment, Advertars with common interests from one or more users can be used. In yet another embodiment, all users may be used. For instance, a persona or characteristic(s) and associated statistical probabilities (such as from marketing data) within a user's interest graph or group of user's interest graphs could be used as well as any product/service related information such as: any components from an average user interest graph, an "ideal" customer's interest graph, a group of personas from certain geographies, purchasers of holiday product/services, time/location of users or product/services, available product/service inventories, the availability of materials to create product/service, competing product/services, the number of users with particular interest graph characteristics etc. Different combinations of these are also contemplated.

Once a prototype ad is created 1106, it may be displayed to users for testing/sorting (e.g. via user SWOTING at actions or Facebook "like" input) by displaying the ad and asking for an opinion or other question such as "would you be interested in ad X? and/or "not interested in ad X" via brand sorter as illustrated in FIG. 19. The ads may be displayed for selected users/advertars whose interest graphs indicate they are likely to appeal to such as the user selected in 1104, or to any other users in an effort to explore/expand their interest graphs or to any desired group of user with the desired characteristics.

In one embodiment, interest graphs of Advertars on an audience engine in a specific geography such as Seattle could be examined for common characteristics to determine probable popular products. Here, common characteristics from a substantial number of the interest graphs could have been interests in: healthy eating, budget dining and That food. From this, a taxonomy as well as optional supply/demand list such as an inventory list of local businesses (e.g. available and inexpensive foodstuffs) can be used to determine a product(s)/price points and other related factors that may satisfy these combinations of interests including location, time and other similar food/health characteristics 1106. For instance, a product offering may optionally be based on business offerings in Seattle, material prices, popular interests, the time of year, the success of previous prototype or actual ads, user requests, sales records and other factors.

Figure 20:
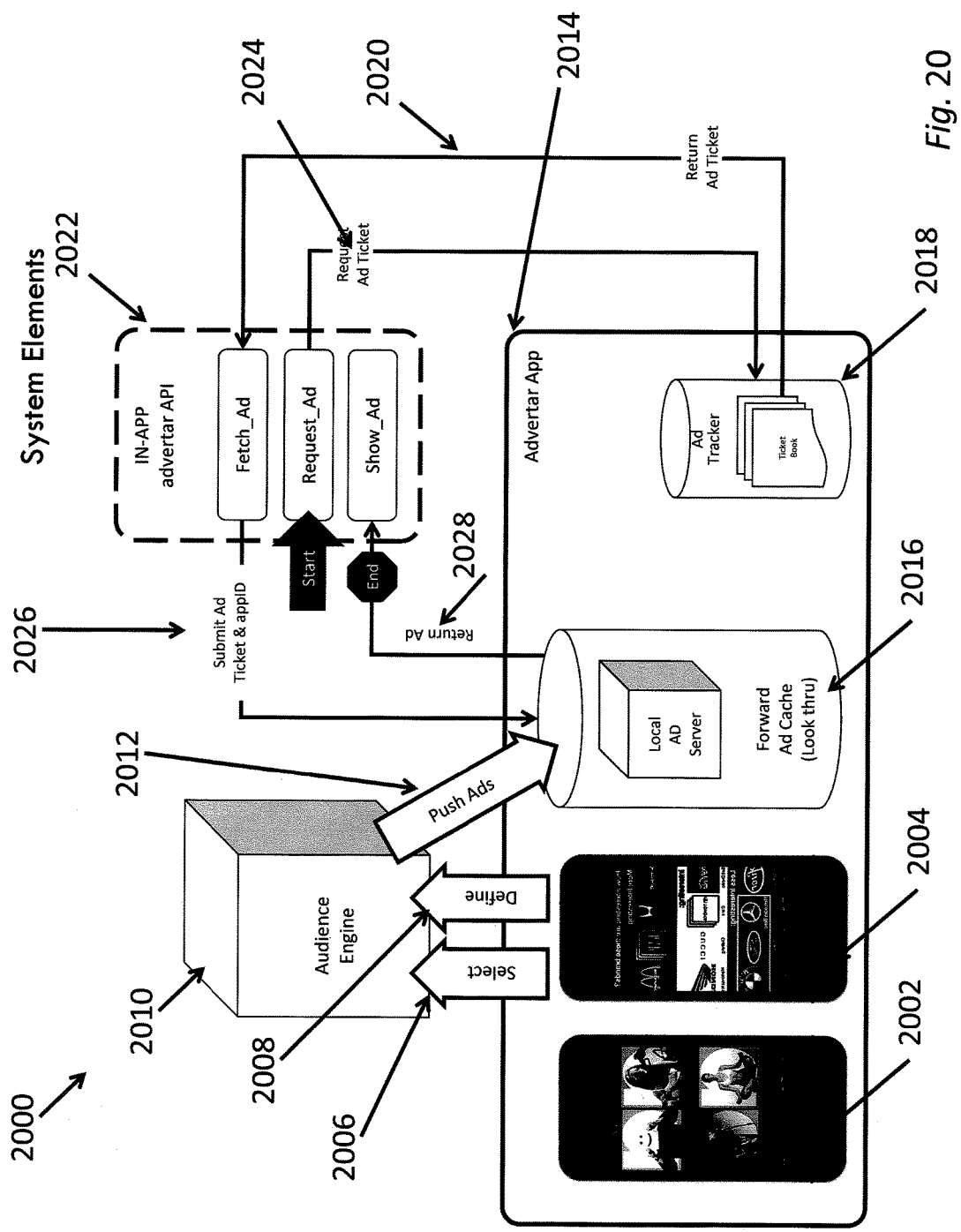

From at least these factors above, a likely in demand product/price point as well as an optional time/place can be calculated and a prototype ad created with associated tags indicating its properties (e.g. a Thai food tag for Thai meals). From this, users of computing devices in Seattle could be displayed prototype offers and be asked to provide a affinity input such as a Swote gesture or Facebook "like" if they would buy vegan hamburgers for $10. The receiving users could be only those who have a substantial probability of having the interest(s) specified above or any users. Delivery may be similar to that as illustrated in FIG. 20.

Once a desired number of users have input feedback (or a lack of feedback over a period of time), the resulting affinity data may be examined. Not only can demand for the prototype offer be determined, but the affinity of the ad from each user (or lack thereof) and associated characteristics of each user/persona may be examined. More specifically, in one embodiment, commonalities such as characteristics and input affinities of users and personas that were sent the ad may be examined to determine if other offers may be in demand. Affinity data may be comprised of an affinity for the prototype, a reference to the ad identification, associated tags for the ad and associated probabilities.

The affinity data from the uses may indeed justify the ad being actually offered and sent to users who expressed interest and/or the data may be used to refine the product/service, refine the users' interest graphs, and explore new areas of interest for new prototype ads.

In one embodiment that explores user commonalities of interest graphs, user interest of the vegan hamburger prototype ad maybe found from a substantially large number of people with user interest graphs with the following probable characteristics/interests substantially in common: less affluent, people who like pitas, people who watch late night TV, computer users, highly educated, Honda Civic drivers, iPhone users, startup employees, people who strongly dislike ketchup and over 25 years of age. Some of these characteristics would have been reasonably obvious given the starting point of healthy and budget dining but it was also unexpectedly found that there was substantial common interest from those who drove BMWs. These characteristics may also be associated with statistical probabilities using marketing data or other tools. These users may have their interest graphs modified based on their affinity for the prototype.

With these interest graph commonalities, new products/services can be determined. Although it maybe determined that there was substantial interest in the vegan hamburgers for $10, it may be subsequently determined that common interest graph characteristics of users expressed (in one embodiment, this is via a taxonomy and associated statistical probabilities associated with the interest graphs of the users who Swoted or otherwise entered an affinity), that there would be even more interest (qualitatively and/or quantitatively) in vegan pitas without ketchup for $5 at 2 AM in the morning sold next to BMW dealerships given there was in this example, more users with these characteristics than those who expressed interest in vegan burgers. Therefore a new ad may be created and sent 1108 because a larger number of users (or higher interest probability) with new common interest tags answered in response to user ad affinity 1112.

Then products/services can then be presented to product/service providers for consideration and ad bidding. Providers may see the number of those interested in pitas, location of the user, associated interests, other products/services that may be appealing and have the ability to directly advertise to that user via her persona that previously expressed affinity.

Each user's interest graph may also be modified based on their feedback at 1110. A user persona's interest or lack thereof in said vegan hamburgers may be used to modify her interest graph to reflect that interest as well as statistical probabilities of interest in other categories and characteristics of interests such as Mediterranean food (e.g., pitas).

Price discrimination/preferred discounts based on probable interest graph characteristics or past actions may also be offered to specific users. For instance, if a user is determined to be likely a student with a lower income, then she may receive ads with larger discounts (such as buy ten, get one free). Users who have frequently bought in a certain pattern may be given loyalty discounts. New users who have never bought from a merchant or have never purchased a certain type of good/service may also be given an introductory discount. Referrals and other incentives based on profiles are also contemplated.

Local Advertar Cache

As described in previous related patent applications, a system may be used to deliver ads to personas via a local ad server located on her device. This local cache may also be used to allow the storage and retrieval of personas/Advertars and associated interest graphs/profiles as well as ads. One advantage of this local storage is that this data and associated ads may be available off-line. Furthermore, even if the device is on-line, local storage will enable faster loading times and subject the data to greater privacy and user control. This cache may be located in a variety of places within the local device including within an application such as a mobile application or a within a file system etc.

Since the personas may be cached locally, modifications to the profile such as by locations where the user has been/is, proximity to other users and other personal and sensitive information can be added to the profile under direct the control of the user. In one embodiment, the user also has direct control regarding what specific pieces of data can be shared to other devices. Interest graph modification of local interest graphs may also be made locally and shared with remote devices. The local cache (e.g., local storage on a user device) may be within an application, mobile application, operating system, file system web browser plug-in etc. For instance, on an iOS™ device, mobile applications are assigned "sandboxes" in which other applications may not enter without permission. Ads and other materials may be stored here for retrieval by third party applications. In Android™ applications may be assigned directories in the file system in which third party applications may access files from another application.

In one embodiment, a trigger such as time, date, a user device interaction with other devices, receiving communications such as via NFC, cellular or Wi-Fi communications, loading an application, or detection of arrival in a geographic location (detected by cellular or GPS) triggers loading of an Advertar from the local cache. In one embodiment, this may associate the advertar to an application that is already running (switch active advertars) or may trigger that advartar to load when an application configured to communicate with an advertar when said application is loaded. In another embodiment, a trigger may automatically launch and application with an advertar associated to said trigger. In another embodiment, the advertar may be partially stored on a remote device and the trigger and another part of the adverted may be stored locally.

In another embodiment, the trigger may be detection of the device entering an area associated to a brand. For instance, entering a location associated to McDonald's with a mobile application running on a smart phone may trigger the activation of a fast food persona which may be accessible by that application and other applications on her mobile device. In one embodiment upon loading of the application, the application may examine the current GPS coordinates and load an appropriate advertar for the given coordinates. Various methods of implementation are contemplated.

Said association of the triggering event and particular persona may be either by the location being equipped with a transmitter transmitting brand information such as the brand and associated characteristics or downloaded from remote servers. Here, brands substantially related/associated (e.g., via tags and probabilities) to a particular personas interest graph will initiate loading of that persona. In another embodiment, the association may happen when the device which previously downloaded geolocation brand associations detects entry into a location associated with a brand as discussed previously.

In this embodiment, McDonalds is associated to characteristics tags such as fast food. This may be transmitted at the location or may be known by the local device by a preloaded file or in response to receiving the signal, the client may communicate with a remote server to determine and then receive related tags to data in the signal. Matching these brand characteristic tags to the various personas stored in the device (e.g. via distance calculation of tags) triggers an activation of a persona with at least the same or related characteristics such as the fast food persona, which was previously tagged with fast food tags. A taxonomy or marketing data may aid in matching brand characteristics to persona characteristics.

Here, the advertar may incorporate an enhanced interest in fast food from the establishment because the user has entered the fast food restaurant as well as other interactions the user has after entering communication range such as purchases made at the establishment. As such new tags may be assigned and new probabilities as well. The new data in the cached persona may be synced with remote servers and integrated into an interest graph. Appropriate ads may be displayed to the user in real time from the audience engine, local ad cache or from remote servers based on the updated interest graph. Relevant content provider servers may be contacted as well for appropriate content given an advertar's interest graph.

In another embodiment, each user's locally cached advertar may have locally stored ads tailored specifically for that advertar. A plurality of unassociated ads may be downloaded on the device, and a local calculation of each advertar is interest graph may determine a ranking of the ads for each persona via distance calculations of tags/vectors. In another embodiment, a remote server may rank the ads to each interest graph. In one embodiment, a plurality of personas may be downloaded into a local cache. Upon loading via an application, the active persons may be switched to another persona in the cache or on a remote device within the application.

Ad Interoperability

In another embodiment, using locally cached personas and ads, a uniform interface for storage, retrieval and then display can make ad sourcing to different entities more efficient. Specifically, third party applications (located on or off the client), can be interfaced locally with personas/ads, in a uniform standard ad interface across third party applications.

In one embodiment, third party applications on the device may access ads sourced through a carrier/merchant or other entity(s) that are stored on the local cache via a standard ad interface. For example, on an iOS™ device, a preconfigured third party application or a remote server in communication with the third party application can make a URI scheme request to the local cache or other memory on the local device or a remote ad via an http or other protocol such as: http://com.nfluence.advertar.AdName along with parameters defining the request. This may be in response to the third party application requesting the display of an ad. Preconfiguration of the third party application may comprise instructions for examining the device for certain types or identities of ads from particular sources such as a carrier or other entity that has agreed to provide ads such as a designated "ad directory", "application sandbox" or other area where ads may be stored locally or by being configured to interface with local applications configured to accept ad URI requests. The local application may be associated to a local interest graph or be in communication with an audience engine with the user's interest graph. The interest graph may select an appropriate ad to route to the third party application upon request. Alternately, the third party application may simply display a desired ad (e.g., a random ad) from the local memory. The parameters in any case could be an application key identifying and authorizing access and other information defining the requested data. In one embodiment, the local application on the client answers the request to transmit the ad, record feedback via the third party application etc. The third party application may also have access to a local or remote interest graph which may be modified or may modify a remote interest graph.

Feedback from the local application may also occur. Specifically, affinity feedback (as discussed elsewhere) may be transmitted from the third party application and routed to the audience engine server, the audience engine application, a content/brand server etc. This feedback may modify an interest graph and promote better targeted content for that particular user.

In one embodiment, feedback may be the usage of an application such as a mobile application by a user. For instance, if the GAP's mobile application is being used on a user's smart phone, this usage (e.g., a usage tag, a brand tag-such the GAP) may be sent to an audience engine (by either the third party application of the local application which may monitor usage) and incorporated into a persona. The usage tag may indicate affinity for the GAP and the related characteristics to the GAP as well as contextual data such as the GPS location, actions the user is taking on the smart phone, application usage time, time/date, other patterns etc. may be integrated into persona.

As such, in one embodiment, locally stored client third party applications can receive/cause display, record affinity information about the ads as well as other wise interact with the ads, local applications, interest graphs and other data stored locally or even remotely. This uniform interface provides a method for multiple third party applications to display ads sourced though a specified source such as a carrier, credit card company etc. which may be gathering ads from a plurality of brand owners which might otherwise require different ad interfaces. Payment, verified/open ID transactions may also be simplified in a similar manner Enhanced Graphical User Interface Awareness and Input Tools Overview Users of computing devices, in particular touch screen devices frequently encounter difficulty in inputting, receiving presentation of and organizing information. Problems range from a lack of user awareness that different screens exist in an application such as a mobile application, a limited number of input commands on a given touch screen. The tools disclosed below solve these problems.

Chooser Screen

A common problem that is encountered in applications such as mobile device applications is a lack of user awareness of other screens available to the user as well as an intuitive way to remember said screens are available.

Figure 13:
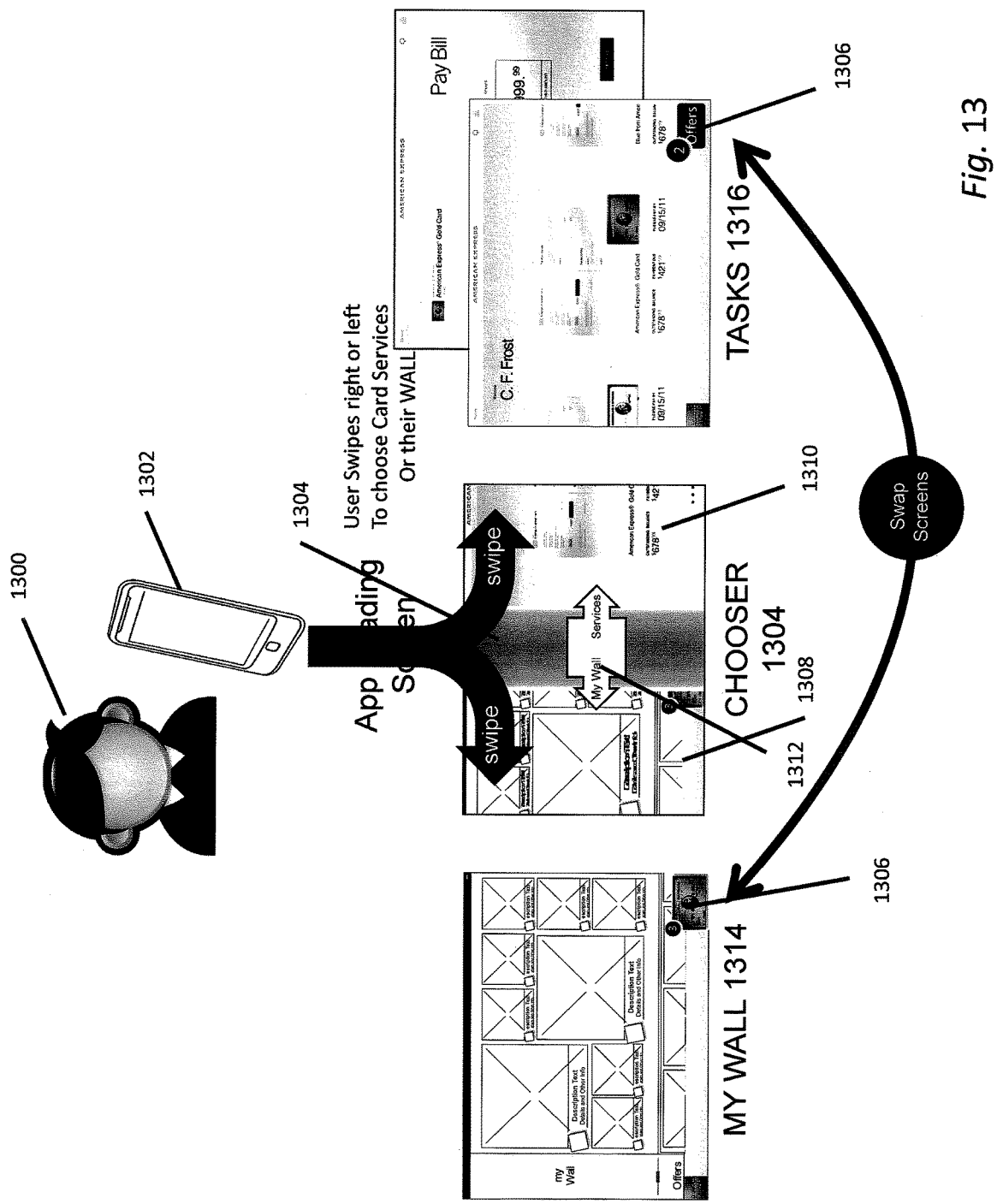
FIGS. 13-15 illustrate an Enhanced Graphical User Interface Awareness and Input Tool in accordance with an embodiment of the disclosed technology.

Disclosed is a "chooser" screen, which in one embodiment, serves to acclimate the user to the availability of screens the user may view. As shown in FIG. 13, a user 1300 is using a touch screen computing device 1302 with the disclosed chooser screen 1304. Said chooser may be a part of an operating system, a web-plug in, a program, a webpage, an application such as a mobile device application and so forth.

In one embodiment, upon a user loading an application, the chooser screen is displayed to the user. Said screen may comprise a plurality of available screens in the application for the user to view. These screens may be images of exemplary screens, indicia, or images of screens that will actually be displayed to the user upon selection such as screens where the user left off before previously exiting the application such as screens 1314 and 1316.

As illustrated, the screen displays representations of the available screens which here presents the "my wall" screen representation 1308 and 1310 which represent a "tasks" representation screen. Any number of screens, type of screens and any arrangement as well as any representation of screens are contemplated. The user may select one of the displayed representation of a screen by touching or otherwise selecting a representation. Selector 1312 indicia may be displayed to the user to indicate this functionality. Selection of the "my wall" representation of the selector displays screen 1314 and selection of the "services" representation of the selector displays screen 1316.

Once a screen is selected it is displayed to the user. An optional indicia 1306 may be displayed to the user. Upon selection of indicia 1306, the screens may swap e.g., 1314 is now displayed to the user instead of screen 1316.

Thus the chooser screen serves to give the user initial awareness of the available screens. As embodied here, the chooser is displayed within an application upon each loading of the application. In other embodiments, display of the chooser screen may occur at any desired loading step or at any frequency. In addition, display of the screen may be triggered by the user by command etc.

Figure 14:
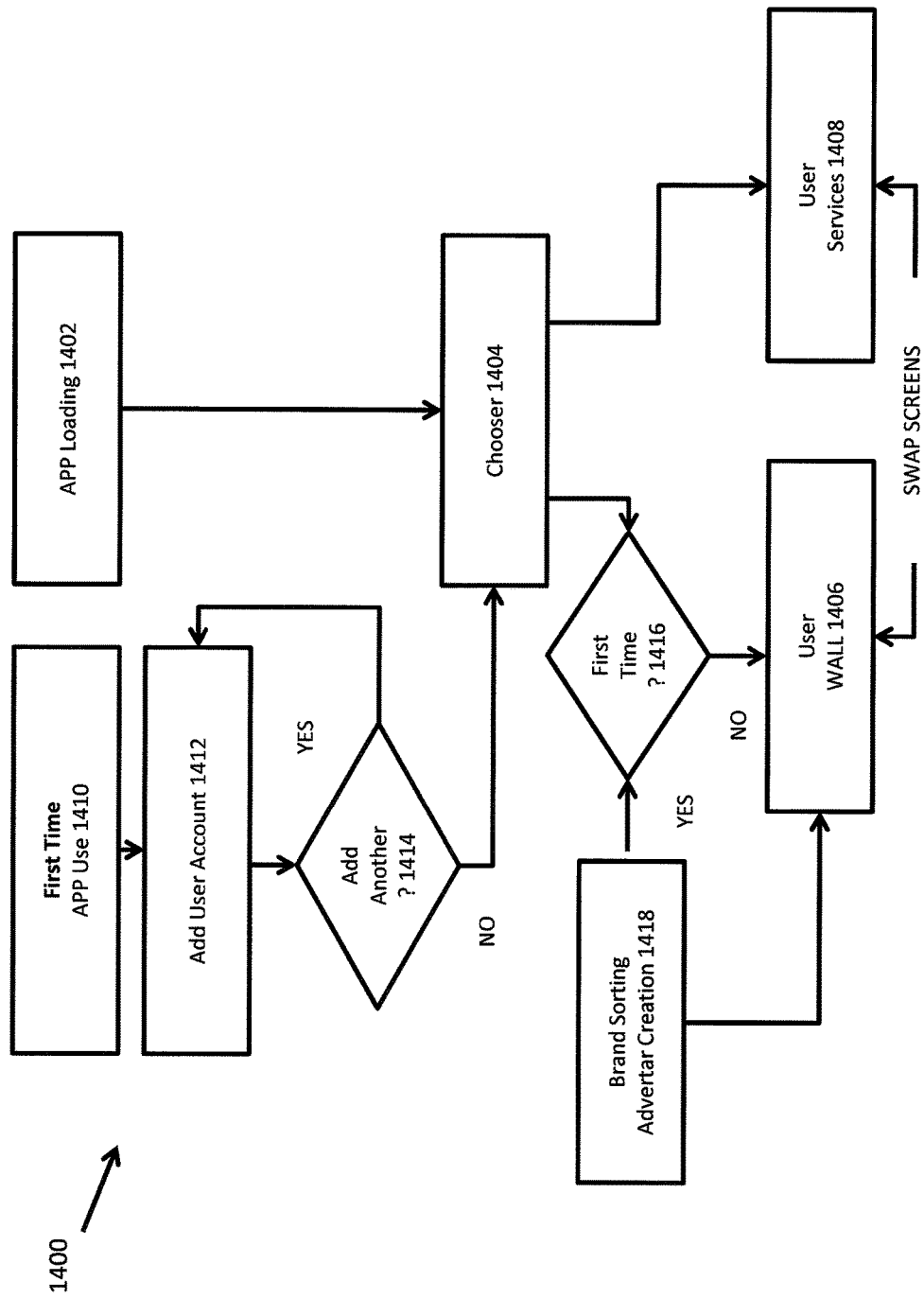

FIG. 14 displays a flow diagram 1400 of another embodiment of the chooser screen. Here, during application loading 1402 on a computing device, the chooser screen 1404 appears each time the application is loaded on the device. In this embodiment, User Wall 1406 and User Services 1408 may be displayed via the chooser screen as illustrated in the previous figure.

In one embodiment, the first time an application is used at 1410, a plurality of user accounts may be added 1412-1414. A user account screen image may then be displayed in the chooser screen 1404.

In one embodiment, if this is the first time the user account has been accessed 1416, then upon display of the chooser screen 1404 and the user selection of "user wall" 1406, the user may be asked to execute a brand sorting and advertar creation 1418. This has been discussed at length in related applications.

In one embodiment, instead of or to supplement, the selector, the user could be given functionality and awareness of other screens with a "peek" of another screen. For instance, while the "my wall" screen may be in full view of a user, a relatively small portion of another screen such as the "tasks" screen could be in view of the user. The user may input an initial touch point on the partially displayed screen and swipe it to reveal the "tasks" screen.

My Wall

The disclosed tools below, enable different commands for a particular gesture dependent on which area of the screen the gesture is input (or optionally upon input of another command such as a gesture while receiving input from another button or area or having an input preceded by a gesture). These tools overcome a problem on touch screen devices, which reserve gesture commands for certain commands and not others on a particular screen. This overcomes limitations of a given gesture to only input one command on a given screen e.g., a mobile device touch screen.

Figure 15:
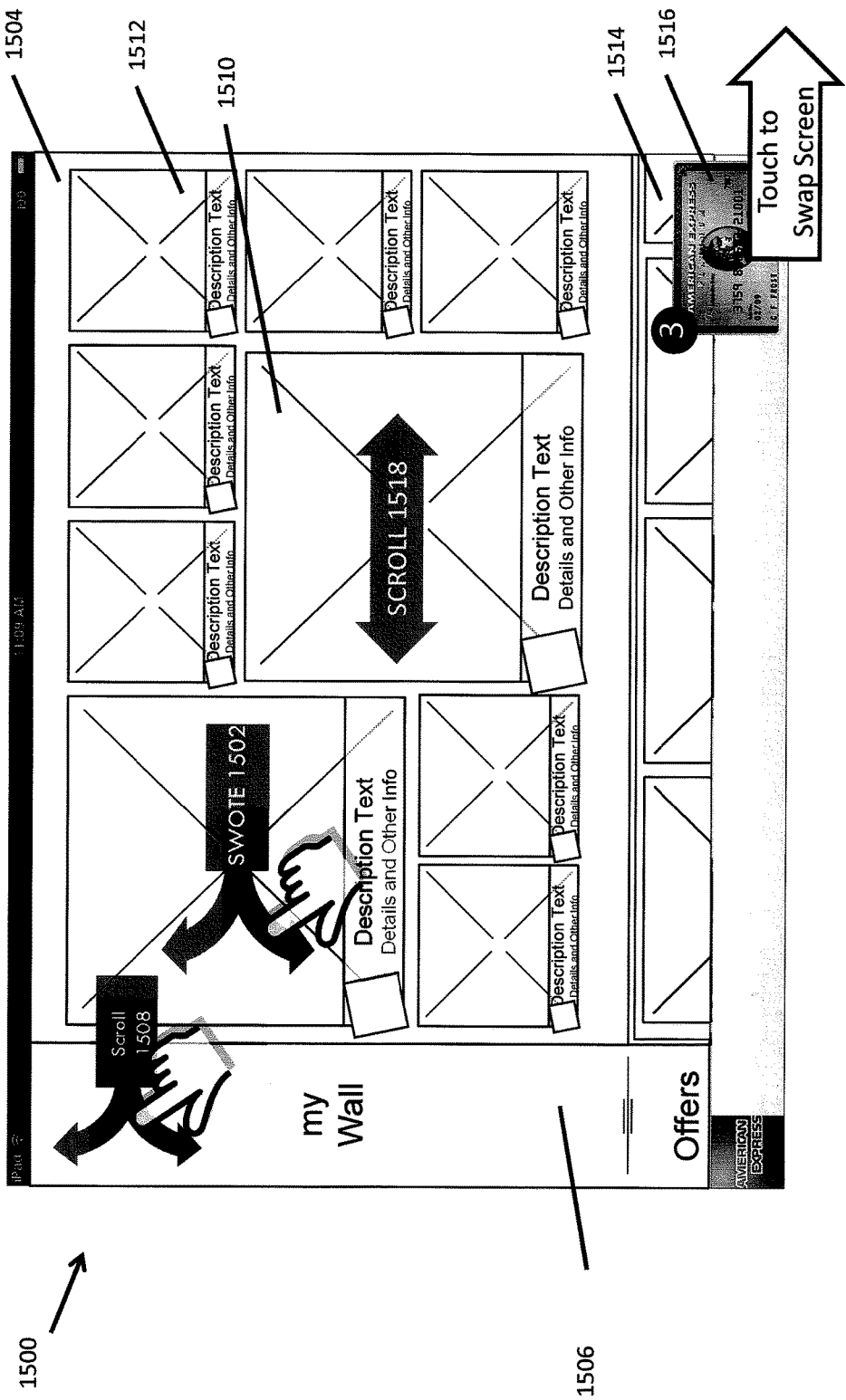

FIG. 15 illustrates a Graphical User Interface (GUI) simultaneously enabling scrolling and Swoting gestures on an exemplary computing device such as a touch screen tablet on the same screen. Specifically, disclosed is an exemplary gesture function reassignment upon the same user gesture input whose functionality is dependent on the particular area of user input e.g., between the Swote Area 1504 and the "my wall" navigation panel 1506. More specifically, input in the former reserves certain input such as substantially up/down gestures for Swote gesture input and not scrolling up and down 1508 on the screen (but allows scrolling to the left and right 1518). While input in the latter (the navigation panel), reserves substantially up/down gestures for scrolling the Swote Area. This functional reassignment upon input of the same gestures enables more input options on devices such as touch screen areas within the same screen. In other embodiments, this gesture reassignment can not only be dependent on area of a screen, but input of a touch/key command before or with the gesture input such as a "shift" key or after a pause on a touch screen before gesture input or other prior input.

In one embodiment displaying the screen 1500 as illustrated in FIG. 15, illustrates a display of brands such as ads/offers, the location dependent functionality to input Swote gestures 1502 on said brands within Swote area 1504 and the "my wall" navigation panel 1506 which enables scrolling and up and down navigation of the Swote Area 1504. Here, substantially up and down gestures in the illustrated embodiment enable the user to input different commands from the same gestures depending on which area of the screen the input is received. For instance, input of a substantially up or down gesture on a touch screen, Swote gesture input is enabled if received in the Swote Area 1504 while scrolling up/down is disabled in lieu of the Swote gesture input. However, scrolling left and right 1518 upon a given gesture left and right is enabled in this area and will thus scroll area 1504 left and right. This results in a user being able to sort brands or execute other actions with an up and down gesture while allowing the user to scroll left and right across area 1504 with a substantially left and right swipe gesture. In this embodiment, the brands are all in the Swote area and resized in the area without moving a brand graphic into a separate "like" or "dislike" row as in other embodiments. Specifically, the user has already input a Swote gesture on content such as content 1512 which is displayed at a smaller size given a negative user affinity Swote input and content 1510 which is displayed at a larger size given a positive or neutral user affinity Swote input.

In contrast, upon input of a substantially up or down gesture in the navigation panel 1506 results in scrolling 1508 up and down of the Swote area 1504 and optionally other area 1514 are scrolled up and down with the Swote area as well. In navigation panel 1506, the Swote gesture input is disabled in lieu of up and down scrolling. Said navigation panel may be comprised of representations of the Swote Area, other area 1514 etc., which give the user awareness (e.g., reference points) of the displayed areas as well as the undisplayed screen areas and partially displayed areas. Selector 1516 may be displayed and upon selection, may display another screen such as the user services screen 1408 or any other available screen in the application including the chooser screen 1404.

The above reassignments in gesture functionality based upon different screen areas or additional inputs, provide enhanced input options for the user. In one embodiment, the default gesture controls (e.g., standard events) implemented by the device operating system, application, mobile application etc. that are in response to user input on predefined areas, may be overridden and a new set (or a partial set) of gesture functionality maybe implemented upon activation of a mobile application or other program or input in a particular area of a screen. This may be done through web browser plug-in, an application, a mobile application, or other tools that are loaded with or before the application. The operating system code itself such as libraries may also incorporate gesture commands configured to respond different dependent on which screen area they are input. In another embodiment, application libraries used to write application may be replaced or supplemented with the above functionality. Here, upon input on defined areas (e.g., the Swote area or navigation panel), certain standard events are replaced with the above functionality. Any number of different input commands such as different gestures are contemplated such as up/down/left/right/diagonal, touch and hold, circular gestures etc.

As contemplated, any variety of gesture may have variable of functionality based on different screen input area. Substantially up, down, right, left, diagonal, zigzag, pinch, circular gestures, pinch and other gestures are non limiting examples.

Enhanced Information Gathering Tools

A common problem with garnering information about a user is a lack of sufficient information entered by the user. Her friends, associates, contacts and others perceptions of that person are valuable sources of information. Input from another user may be used to supplement the user's information to form a more complete user interest graph of the user as well as infer information about the person inputting.

For example, as discussed elsewhere at length, asking a person directly such as "where do you shop", "what do you dislike", "what do you feel neutral about" can be a very effective information gathering tool; in particular when it is combined with a brand sorter interface or enabled with Swote gesture input. However, asking these and other questions to other users can greatly supplement these questions. For instance, given two users who may be friends or may not even know each other (e.g., a fan and a celebrity) questions may be asked to one or each about the other. Said questions may be based on one or both of the user's interest graph. For instance if a husband's interest in the GAP is not known to a high level of certainty, the a wife who also has an interest graph may be asked about the husband's interest in the GAP e.g., by the brand sorter (e.g., "Like" or "dislike" these brands as in FIG. 19) or other tool such as Swote gesture inputs. In this embodiment, the questions on the brand sorter maybe "what is your husband interested/not interested in" and a plurality of brands shown. Any other content may be queried in this context as well.

The answering user (e.g., wife) may supplement information about the target user (e.g., husband) in a variety of other ways. This includes asking her different questions about any type of content for various reasons based on her husband's interest graph. In addition to asking because of undeterminative interest graph probabilities as above, data can be asked to explore an interest graph. For instance, random content such as brands may be asked to the answering user. Said random content may or may not have significant or any relationships to the target user's (husband) interest graph. This is a way to "seed" and grow interests to the existing interest graph. The answering user's (wife) answers may be integrated into the target user's interest graph and weighted accordingly; e.g., taking into account the answer was based on another's perception and may also consider the answering user's interest graph characteristics (e.g., past purchases, her interests).

Confirmation of a target user's interest may also be supplemented by the answering user. If a target user's interest graph infers a high negative interest probability toward the GAP, the answering's user's answer regarding the target user's preference may confirm or rebut the target user's interest graph.

Exploration of the target user's interest graph may also be accomplished by comparing his interest graph to that of known interests graphs such as those from marketing buckets. Specifically, interests/characteristics that a bucket(s) that the target user likely belongs to may be examined. More specifically, the characteristics that the target user's interest graph does not have in common with said bucket(s) may be presented to the answering user for her answer to further explore the user's interest graph.

The processes above may be presented to the answering user as a game such as on a social media webpage or mobile application. Specifically, the game's content may be to answer questions about the target user's interests (such as a social media friend or is otherwise connected to). Brands and other content may be presented to the target user via the above selection methods. Upon answering/sorting the content such as by the brand sorter illustrated in FIG. 19, brands or other content that the target user's interest graph that are associated with a substantial probability of interest or other criteria may be displayed to the answering user. This provides an entertaining way to supplement data about the target user from the answering users about the target user.

In one embodiment, the interests/characteristics in a target user's interest graph with the substantially largest likely probabilities are prioritized as the first to be asked to an answering user (e.g., likelihood probabilities >50%). This is because these larger probabilities can be used to present the target user with brands and other content and confirmation of interest is of importance. The remainder of the target user's characteristics may be randomized or otherwise prioritized as appropriate. These may include characteristics that the target user's interest graph has no data about as well.

In one embodiment, a targeted user is selected by a server such as an audience engine or social media server or an answering user. An answering user is then selected by the same method or she may self select herself. Selection of the answering user may be because of a relationship to the targeted user such as a friend, associate, coworker or other connection that indicates that the answering user likely knows a substantial amount of information about the targeted user. The answering user may be prompted to answer questions about the targeted user. A user may also choose to enter information about another user without being prompted. This may be accomplished by displaying an option to enter information about a user of her choice.

Questions are then selected for the answering user to answer. Here, the questions are created by a need to confirm the targeted user's characteristics from her interest graph. These selected characteristics may be those whose likelihood in her interest graph stands are above 50% probability. Questions may be formulated to query interest in brands, content, ads etc. The questions presented to the answering user for ads may be "is the targeted user interested in ad X"; for brands "is the target user interested in brand X". Questions may be asked regarding not only interest, but if the targeted user has owned, is likely to own, "is", would shop at, likes, feels, thinks, has done etc. These questions may be similar to any questions that would be asked in the brand sorter embodiments discussed in related patent applications. The questions may be asked in the positive as presented here, in neutral or in the negative (e.g., would never own, dislikes etc.). Along with the questions, content appropriate to the question is presented such as ads for questions about ads etc. This may be done through the brand sorter in which questions and answer areas in the positive, neutral and negative along with the brand icons may be presented to the user. The user may also be presented the questions appropriate for Swote gesture input in which a question is presented along with content and the content is configured with positive, neutral and negative command input. Upon the answering user input about the content, the results may be integrated into the targeted user's profile on an audience engine server similar to the a user entering her brand sorting answers to her own interest graph e.g., brand characteristic tags, probabilities and affinities integrated into an interest graph in a manner previously discussed. Content may be targeted to the targeted used based on the newly modified interest graph.

The answering user information may also supplement her interest graph as well for predicting future actions. For instance, the relationship status to the targeted user such as spouse, mother, friend, business associate etc. can be considered when predicting further actions of the answering user. For instance, a spouse who believes her husband is interested Williams Sonoma cookware may be shown related ads before her husband's birthday under the processes above.

Information Selection Interface

Figure 16:
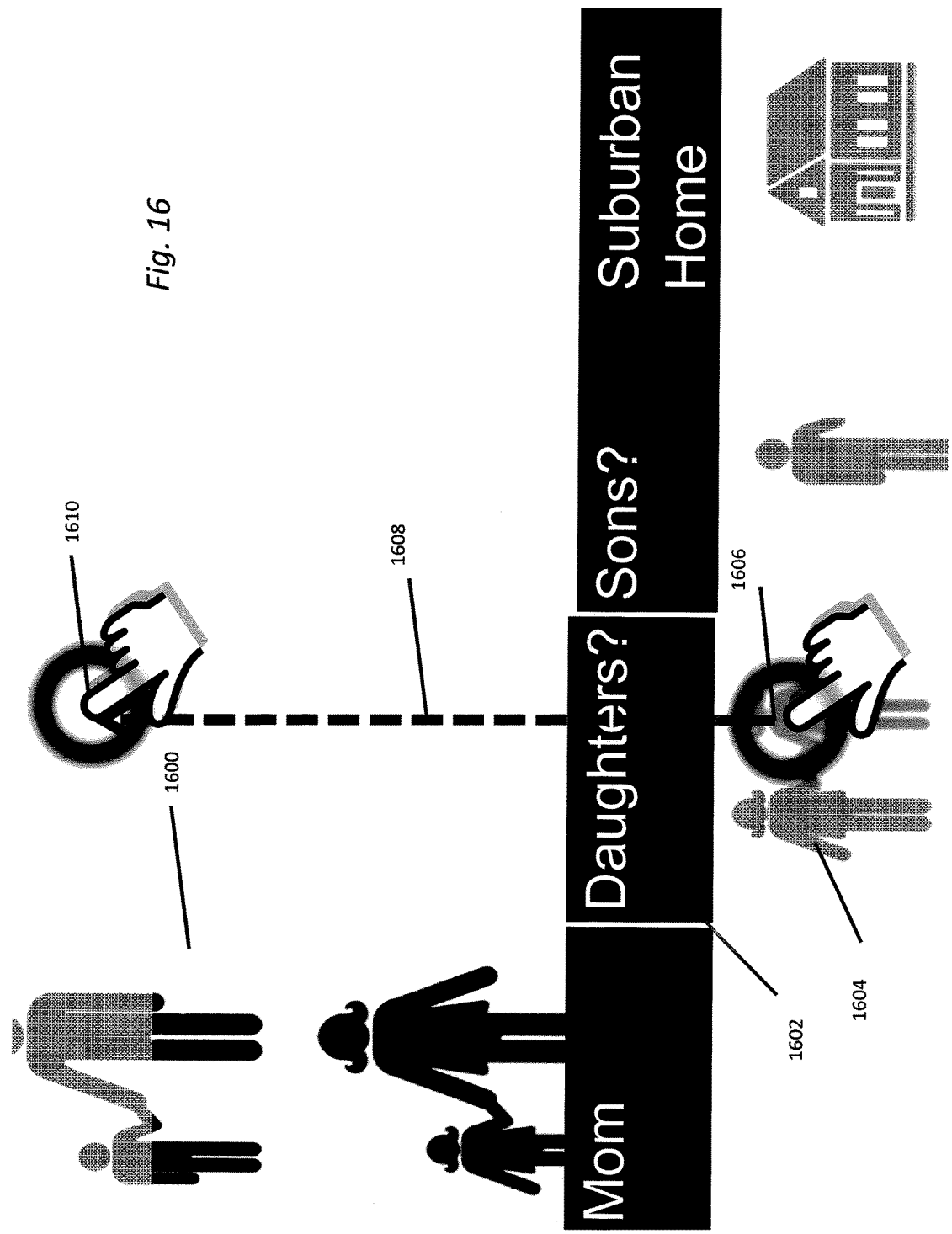
FIGS. 16-17 illustrate a system for content selection in accordance with an embodiment of the disclosed technology.
Figure 17:
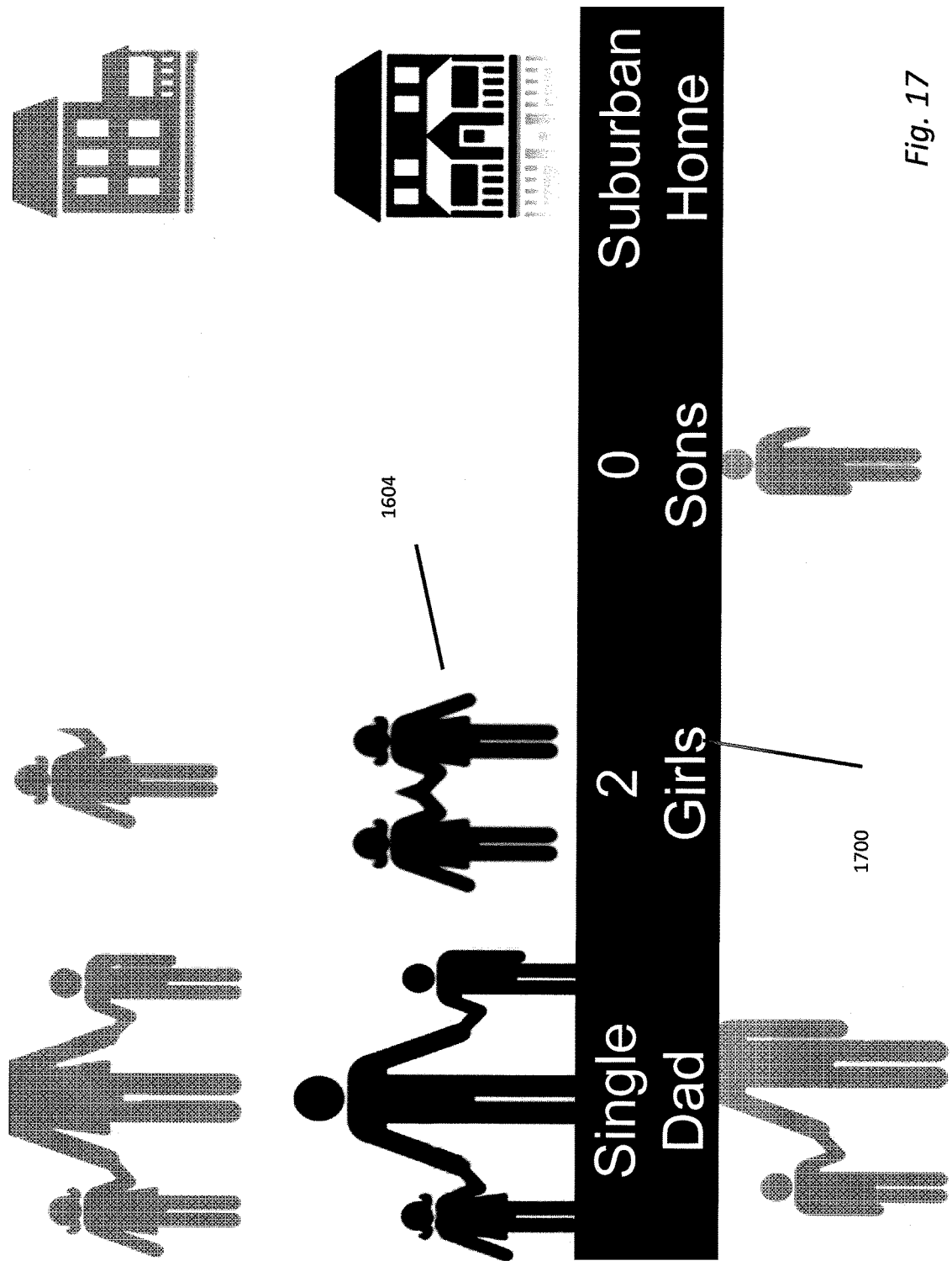

The brand sorter as illustrated in FIG. 19 and other presentation tools are valuable in providing the user with ways to enter input to displayed questions. As illustrated in FIGS. 16-17 are alternate ways to input information and answer questions. Input may be through a mouse, touch screen or other input devices.

Embodied in FIGS. 16-17 is an input method using "casino slot machine" like interfaces to present questions as well as possible answers. Columns, rows and other arrangements of content may be used to selected answers to questions. In one embodiment, the questions, answers and content may all be displayed within the same column simultaneously or in combination. Rows, columns and other arrangements can be combined to display and accept used input. Specifically a row may initially contain questions. For each column intersecting the row, an answer may be displayed. The user may scroll through the column and select an answer by placing the answer in a designated answer space, e.g., the middle part of a screen such as a touch screen. As the individual answers pass through the designated space, the question space may instead display the currently selected answer.

In FIG. 16, column 1600 as well as the three additional columns to the right are presented. The columns may contain questions such as "Daughters?" 1602 and answers such as a picture of two daughters 1604. Any question or answer such as a brand or other content may be presented for user selection. Here, the user substantially inputs an up and down gesture such as via a touch screen or mouse cursor input from starting point 1606 along arrow 1608 to 1610. These points may be anywhere on the column 1600. Here, the middle row which may turn content a different color, sharing or add indicia is the row that indicates user selection of answers in the answer space which is the middle row.

FIG. 17 illustrates the result of the user input in column 1600. Specifically, the picture of two daughters 1604 is selected in the answer space (middle row) and as a result the shading is different in contrast to FIG. 16. The space previously occupied by question 1602 may now be occupied with an answer such as "2 girls" 1700 which now reflects the currently selected answer. In this embodiment, the user may also scroll substantially left/right to reveal more columns/rows.

The above tools may be displayed to the user to confirm characteristics determined during brand sorting, reverse sorting, after the input of Swote input gestures etc. For example, the user may use the above interface to edit/correct data in her persona.

BACKGROUND MATERIAL

Technical Problems Solved

As discussed in this document, the discussed subject matter solves several technical problems. Specifically solved is the input and processing of user input information such as user affinity to efficiently determine user characteristics from content while leveraging the user's preexisting information before content presentation on a small mobile device screen among other computing devices. The related processing by a client/server is also made more efficient due to the enhanced gathering of information. Also solved is the problem of the user being overwhelmed with irrelevant advertising. The advertar solution as discussed herein, creates efficiencies as the user can more easily filter information and therefore be fed relevant ads and more efficiently specific block ads as well as similar ads.

Also solved is the problems of determining product demand by using prototype ads; user contextual awareness on computing devices by displaying other possible screens; and input and processing of relevant user geolocation brand affinity information among other problems.

Description of Computer Hardware

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

Figure 21:
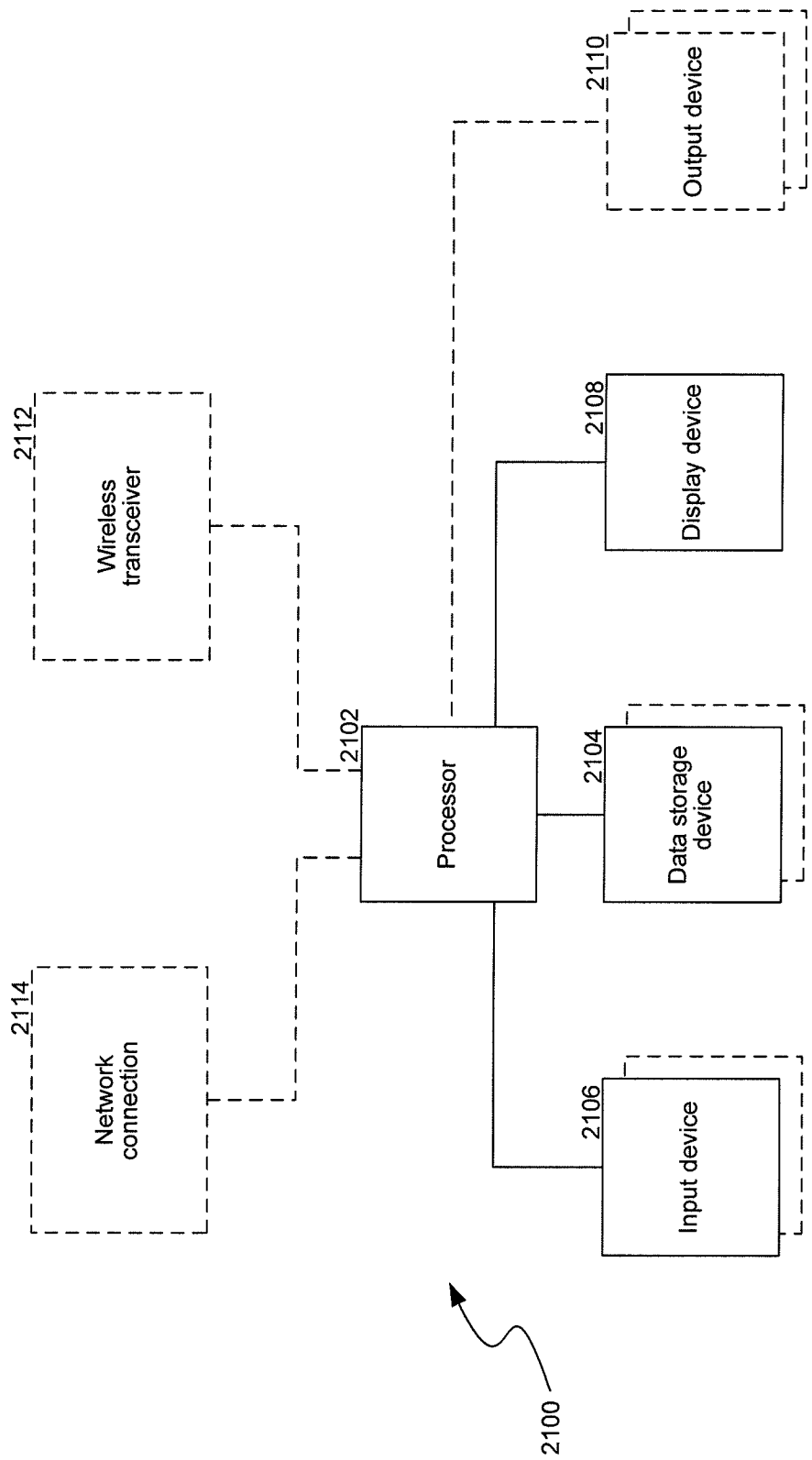

A non-transitory, computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing device using data stored on one or more computer-readable storage devices or received from other sources. A representative data processing device is shown in FIG. 21 which in one embodiment may be represented in FIG. 2 by device 201.

The data processing device includes "processor electronics" that encompasses all kinds of apparatus, devices, and machines for processing data, including by way of example a programmable microprocessor 2102, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices 2104 for storing data, e.g., flash memory, magnetic disks, magneto-optical disks, or optical disks. However, a computer need not have such devices. Moreover, a computing device can be embedded in another device, e.g., a mobile telephone ("smart phone"), a personal digital assistant (PDA), a mobile audio or video player, a handheld or fixed game console (e.g. Xbox 360), a Global Positioning System (GPS) receiver, or a portable storage device (e.g., a universal serial bus (USB) flash drive), to name just a few. Devices suitable for storing computer program instructions and data include all forms of volatile or non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device 2108, e.g., an LCD (liquid crystal display), LED (light emitting diode), or OLED (organic light emitting diode) monitor, for displaying information to the user and an input device 2106 such as a keyboard and a pointing device, e.g., a mouse or a trackball, track pad etc. camera (e.g., optical, 3D and/or IR), proximity detector, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser. The data processing apparatus 2100 may also include a wireless transceiver 2112 such a cellular radio, Wi-Fi or WiMax transceiver, Bluetooth transceiver and a network connection 2114 etc. The data processing device may also include an output device such as a printer 2110, camera flash, LED, haptic feedback, speaker, vibrator, NFC (Near Field Communication). In addition, the device may include location sensing devices (GPS etc.), as well as clocks and other circuitry (not shown).

Figure 22:
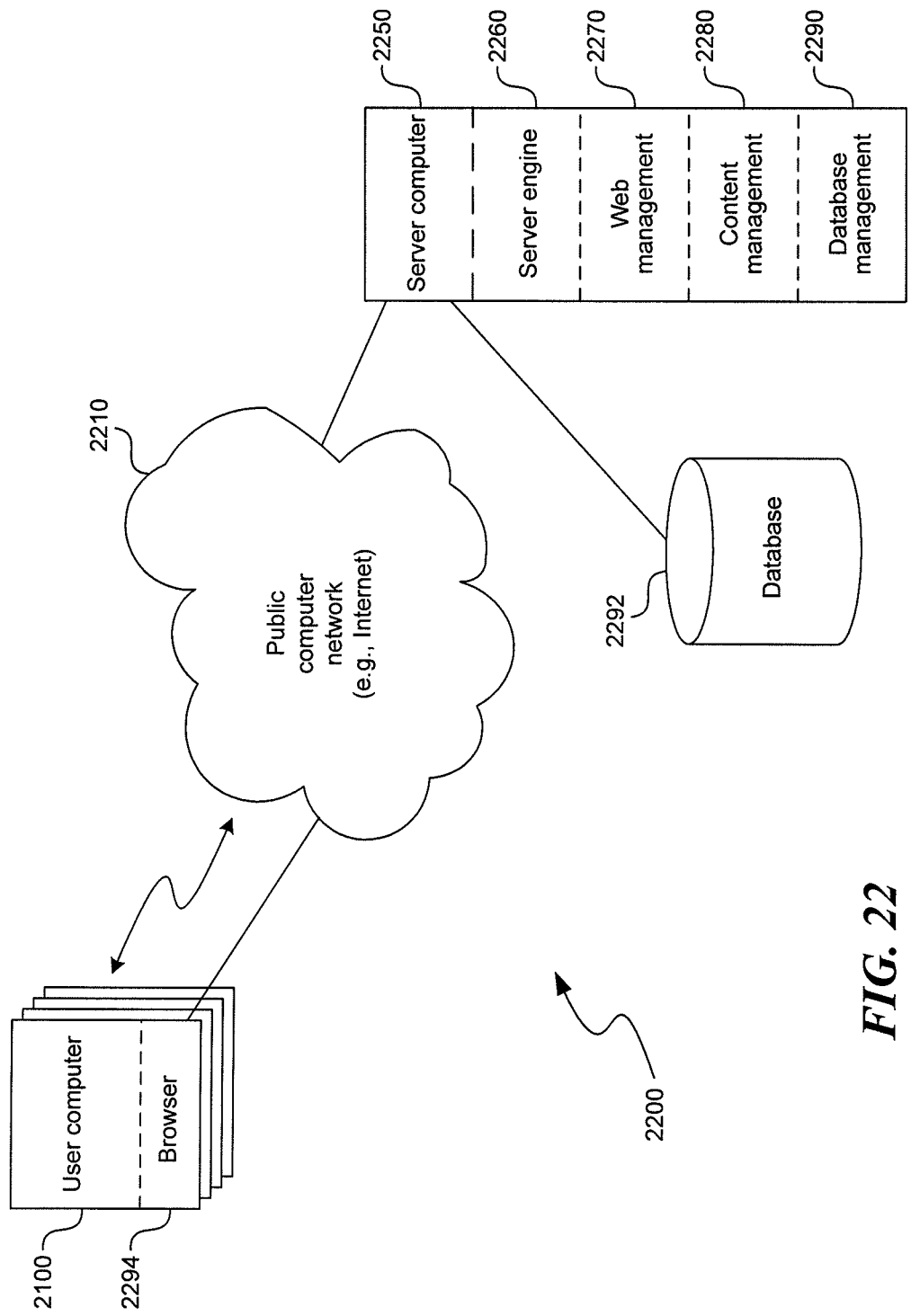

As shown in FIG. 22, embodiments of the subject matter described in this specification can be implemented in a computing system 2200 that includes a back-end component, e.g., as a data server, or that includes a middleware component, e.g., an application server, or that includes a front-end component, e.g., a client computer 2200 having a graphical user interface or a Web browser 2294 through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a wired or wireless local area network ("LAN") and a wide area network ("WAN"), an inter-network 2210 (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server 2250 transmits data (e.g., an HTML page) to a client device (e.g., for purposes of displaying data to and receiving user input from a user interacting with the client device). Data generated at the client device (e.g., a result of the user interaction) can be received from the client device at the server. In the embodiment shown in FIG. 22, the server computer 2250 operates server engine software 2260 and web management software 2270 to receive data from and send data to remote clients. In addition, the server computer operates a database 2292 to store persona/interest graph/Advertar/profile information for users who wish to receive ads and other content as described above. Content management software 1380 and database management software 2290 allow the server computer to store and retrieve persona information from the database and to search the database for personas that meet advertiser's criteria for a target audience.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

APPENDIX A

Overview of Swote™ Consumer Self-Profiling Tools

To allow a user to provide information about themselves without answering a number of long and tedious questions, a user of the disclosed technology can simply swipe content such as icons on a display screen. Input from swiping content on a display in order to vote on how the user feels about it is referred to herein as "Swote" input (e.g. swipe+ vote input). Swote tools discussed below provide: 1) a user a GUI (Graphical User Interface) with the ability to select/ input a plurality of commands through an intuitive interface on any device; and 2) a mechanism to allow a user to profile herself by self-curating unprepared content (or prepared content). From the ranking/categorization of like, dislike, numerical, relative ranking of content, or other methods of ranking/grouping content via the user input tools, the user can create/augment an advertar profile regarding her characteristics such as her interests/preferences. For example, a user can create/augment an interest graph-based profile via these tools which reflect data about her such as her interests/ preferences/demographic data. From this data associated with the user's profile or advertar, an analysis may be conducted and content which includes items such as brands, ads, offers, coupons, products/services, news, data feeds, pictures or any other data files etc. can be delivered to the user. This matching may be done as discussed in the incorporated applications by using distance/persona vectors.

Swote input may be performed by a gesture which moves an image of content on a display screen through a GUI. Swote GUI tools may focus on the 1) user's angular direction of an initial user point of interaction with the brand/ content and the final end point of interaction with the content e.g., the angular direction between the point where the user first touches the brand/content and the point in where the user ends the touch; or 2) the use of command zones in which the user places her finger/cursor or the content.

Swote GUI interaction and analysis may occur for self-curated, unprepared content. The unprepared content includes content, in which previously has not been formatted for processing by taxonomies, analysis for meaning, integration profiles etc. or whose formatting is not known to the entity that will analyze the data. This unprepared content may include information with no or few meaningful related data (e.g., tags). Some examples include: any content that may be displayed to a user such as news stories on a news website, hyperlinks, pictures as well as individual pieces of content such as user selected words, emails in her inbox, URLs, webpages, brands, ads, local files (local or remote) such as Microsoft Word documents through a file browser, music, videos, social media information such as friend profiles, user comments, products (pictures of the product, text, product numbers, SKU codes), users (Facebook, other advertars, celebrities) etc. These can all be, individually or simultaneously, the subject of Swote commands. Various other commands such as copy, paste, send, delete etc. can also be incorporated to be executed separately or with in combination with a Swote input. As such, Swote tools offer collection and the determination tools applicable to any data, which is then formatted for use such as analysis of the data's relevance to the user by those with no prior knowledge of the meaning of the data in the data's original context or the data's meaning to a user.

Tagging/assigning characteristics such as demographic characteristics and interests and assigning statistical probabilities to content that has received Swote input and tags as well as updating the likely characteristics defined by a user's advertar can be accomplished via parsing, semantic processing, natural language processing, context, image analysis (facial/product/geographical recognition), taxonomies, analysis of the information (content) source such as a URL/URI/data links and its demographics and related files, analysis of social/interest graphs/advertar of the user or other users, user personal information, user location, user activities, information from user computing devices, social media trends, marketing data and statistical probabilities as discussed in the incorporated applications as well as combinations of these tools.

In one embodiment of the disclosed technology, a user provides input about a brand (or ad or other content) by performing a Swote gesture an icon that represents the brand on a screen. The Swote gesture may be detected on a touch sensitive screen or using any other type of input device that can record a user's gesture such as a mouse or air gestures (e.g., Microsoft Kinect™), in response to the presentation of a particular items of content. Content may be presented visually (icons on a display screen) aurally (in music or the spoken word), textually (brand names embedded in other content) or via other means where the user can recognize the content and perform a gesture or otherwise provide a response to the content. In one embodiment, the direction of the gesture is indicative of whether the user likes or dislikes the content. However, how the gesture is performed may, also be interpreted to have a meaning about the content.

Swote Data Analysis

The analysis of content item and related data may be conducted to determine the "meaning" of the brand/content item and/or the meaning of the user's gesture actions (e.g., Swote up input) as well as related information and associated statistical probabilities. "Meaning" may be determined in a variety of ways such as examining the data discussed above as well as probable context of the input, taxonomies, user's history of inputs, browsing history, past profile information etc. The output from this analysis may be new categories of products/services the user is interested in and an associated statistical probability, a new updated probability for a previous category concerning one or more demographic/interest characteristics associated with the user, a new link and associated probability between the user's advertar and another user etc.

The analysis above may be via semantic tools, contextual tools, image/audio analysis tools, taxonomies, brand sorting, associating to marketing data (e.g., statistical probabilities) social media trends and other methods.

Determining the "MEANING" of Swote Data

In one example, Britney Spear's husband appears in a picture that receives a Swote up input by the user. The picture or pointers to the picture are analyzed locally or remotely. Here, characteristics and associated probabilities from the Swote input may be added to the user's interest graph or Advertar.

On a local or remote computing device, the image and optionally, the associated data such as the URL it came from, other files it is related to by tags, subject matter (other related Brittney pictures), other data it is stored with or related to by data links (other files/web pages it appears on), URLs it is related to, search engine results, other faces or features appearing in the picture (for sound files—other sounds, for video other features in the video, for text files other text or a combination of these) is analyzed as desired.

As above, the content itself may be mined for content. For instance, the content referenced by the pointer is analyzed and the husband's face is recognized by facial recognition technology and identified as her husband Kevin. In response, "Kevin", "Britney Spear's husband", "gossip" tags etc. are associated to that picture via taxonomy or marketing data and associated statistical probabilities previously discussed in the incorporated patent applications. The URL and associated text in the news story and captions where the picture were displayed to the user is also associated to that picture and meaning (characteristics and probabilities about/to the user) can be derived as well such as via sematic or other methods. The Swote input up command can be interpreted as the user liking this picture and weights and tags to this data may reflect this. This data may also be added to the user's advertar. Content recommendations can be made based off the revised advertar as a result of this self-profiling by content curation. For example, the advertar may be offered an ad for a shirt with his face on it.

In one embodiment, a pointer to a content item such as an ad such as a URL where the content is stored is received along with an indication of a "positive" Swote input. This data is also associated with the user's advertar. The URL and content item is analyzed and it is determined the URL is from a website associated to celebrity gossip that is frequented by young females who like the GAP™ brand. A date, time, place, mobile device type, operating system and other data on the user's device is recorded as well. Here, the date was on Valentine's Day at 8 pm on an iPhone from her home. The meaning from this may be that the user is a single female who may be affluent and also likely interested in online dating services. Various probabilities can be assigned given the totality of the gathered data.

Swote data analysis can also consider the context of the input via what commands are input and other factors—such as if the user owns it, would buy it; send to friends, copy, delete it, paste, hate it, your profile (it was determined you are an enthusiast), other voter's, time, place, URL, merchant, color, speed of the Swote input (the user may be likely hesitating during input).

In another embodiment, the user's picture that received a Swote up input of Britney is analyzed and though image recognition technology, her dress is recognized as brand X and the background in the picture is identified as Hawaii (either by image recognition technology, meta tags attached to the picture, information from the webpage (captions) etc.). The "meaning" assigned to the picture may be new or modified statistical probabilities that the user likes Britney, Britney's dress, Britney wearing the dress, Hawaii, Britney wearing the dress in Hawaii, Britney in Hawaii, Hawaii and the dress, Brand X and the dress and various combinations etc. This information may be entered into her advertar.

In another embodiment, a taxonomy is used to contribute to statistical probability characteristics within a profile/interest graph. For instance, if the interest graph had a characteristic of a beach scene X being liked by people who are very "fashionable", the above example may increase the probability that the user is fashionable. In addition, the Brand X dress in Hawaii may be interpreted as the user being interested in tropical fashion which may influence the fashion characteristic such as tropical fashion. In addition, the user's characteristic of "likes to travel" may be increased since the picture was in Hawaii. The user's browser history or past purchases might also be examined to confirm an interest in travel and to which destinations. Other goods/services from brand X and related goods/services, other people who wear the dress, relevant news articles etc. and information related to Hawaii may be recommended to the user and/or influence her profile characteristics in a similar manner.

More granular determinations are possible with more detailed user input. For instance, a picture of Britney Spears with several of her friends is something a user may input a Swote up input on. However in reality, the user may only like Britney Spears and not her friends. The user may highlight or otherwise only select and input a Swote up input Britney Spears and not her friends. This may be accomplished by preprocessing the image with facial recognition technology and allowing each face to receive a Swote input up or down (or with whatever commands are desired) with optional indicia next to each face in the picture to indicate Swote input potential. A "thumbs up" tag is associated to the desired faces and a determination to refine her persona for only Britney Spears and optionally purposely omit positive tags related to her friends. In another embodiment, the plurality of faces may be receive Swote input so that the faces may be ranked relative to each other (most favorite person to least favorite person) and appropriate tags associated in response to each Swote input. In other embodiments, brands such as logos, products and other objects could be recognized. Additionally each type of content may be given different commands such as a person may receive a command of "like her" vs. a product may be given functionality of "already own it". In another embodiment, content may be examined via past user input, marketing data, social/interest graph, profiles and may be assigned commands based upon historical trends. For instance, if Britney was largely "hated" by a large segments of the users, then commands and weights could be assigned like a large probability of hating her or commands or "hate her" or "really hate her" etc.

For instance, in another example, a user inputs a Swote up input brand X. Analysis by a remote or local computing device is done by analyzing similar or related content as optionally determined by a taxonomy/marketing data. Then, demographics related from at least that brand as determined from marketing data, the URL the brand was chosen from (e.g. the brand was originally shown on an EBay or Amazon page) and the URL can be analyzed for information (the URL was for a handbag etc. and related URLs) and associated to the user's profile with associated statistical probabilities. A search can be done for relevant products/services/news/reviews for the brand and recommended to the user based on the profile or optionally only the information above.

In another embodiment, a user goes to a social media page and inputs a Swote up/down on other users, and data on their pages. For example, the user inputs a Swote down gesture on a movie star Facebook profile, but inputs a Swote up gesture on a picture of her and her handbag from a certain movie. The content is analyzed and it is optionally concluded since she Swoted down her Facebook page, but Swoted up the picture, it is determined that the user likes the handbag and/or the movie as opposed to the Facebook profile. Further questions/analysis/data sorting can be done to determine if she likes one or both the handbag and movie.

In yet another example, a user can Swote on a picture objects can then be recognized and data can be associated to it via taxonomy, GPS location where the picture was taken, comments about the picture in social media can create modifications to her profile.

In another embodiment, the user ranking/voting from Swoting can be combined with her friend's Swote input done by the same or similar methods. This can be useful when determining common interests such as via an interest graph. As such, friends or strangers with previously unknown common interests, geography etc. can be recommended ads (e.g., deals which may require multiple people to fulfill or group vacation ads) to people with similar interests determined at least in part by the above methods.

Tag weighting may also consider past consumer actions such as previous Swote input, Swote input of associated users, purchase history from an associated account, browser history, personal data such as demographics, brand Swote input, location history, associated devices, credit card history etc. For instance, people who like red dresses may frequently like red shoes and other red objects. In turn red, objects associated to the user's profile may receive additional tag weighting. This frequency may justify the term red shoes being attached to the user's persona so she may get ads for red shoes.

In one embodiment, tags, and probabilities associated to content may reveal information about the content in relation to other users. For instance a picture rated disliked by a large number of users may reflect information about a user who likes the picture.

In one embodiment, content could be received without a tag. Tagging and weighting could be executed regardless based on historical trends, the user's location, date, time of input etc.

In one embodiment, a brand such as "Subaru"™ is received with a Swote up indication. Marketing data pertaining to the brand could tag and assign weights to the content while considering the Swote up and to other information in an advertar as well as the location, time, date of the user input of Swote up as well as the context the Subaru brand was Swoted up such as a car expert forum or the Consumer Reports™ website.

Primer on Interest Graph/Profiles

As discussed in the incorporated patent applications, advertars/profiles of a user may reflect characteristics and associated probabilities among other information. As such, interest graphs may be a part of a profile. As the user inputs information by sorting content and/or performing Swote input (see below), advertars may be created or supplemented with this data.

In one embodiment, an interest graph refers to the specific and varied interests that form one's personal identity, and the attempt to connect people based on those interests. Individually, this may mean different things one person is interested in—be it jogging, celebrity gossip, or animal rights and other interests that make up their likes and dislikes, and what has more meaning to them over another. On a broader scale, it's the way those interests form unspoken relationships with others who share them to create a network of like-minded people.

Figure 18:
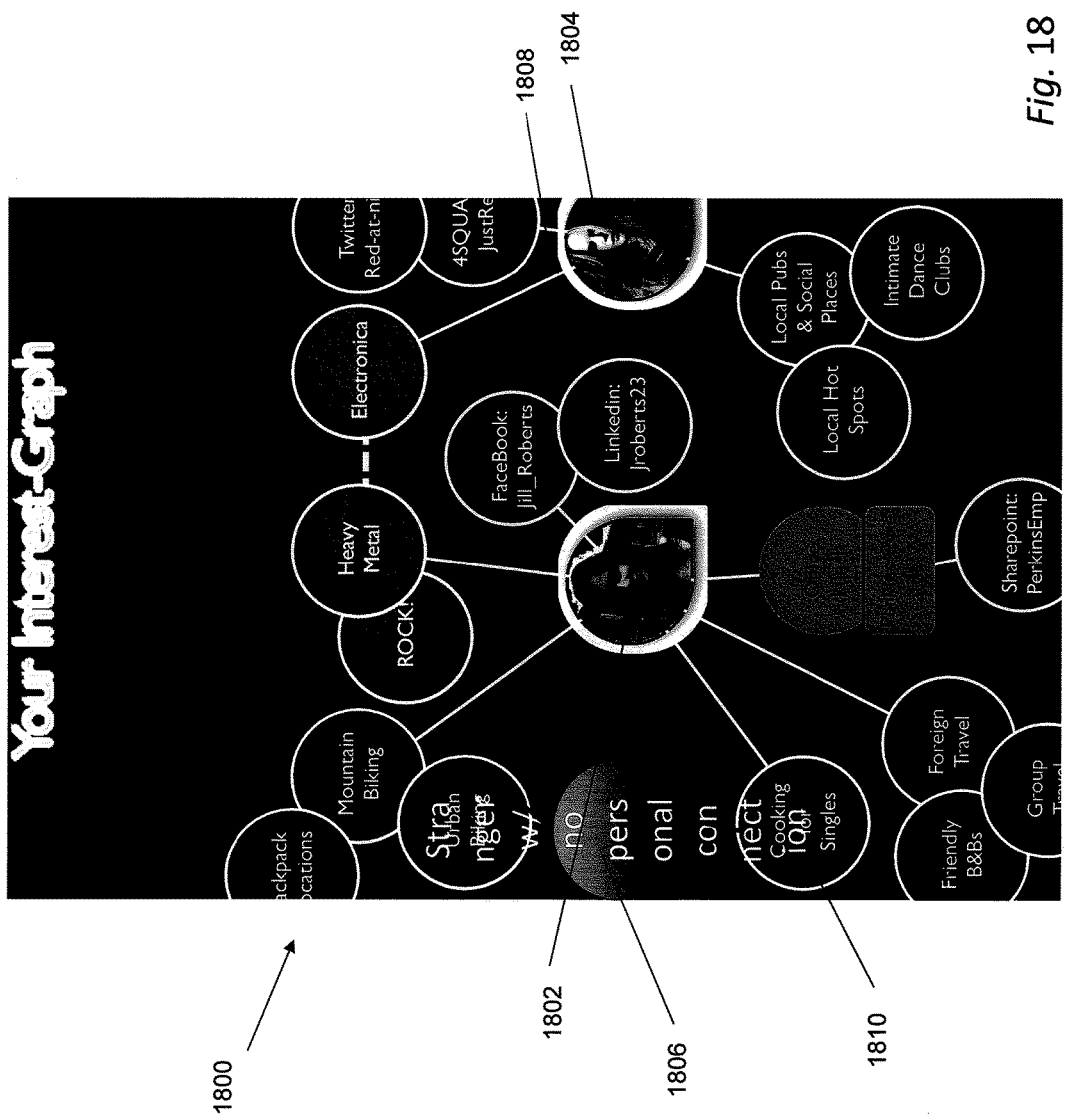
FIGS. 18-22 illustrate briefly the technology discussed in the incorporated patent applications including brand sorting, tying brands to marketing data, a GUI for a brand sorter, an audience engine, serving ads based upon a user's profile, the creation of a user's profile based on brands, a block diagram of a user's computing device in accordance with an embodiment of the disclosed technology, one embodiment of a networked computing system used in implementing the disclosed technology and an exemplary interest graph among other concepts.

As an example, FIG. 18 illustrates one embodiment 1800 of an interest graph. As illustrated, are a first user's advertar 1802, a second user advertar 1804 and a stranger's advertar 1806 to whom a user has no personal connection to and may not even know. Link 1808 is a statistical probability (which can be positive or negative) for a characteristic (e.g., an interest) for an advertar as well as a relationship probability between the interests it connects, while 1810 is a interest in "cooking for singles" in which stranger 1806 and user's advertar 1802 have in common.

As opposed to a social graph (which may also be included or may contribute to an advertar) an interest graph focuses on shared interests regardless of personal connections (such as the "cooking for singles" interest) while a social graph focuses on connections based on personal connections. (In some embodiments, advertars may incorporate social graphs as well or just social graphs alone).

While the social graph consists of a users known to other users, the interest graph consists of what they like, what moves them, and the facets of their personality that, in part, make up who they are and optionally users they may know. These connections can be much stronger, and much more telling, than simply who they are friends or acquaintances with. Two people being linked together because they knew each other in elementary school or work at the same job doesn't necessarily indicate anything about them beyond their connection to each other. And for the people involved, it doesn't always foster a very strong or lasting connection. As such, an interest graph may offer more insight into each person's personal tastes, preferences and behaviors.

In one embodiment, a persona/Advertar may be an interest graph or part of an interest graph focused on an interest(s) or other characteristic(s) of a user such as a work advertar, a vacation advertar etc. A user profile may contain a plurality of these. A plurality of personas from different users (as illustrated) may be combined by interest graph relationships, which may reveal common characteristics, help explore potential characteristics and promote communication between users who may not have previous relationships. In one embodiment, an interest graph comprised of a plurality of users may be examined and used to communicate to a single user, a plurality of users, a plurality of users or advertars with common characteristics etc., Thus, given X users connected in an interest graph who share common interests, are most likely more interested in the same advertising compared to users who do not share these users common interests. In addition, characteristics and associated characteristics (e.g., via a taxonomy) as well as statistical probabilities of those users can be studied and offers, interests, products and other goods/services can be developed specifically for those demographics. This provides a highly personalized experience and also connects a user to users who have characteristics in common who otherwise might never meet each other.

Personas/Profiles/Advertars

In one embodiment, the demographic characteristics attributed to a persona are determined based on responses to the user's indicated opinions such as likes or dislikes of a number of brands. As used herein, characteristics may include the demographic characteristics of a population such as (gender, age, location, marital status etc.) as well as properties, characteristics or traits relating to single individual users such as a user's individual interests.

Personas can be created in any number of ways. For example, a user can complete a questionnaire by responding to questions regarding the user's gender, age, income level, residence, political affiliation, musical tastes, likes or dislikes (e.g., interest keywords), pieces of content (e.g., pictures) she likes/dislikes and so forth. Such a questionnaire can be provided on a software application (e.g. an app) that runs on a user's computing device or on a designated web site. The answers provided to the questionnaire are converted to one or more likely demographic characteristics that advertisers can use when choosing a target audience for their ads. Characteristics such as demographic characteristics allow the advertisers to search the personas to find those personas of users that meet the criteria of the advertiser's target audience. Ads can then be sent to the addresses or identifiers associated with each of the personas.

In another embodiment, personas are defined in a way that infers the user's demographics based on the user's opinions of (e.g., how the user likes or dislikes) various brands/content which may supplement or even replace the above techniques of gathering data. Such tools may be the Brand Sorter as illustrated in FIG. 19 and/or Swote gesture inputs as in FIG. 2.

Brand Sorting/Marketing Data/Brand-Ad Matching Calculations/Audience Creation

Operation 1 in FIG. 19 illustrates a method by which a user can indicate their opinion of a brand such as if they like a brand either more or less or feel neutral about the brand. As used herein, an opinion may encompass input from any user interaction with or relating to the brand. Such examples include if a user likes (e.g., a positive affinity)/dislikes (e.g., a negative affinity), purchase/would not purchase, want/do not want as well as if a user is "following" a brand such as following a brand via Twitter™. In the embodiment shown, the interface screen is divided into three areas (which may the interface on a mobile device touch screen, or other computing device). A neutral area (middle row) represents a neutral feeling about the brand (or unfamiliarity with the brand). Top row is an area where the user places icons representing the brands they like more/shop at while bottom row is an area into which the user places the icons that represent the brands they like less or does not shop at.

In one implementation, each persona is associated with one or more tags representing different characteristics (e.g., characteristic tags) such as different demographic characteristics. The association may be determined via the brand sorting during persona creation. A tag may store or be associated with a value that represents the likelihood (e.g., a probability distribution) that the demographic characteristic represented by the tag is applicable to a user. For instance, the value of the tag may reflect a probability that the user is male while another tag represents the likelihood that the user lives in New York.

Based on the user's indication of their opinion of the brands, such as if each brand is liked or disliked, the tag values can be combined into a composite value that reflects that likelihood that the user has a particular demographic characteristic.

In one embodiment, the composite demographic information is created from the group of brands that are sorted by the user based on her opinions of the brands. In the example shown in FIG. 19, a user indicates that they shop for (e.g. like) brands 1, 2 and 4. The user has indicated that they don't shop for (e.g. don't like) brand 6 and are neutral towards (e.g. don't like or dislike or are unfamiliar with) brands 3, 5, 7, and 8. In one embodiment, the tag values representing the likelihood that a user has a particular demographic characteristic are combined depending on if the brand is liked or disliked. In other embodiments, buy/not buy, would buy/would not buy, use or would use, do not or would not use as well as other opinions or impressions can be presented alone or in combination.

In one embodiment of the disclosed technology, the tags for the brands represent the same demographic characteristic. For example, Tag 1 for all the brands may represent the likelihood that the user is a male between ages 25-40, while Tag 2 may represent the likelihood that the user is a male between ages 40-55. Tag 3 may represent the likelihood that the user is a woman between ages 18-22 etc. Each tag has or is associated with a value representing the likelihood of a user having a defined demographic characteristic. These values for the tags are typically determined from information gathered from consumers who volunteer information about themselves and what brands they like, purchase etc. Such information is typically gathered from marketing data from consumer surveys or a variety of other data sources. The details of associating consumer demographic information with particular brands are considered to be well known to those skilled in marketing. In other embodiments, users may assign a value to a brand by inputting the value itself into the computing device, assigning a relative value to each brand and or tag (brand X given a higher preference to brand Y by giving brand X a location assignment a screen above or to the right of brand Y) etc.

In one embodiment, the composite demographic characteristics for a persona are created by arithmetically combining the values of the tags for the liked and disliked brands. In the example shown, Brands 1, 2 and 4 are liked so their tag values are summed while Brand 6 is disliked so its tag values are subtracted. When combined as illustrated, Tag 2 has a summed value of 4.0 (1.5 plus 1.5 minus (−1.0)). A value of 4.0 for a tag may represent a strong likelihood that a user has the demographic characteristic defined by the tag. On the other hand, a tag with a combined value of −2.5 may provide an indication that the user probably does not have the demographic characteristic associated with the tag and an inference can then be made. For example, if a composite gender tag value suggests the user is likely not a male, an inference can be made that the user is a likely female. A composite of the values of the brand tags across the brands (e.g., the sum of statistical probabilities of tag A across brands X to Y) may also be represented by a vector that is associated with the persona. Each brand tag value may be a dimension of the vector.

In one embodiment, based upon the composite demographic characteristics, the corresponding user or persona may be placed into pre-computed demographic segments. Such pre-computed segments are typically determined from marketing survey data. Once the user is assigned to the segment, additional associated characteristics of the pre-computed segment may be associated to the user. In addition, ads that have been specifically designed to target the pre-computed segment may be delivered to the user.

In one embodiment, an ad/offer/content that a persona may be interested in receiving may be matched with the persona based on said persona vector. Typically an ad or other content comes with or may be associated with via the disclosed tools-tags such as coffee, sale, spa, dancing lessons etc. Here, an ad/offer's tag values may be assigned based on marketing data taken from consumer surveys such as a probability distribution that a certain demographic (age, sex, income etc.) would likely desire to receive ads with a given ad tag. The composite of ad tag values represent a vector for the ad. Each of these offer tag values may therefore be considered as an ad vector dimension. In one embodiment, tags related to the ad tags may be assigned along with their associated values to aid in ad-persona matching.

Once a persona is defined, a plurality of ads can be ordered for presentation to the user according to likely persona affinity. By calculating the distance between the persona vector and the ad vector, such as their distances in N tag space, ads can be ranked in order of likely persona desire. The result of this distance calculation may be a ranked list of ads in order of affinity (i.e. the distance between the vectors) for a particular persona vector. In this manner, instead of filtering out ads, a relative ranking of ads is produced. Alternately, other distances between the ad and persona vectors (or any of their components) can be calculated to produce a ranking. Various other methods of ad filtering and ad sorting to match the appropriate ads to the persona may also be used. In some embodiments, location, past purchases, sale times/items, membership in customer loyalty programs, percentage off and other factors may be used to aid in ad ordering/selection. In one embodiment, the calculated affinity for a particular ad is displayed to the user as stars (e.g., an ad with a highly calculated affinity is four our of four stars etc.). In another embodiment, the ordering/filtering may consider the ratio of the geographic distance to an offer and the percentage off. For instance, if an ad is only 10% off and the distance is several hundred miles from the user, this ad would have a lower ordering then an ad that is 90% off and one mile away from the user. Here, the distance and percentage off etc., may be displayed to the user as well. In yet another embodiment, the persona may keep track of ads that resulted in a purchase by the consumer. After a purchase, the user will not be shown the ad on the persona that made a purchase or on all her personas.

Optionally, the dimensions on the persona vector and/or the ad vector can be normalized by multiplying the dimension by a scalar between for instance, zero and one, to prevent particularly strong tag dimensions from skewing the results.

In some embodiments, a user may not be limited to the binary choice of only indicating that they like or dislike a brand. The user may be presented with controls to indicate that they strongly like or dislike a brand based on a number of discrete levels or using a sliding scale etc.

Taxonomies

In one embodiment, once a user has created or adopted one or more personas, the personas are registered with a server computer that maps a persona to one or more addresses or other identifiers to which ads should be delivered. As discussed above, the address may be an e-mail address, IP address, device ID., web site or another logical address that can be used to direct ads to the user.

A selected persona defines one or more characteristics (such as interests like That food) that may be of interest to advertisers in selecting a target audience to receive their ads.

A taxonomy may also expand the user's interest tags. For example, the user has rated That Restaurants a +6. As such, the user would probably be interested in prepared foods in general as well as That foods and perhaps even travel to Thailand (this may be based on marketing data or other tools). These relationships can be from user survey information. The new tags and associated values can be assimilated into the persona. This expansion of tags provides the user the opportunity to see additional topics, brands, times, locations and other related information. In addition, a user may give feedback on the tag's desirability and associated value.

Ads and other content may be displayed to users on the same device on which brand sorting occurred or on multiple different devices. The ads may be shown on these devices within a specified amount of time or upon an event trigger such as proximity to a merchant's store, the start of a sale, another user expressing interest in the ad etc.

Weighting

In one embodiment, the demographic information associated with a persona is refined depending on how the user reacts to ads delivered to the persona or previous brand sortings. For example, if the user indicates that they do not like an ad, one or more tag values associated with the persona may be adjusted. In this way, a persona's determined demographic characteristics can be continually improved or updated. In one embodiment, ads can be shown as icons and displayed and assigned affinity/voted on in a manner similar to how brands are sorted as illustrated in FIG. 19 via the illustrated brand sorter. Answers such as "like the ad" "neutral" and "dislike the ad", a picture of a "thumbs up" and "thumbs down" may be displayed on various screen areas so the user may know where to drag the icons to and thereby assign affinity to the ad.

In one embodiment, the feedback from user assigned ad affinity may make very granular adjustments to a persona. In one embodiment, a simple vote on an ad may modify a plurality of aspects of a persona by considering the specific tag, subcategory tag and associated weights among other things. If an ad was assigned a negative affinity, the tag and associated values may play a lessor role in assigning ads in the future. Assignment my be dragging a brand from one affinity row to another by cursor, touch screen etc.

System for Delivering Ads to Personas

FIG. 20 illustrates an exemplary system 2000 for creating personas and ad serving to a persona on a computing device. At 2002 a mobile device is shown. On the screen are images representing four personas tied to a single account. A user may optionally register the account under any identifier including an email address. In one embodiment, the email address is one way hashed and discarded after the hash. The hash is optionally stored by the audience engine and serves as an identifier. This prevents the storage of user's identifying information on non-user devices and enables the user to have an identifier in case she forgets her password etc. In another embodiment, only one persona is created and no identifier is asked from the user. Instead, a software install ID or other identifier is used to identify the persona.

A persona may be created by optionally choosing a name for the persona, associated interests/keywords (e.g. to help focus ad searches), social media accounts to tie the persona to and active locations/times the persona should be active among other parameters. Then, a brand sorting screen may be displayed at 2004. Upon sorting a number of brands, at 2006 and 2008 the brands that define the persona are transmitted to an audience engine 2010, which may be on a remote server.

The persona's demographic characteristics are matched with ads, offers, coupons, services, products, content recommendations or other similar things. Typically, the audience engine 2010 is in communication with a third party ad server and/or ad bidding system (not shown). The ads may be pre-downloaded to the audience engine 2010 and analyzed. Analysis may be performed by assigning tags and associating statistical probabilities that particular demographics would be interested in the ads or assigning probabilities to existing tags or other data related to the ad. The ads are then optionally ordered in relevance to the characteristics of a particular persona's vector as previously discussed. Here, in response to the persona creation, a plurality of ads and other content are pushed to the mobile device at 2012 from the audience engine 2010. The ads are pushed into a local ad server 2016 on the user's computing device. Here the local ad server is within the application 2014 that created the persona. Within the application 2014, is an ad tracker 2018 with a ticket book. Each ticket may be used to request an ad from an in-application persona API 2022. In one embodiment, a ticket may contain information to display an ad to one or more personas and/or to different devices or applications associated with the persona.

The request for an ad may occur upon a user or a software request or on the occurrence of an event such as an arrival of the device at a physical location, keyword in communication, predetermined by an advertiser, event on a calendar, time of a TV show, a triggering event such as visiting a website, date of a product sale etc. API 2022 may start the ad request at 2024, which is transmitted to ad tracker 2018. Ad tracker 2018 returns a return ad ticket at 2020 to API 2022. API 2022 then submits the ad ticket and application ID at 2026 to the local ad server 1616. The local ad server then displays the ad on the device or other connected devices at 2028. In one embodiment, the application ID at 2026 can be directed toward other applications on a plurality of connected devices in order for an ad to be shown on other devices. Optionally, upon display of the ad, at 2026 a request can be made to a connected device to display other content such as a website related to the displayed ad or the ad itself on other devices.

I claim:

1. A non-transitory computer readable medium having instructions stored thereon that are executable by processor electronics configured to:
   receive preexisiting data from a user device associated to a user profile of a user, wherein the preexisting data is comprised of user location data which comprises a number of times the user was inside a boundary associated to a brand device, wherein the user location data was determined on the user device by the steps of:
   displaying on the user device a user interface permitting the selection of a plurality of different location boundary granularities;
   receiving a user selected location boundary granularity, wherein a location boundary granularity represents a specific geographical boundary specification; and
   in response to the selection of the location boundary granularity, determining user location data, wherein the user location data comprises location data with only location boundary granularities with the same specification or greater specification than the selected location boundary granularity;
   determine a characteristic of the user and an associated characteristic statistical probability based on a brand affinity, which is calculated at least from the preexisting data, wherein the determination of the user characteristic comprises associating said brand affinity with a preexisting data characteristics tag and an associated statistical probability characteristics tag based at least upon one or more of marketing data or a taxonomy, wherein the associated statistical probability characteristics tag represents a statistical probability of the user having the characteristic represented by the pre-existing data characteristics tag;
   associate to the user at least two marketing brand buckets comprised of a first and a second marketing brand bucket, in which association comprises matching the user characteristic to the first marketing brand bucket using one or more of marketing data or a taxonomy, wherein the at least two marketing brand buckets each comprise a plurality of brands associated to users of brands associated with the respective buckets as determined by marketing data;
   select at least one brand to be presented to the user, wherein the at least one brand selected is associated to at least one brand characteristic tag that is matched with the determined characteristic of the user, and the brand characteristic tag is associated to a brand statistical probability characteristics tag, wherein the brand statistical probability characteristics tag represents a statistical probability of users of the brand having the brand characteristic represented by the brand characteristic tag, wherein the at least one brand is selected from the plurality of brands from the associated first and second marketing brand buckets in which the at least one brand is selected in response to a determination that the at least one brand has the highest probability to determine the determined user characteristic relative to other brands from the plurality of brands;
   receive user feedback indicating whether the user has an affinity for said at least one brand; and
   based on the received feedback, change a confidence level that the user has the determined user characteristic.

2. The non-transitory computer readable medium of claim 1, further comprising instructions to determine neutral user affinity feedback.

3. The non-transitory computer readable medium of claim 1, further comprising instructions for assigning a weight to a piece of said preexisting data based on marketing data.

4. The non-transitory computer readable medium of claim 1, further comprising instructions to receive user feedback input in response to when the user moves a touch point on a display screen in a predefined direction over said at least one brand.

5. The non-transitory computer readable medium of claim 1, further comprising instructions for storing the user feedback input as a brand affinity tag.

6. The non-transitory computer readable medium of claim 1, further comprising instructions to add the one or more determined characteristics to an interest graph.

7. The non-transitory computer readable medium of claim 1, further comprising instructions to protect the user's privacy by creating a unique intermediary identifier configured to be used as an intermediary between the preexisting data and a user ID associated to the user.

8. The non-transitory computer readable medium of claim 1, further comprising the instructions for:
   presenting the at least one brand for user feedback to a second user different than the user;
   receive second user feedback indicating whether the second user determines that the user has an affinity for said at least one brand; and
   based on the received feedback from the second user, change a confidence level that the user has the determined characteristic.

9. The non-transitory computer readable medium of claim 1, further comprising instructions for selecting the at least one brand from the plurality of brands from the first and second marketing buckets based at least on the at least one brand being associated to the brand statistical probability characteristics tag having a higher signal to noise ratio than brand statistical probability characteristics tags associated to the other the brands from the first and second marketing buckets.

10. A non-transitory computer readable medium for a user profile creation tool, having instructions stored thereon that are executable by processor electronics to:

receive preexisting data from a user device associated to a user profile of a user, wherein the preexisting data is comprised of user location data which comprises a number of times the user was within a boundary area associated to a brand device, wherein the user location data was determined by the user device by:
displaying on the user device a user interface permitting the selection of a plurality of different location boundary resolutions;
receiving a user selected location boundary resolution, wherein a location boundary resolution represents a specific geographical specification; and
in response to the selection of the location boundary resolution, determining user location data, wherein the user location data comprises geographical area references having only the same geographical specifications or greater geographical specifications than the selected location boundary resolution;
determine meaning of the received preexisting data, wherein the determination comprises associating at least a portion of said preexisting data with a preexisting data characteristic tag, wherein the association of the portion of preexisting data with said pre-existing data characteristic tag is based on one or more of a taxonomy or a marketing data association;
based at least on said meaning, select at least one set of brands in which each brand in the set of brands is associated to a common characteristic, wherein the selection comprises associating the preexisting data characteristic tag to a characteristic tag associated to the set of brands;
select at least one brand from the set of brands for user presentation on the user device, wherein selection comprises:
selecting the at least one brand from the set of brands in which the at least one brand is determined to have a highest conclusive probability to determine the pre-existing data characteristic or the common characteristic relative to other brands from the set of brands; and
receive user feedback on said at least one brand from the user device.

11. A non-transitory computer readable medium having instructions stored thereon that are executable by processor electronics to:
display a user interface permitting user selection of a plurality of different location boundary resolutions;
receive a user selected location boundary resolution, wherein a location boundary resolution represents a specific geographical area specification;
in response to the selection of the location boundary resolution, determine user location data, wherein the user location data comprises location data having resolutions only to geographical area specifications having the same area size or greater than the selected location boundary resolution;
select a preexisting characteristics tag and an associated probability based on the user location data which comprises a frequency that a device associated to a user is within a geographical area associated to a brand device which is the same geographical area specification or greater area specification than the selected boundary resolution;
transmit to a remote computer, the preexisting characteristics tag and the associated probability, both of which are configured to be associated to a user profile;
in response to transmitting the preexisting characteristics tag and the associated probability, receive references to at least two brands selected from a plurality of brands for presentation to the user on a display screen, in which the at least two brands were selected by the remote computer by:
assigning the preexisting data characteristic tag to the user profile;
determining at least two preexisting data characteristic tags in the user profile that are each associated to a probability that each preexisting data characteristic tag is greater than fifty percent probability of a user associated to the user profile having the characteristic represented by the preexisting data characteristic tag; and
selecting the at least two brands from the plurality of brands in which the at least two brands are a combination of brands that when presented to the user, are determined to elicit user feedback that has the greatest probability to further determine the at least two preexisting data characteristic tags relative to the other brands comprising the plurality of brands;
detect a gesture regarding an affinity for at least one of the two brands;
in response to the detected user affinity gesture, transmit the affinity to the remote computer; and
receive content based on the transmitted affinity.

12. The non-transitory computer readable medium of claim 11, further comprising instructions for determining a user affinity for at least one of the at least two brands by detecting when the user moves a touch point on the display screen in a predefined direction over a representation of said at least one of the at least two brands.

13. The non-transitory computer readable medium of claim 12, further comprising instructions for detecting movement of a touch point on the display screen from input via a touch screen.

14. The non-transitory computer readable medium of claim 11, further comprising instructions to incorporate the affinity into an interest graph.

15. The non-transitory computer readable medium of claim 11, further comprising instructions for displaying a brand that the user has previously interacted with and a brand that the user has not previously interacted with.

* * * * *